US012394920B2

(12) United States Patent
Fabozzi et al.

(10) Patent No.: US 12,394,920 B2
(45) Date of Patent: Aug. 19, 2025

(54) SCREWLESS CONNECTION TERMINALS WITH WIRE MANAGER

(71) Applicant: Hubbell Incorporated, Shelton, CT (US)

(72) Inventors: Richard Benjamin Fabozzi, Shelton, CT (US); Brian John Gagner, Shelton, CT (US); Thomas L Scanzillo, Monroe, CT (US); Edward Bazayev, Kew Gardens, NY (US)

(73) Assignee: Hubbell Incorporated, Shelton, CT (US)

( * ) Notice: Subject to any disclaimer, the term of this patent is extended or adjusted under 35 U.S.C. 154(b) by 340 days.

(21) Appl. No.: 17/953,067

(22) Filed: Sep. 26, 2022

(65) Prior Publication Data

US 2023/0094763 A1 Mar. 30, 2023

Related U.S. Application Data

(60) Provisional application No. 63/248,609, filed on Sep. 27, 2021.

(51) Int. Cl.
*H01R 9/26* (2006.01)
*H01R 4/48* (2006.01)

(52) U.S. Cl.
CPC ............. *H01R 9/26* (2013.01); *H01R 4/4833* (2023.08); *H01R 4/489* (2013.01); *H01R 4/4816* (2023.08)

(58) Field of Classification Search
CPC .... H01R 4/4833; H01R 4/489; H01R 4/4816; H01R 24/30; H01R 24/78
See application file for complete search history.

(56) References Cited

U.S. PATENT DOCUMENTS

| | | | |
|---|---|---|---|
| 1,994,880 | A | 3/1935 | Wallbillich |
| 2,015,858 | A | 10/1935 | Leviton |
| 2,082,994 | A | 6/1937 | Wallbillich |
| 2,163,722 | A | 6/1939 | Wallbillich |
| 2,175,098 | A | 10/1939 | Wertzheiser |
| 2,201,743 | A | 5/1940 | Peterson |

(Continued)

FOREIGN PATENT DOCUMENTS

| | | |
|---|---|---|
| CA | 981354 | 1/1976 |
| CA | 1202095 | 3/1986 |

(Continued)

OTHER PUBLICATIONS

International Preliminary Report on Patentability in corresponding International Application No. PCT/US2022/044737 mailed on Apr. 11, 2024. (7 pages).

(Continued)

*Primary Examiner* — Jean F Duverne
(74) *Attorney, Agent, or Firm* — Wissing Miller LLP

(57) ABSTRACT

Electrical wiring devices that incorporate clamp-type wire terminal connections are described. The electrical wiring devices include for example, single and duplex blade-type electrical receptacles, blade-type locking electrical receptacles, single or multi-pole electrical switches, combination switches and blade-type receptacles, blade-type plugs for electrical cords and blade-type connectors for electrical cords. The electrical wiring devices include a plurality of contact assemblies. Each contact assembly includes a wire terminal having a wire manager and a plunger.

20 Claims, 35 Drawing Sheets

(56) References Cited

U.S. PATENT DOCUMENTS

| | | | |
|---|---|---|---|
| 2,201,751 | A | 5/1940 | Wertzheiser |
| 2,238,386 | A | 4/1941 | Frank |
| 2,463,033 | A | 3/1949 | Harnett |
| 2,466,930 | A | 4/1949 | Cook |
| 2,506,212 | A | 5/1950 | Cook |
| 2,556,491 | A | 6/1951 | DeLorenzo |
| 2,763,847 | A | 9/1956 | Hubbell |
| 2,952,831 | A | 9/1960 | Ehrlich |
| 3,431,546 | A | 3/1969 | Averill |
| 3,439,315 | A | 4/1969 | Hamel et al. |
| 3,660,728 | A | 5/1972 | Carter |
| 3,713,071 | A | 1/1973 | Poliak et al. |
| 3,740,613 | A | 6/1973 | Strachan |
| 3,793,607 | A | 2/1974 | Smith et al. |
| 3,891,293 | A | 6/1975 | Jones |
| 3,904,266 | A | 9/1975 | Fitzpatrick |
| 3,944,314 | A | 3/1976 | Weitzman |
| 3,945,711 | A | 3/1976 | Hohorst et al. |
| 3,999,829 | A | 12/1976 | Glaesel |
| 4,060,305 | A | 11/1977 | Poliak et al. |
| 4,099,826 | A | 7/1978 | Mazzeo et al. |
| 4,172,628 | A | 10/1979 | Lingaraju |
| 4,241,498 | A | 12/1980 | Brandeau |
| 4,255,655 | A | 3/1981 | Kikuchi |
| 4,296,987 | A | 10/1981 | Lingaraju |
| 4,372,693 | A | 2/1983 | Lutz |
| 4,537,560 | A | 8/1985 | Emeterio et al. |
| 4,748,431 | A | 5/1988 | Saunders et al. |
| 4,749,368 | A | 6/1988 | Mouissie |
| 4,759,726 | A | 7/1988 | Naylor et al. |
| 4,767,340 | A | 8/1988 | Hohorst |
| 4,768,981 | A | 9/1988 | Hohorst |
| 4,793,823 | A | 12/1988 | Cozzens et al. |
| 4,886,472 | A | 12/1989 | Tsai |
| 4,995,829 | A | 2/1991 | Geib et al. |
| 5,015,201 | A | 5/1991 | Brezee et al. |
| 5,057,649 | A | 10/1991 | Ring |
| 5,138,296 | A | 8/1992 | Borchardt et al. |
| 5,151,642 | A | 9/1992 | Lombardi |
| 5,181,310 | A | 1/1993 | Josephson |
| 5,262,749 | A | 11/1993 | Kopelman |
| 5,637,011 | A | 6/1997 | Meyerhoefer et al. |
| 5,685,735 | A | 11/1997 | Hohorst |
| 5,810,625 | A | 9/1998 | Klein |
| 5,825,602 | A | 10/1998 | Tosaka et al. |
| 5,866,844 | A | 2/1999 | Osterbrock et al. |
| 5,975,938 | A | 11/1999 | Libby |
| 5,975,940 | A | 11/1999 | Hartmann et al. |
| 5,995,350 | A | 11/1999 | Kopelman |
| 6,049,143 | A | 4/2000 | Simpson et al. |
| 6,146,217 | A | 11/2000 | Osada |
| 6,172,586 | B1 | 1/2001 | Ferree et al. |
| 6,336,824 | B1 | 1/2002 | Sorig |
| 6,368,149 | B1 | 4/2002 | Schmidt et al. |
| 6,388,216 | B1 | 5/2002 | Puhalla et al. |
| 6,406,323 | B2 | 6/2002 | Chung Long Shan |
| 6,474,678 | B1 | 11/2002 | Ryan |
| 6,477,021 | B1 | 11/2002 | Haun et al. |
| 6,689,955 | B2 | 2/2004 | Doutaz |
| 6,707,652 | B2 | 3/2004 | Engel |
| 6,712,641 | B2 | 3/2004 | Beege et al. |
| 6,743,029 | B1 | 6/2004 | Greene et al. |
| 6,750,402 | B2 | 6/2004 | Geske |
| 6,786,779 | B2 | 9/2004 | Feldmeier et al. |
| 6,802,747 | B1 | 10/2004 | Orange |
| 6,814,608 | B2 | 11/2004 | Kollmann |
| 6,827,602 | B2 | 12/2004 | Greene et al. |
| 6,861,189 | B1 | 3/2005 | Greene et al. |
| 6,893,286 | B2 | 5/2005 | Drewes et al. |
| 6,926,543 | B2 | 8/2005 | Poh et al. |
| 6,943,310 | B2 | 9/2005 | Eisenhower |
| 6,948,846 | B2 | 9/2005 | Engel |
| 7,052,335 | B2 | 5/2006 | Matsuura et al. |
| 7,097,518 | B2 | 8/2006 | Kraemer et al. |
| 7,103,968 | B2 | 9/2006 | Karrasch |
| 7,114,986 | B1 | 10/2006 | Toly |
| 7,115,001 | B1 | 10/2006 | Brockman et al. |
| 7,118,404 | B2 | 10/2006 | Ploesser |
| 7,140,887 | B2 | 11/2006 | Poh et al. |
| 7,150,646 | B2 | 12/2006 | Trumper |
| 7,164,082 | B2 | 1/2007 | Kurek |
| 7,175,485 | B1 | 2/2007 | Alderson et al. |
| 7,241,188 | B2 | 7/2007 | Lin et al. |
| 7,249,963 | B2 | 7/2007 | Ramm |
| 7,270,581 | B2 | 9/2007 | Tiberio |
| 7,507,106 | B2 | 3/2009 | Keswani et al. |
| 7,544,103 | B2 | 6/2009 | Walter et al. |
| 7,547,226 | B2 | 6/2009 | Koessler |
| 7,651,363 | B2 | 1/2010 | Koellmann |
| 7,704,106 | B2 | 4/2010 | Koellmann |
| 7,815,463 | B2 | 10/2010 | Gerberding |
| 7,845,970 | B2 | 12/2010 | Stromiedel |
| 7,909,664 | B2 | 3/2011 | Ilkhanov |
| 7,963,812 | B2 | 6/2011 | Ilkhanov |
| 8,047,883 | B2 | 11/2011 | Montalbano et al. |
| 8,137,145 | B2 | 3/2012 | Joy |
| 8,251,738 | B2 | 8/2012 | Heckert et al. |
| 8,292,677 | B2 | 10/2012 | Gassauer |
| 8,328,588 | B2 | 12/2012 | Ramm et al. |
| 8,388,387 | B2 | 3/2013 | Koellmann |
| 8,408,952 | B2 | 4/2013 | Wu |
| 8,480,424 | B2 | 7/2013 | Koellmann et al. |
| 8,535,084 | B2 | 9/2013 | Koellmann |
| 8,632,355 | B2 | 1/2014 | Hartmann |
| 8,794,994 | B2 | 8/2014 | Koellmann et al. |
| 8,998,634 | B2 | 4/2015 | Koellmann |
| 9,124,034 | B2 | 9/2015 | Koellmann et al. |
| 9,130,285 | B2 | 9/2015 | Scanzillo et al. |
| 9,209,530 | B2 | 12/2015 | Gassauer et al. |
| 9,287,638 | B2 | 3/2016 | Germani |
| 9,413,082 | B2 | 8/2016 | Gassauer |
| 9,466,895 | B2 | 10/2016 | Kollmann et al. |
| 9,466,911 | B1 | 10/2016 | Wu |
| 9,478,874 | B2 | 10/2016 | Stolze |
| 9,502,790 | B2 | 11/2016 | Kollmann et al. |
| 9,525,219 | B2 | 12/2016 | Kollmann et al. |
| 9,543,700 | B2 | 1/2017 | Kollmann et al. |
| 9,601,844 | B2 | 3/2017 | Gassauer et al. |
| 9,614,301 | B2 | 4/2017 | Ludewig et al. |
| 9,614,302 | B2 | 4/2017 | Harwath et al. |
| 9,761,964 | B2 | 9/2017 | Meyer |
| 9,842,408 | B2 | 12/2017 | Milne et al. |
| 10,131,061 | B2 | 11/2018 | Krans et al. |
| 10,141,674 | B2 | 11/2018 | Scanzillo et al. |
| 10,427,201 | B2 | 10/2019 | Bungter et al. |
| 10,431,950 | B2 | 10/2019 | Rzasa et al. |
| 10,461,444 | B2 | 10/2019 | Scanzillo et al. |
| 10,630,036 | B2 | 4/2020 | Rzasa et al. |
| 10,637,165 | B2 | 4/2020 | Scanzillo et al. |
| 10,965,042 | B2 | 3/2021 | Scanzillo et al. |
| 10,992,067 | B2 | 4/2021 | Geske et al. |
| 11,063,396 | B2 | 7/2021 | Iaconis et al. |
| 11,495,895 | B2 | 11/2022 | Scanzillo et al. |
| 11,563,281 | B2 | 1/2023 | Scanzillo et al. |
| 2004/0077210 | A1 | 4/2004 | Kollmann |
| 2004/0248457 | A1 | 12/2004 | Walter |
| 2005/0042912 | A1 | 2/2005 | Drewes et al. |
| 2005/0090159 | A1 | 4/2005 | Luther et al. |
| 2005/0212646 | A1 | 9/2005 | Watchorn et al. |
| 2006/0028316 | A1 | 2/2006 | Fabian et al. |
| 2006/0288140 | A1 | 12/2006 | Lin |
| 2007/0006558 | A1 | 1/2007 | Ramm |
| 2007/0026701 | A1 | 2/2007 | Kurek et al. |
| 2007/0207662 | A1 | 9/2007 | Germani |
| 2007/0238348 | A1 | 10/2007 | Kopelman |
| 2010/0186234 | A1 | 7/2010 | Binder |
| 2010/0304596 | A1 | 12/2010 | Ilkhanov |
| 2010/0304597 | A1 | 12/2010 | Ilkhanov |
| 2011/0207361 | A1 | 8/2011 | Heckert et al. |
| 2014/0227914 | A1 | 8/2014 | Tedeschi |
| 2015/0257636 | A1 | 9/2015 | Kohler |
| 2015/0314434 | A1 | 11/2015 | Bevins, Jr. |
| 2018/0198216 | A1* | 7/2018 | Scanzillo ............. H01R 4/4833 |
| 2019/0160643 | A1 | 5/2019 | Lefavour et al. |

(56) References Cited

U.S. PATENT DOCUMENTS

| | | | | |
|---|---|---|---|---|
| 2019/0221951 | A1 | 7/2019 | Lotkemann et al. | |
| 2020/0235541 | A1 | 7/2020 | Rzasa | |
| 2021/0203087 | A1 | 7/2021 | Scanzillo et al. | |
| 2023/0024505 | A1* | 1/2023 | Scanzillo | H01R 4/48365 |

FOREIGN PATENT DOCUMENTS

| | | |
|---|---|---|
| CA | 1203591 | 4/1986 |
| CA | 2939110 | 8/2015 |
| CA | 2996306 | 3/2017 |
| CN | 101051711 A | 10/2007 |
| CN | 201233969 | 5/2009 |
| CN | 101807756 | 8/2010 |
| CN | 202564566 | 11/2012 |
| CN | 103606765 | 2/2014 |
| CN | 103682774 | 3/2014 |
| CN | 103840294 | 6/2014 |
| CN | 205004486 | 1/2016 |
| CN | 205016755 | 2/2016 |
| DE | 102015119247 | 5/2017 |
| EP | 0131425 | 2/1991 |
| EP | 1553660 | 7/2005 |
| EP | 1490928 | 10/2005 |
| EP | 1608039 | 12/2005 |
| FR | 2312767 | 12/1976 |
| GB | 2272799 | 5/1994 |
| GB | 2292850 | 3/1996 |
| GB | 2393043 | 3/2004 |
| JP | 61014529 | 1/1986 |
| WO | 97003480 | 1/1997 |
| WO | 2017035469 | 3/2017 |
| WO | 2017035518 | 3/2017 |
| WO | 2017125441 | 7/2017 |

OTHER PUBLICATIONS

Wago Cage Clamp Tech Brochure Sep. 2010 (22 pages).
Marinco Power Products, Straight Blade Clamp-Lock (TM) Devices (15A & 20A), 2016 (3 pages).
Lex_Connector_Power_Conn_Brochure_2019_(12pgs).
International Search Report and Written Opinion mailed Dec. 28, 2022 in corresponding PCTU.S. Pat. No. 2022044737 (8 pages).

* cited by examiner

FIG. 8A
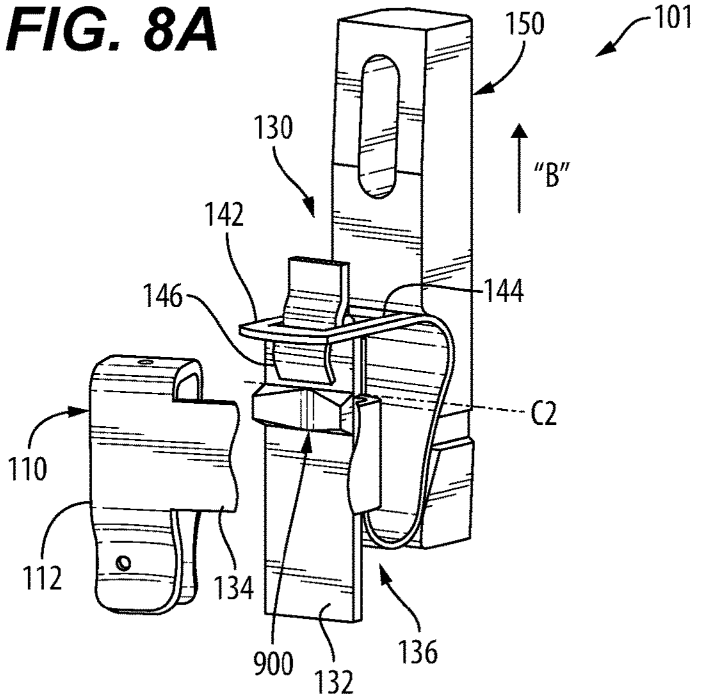
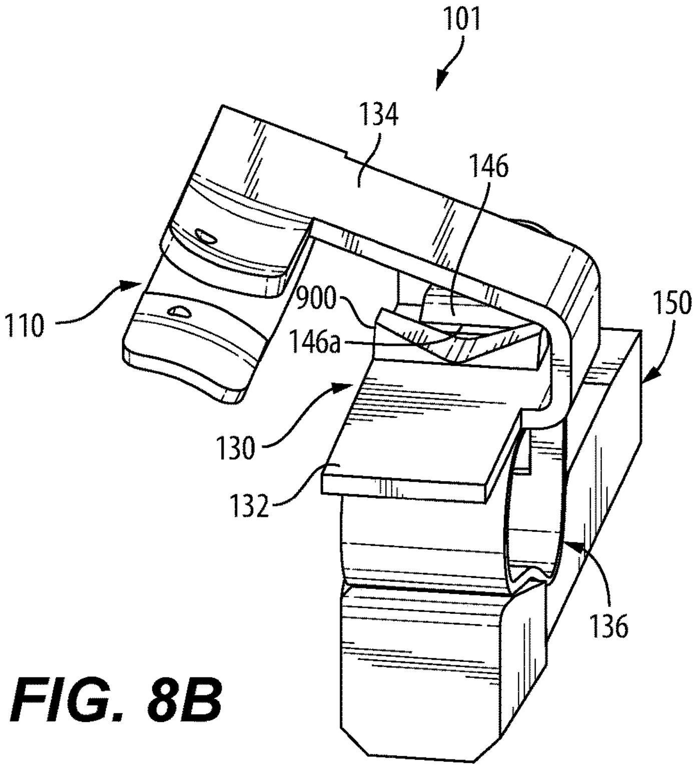
FIG. 8B

FIG. 15A
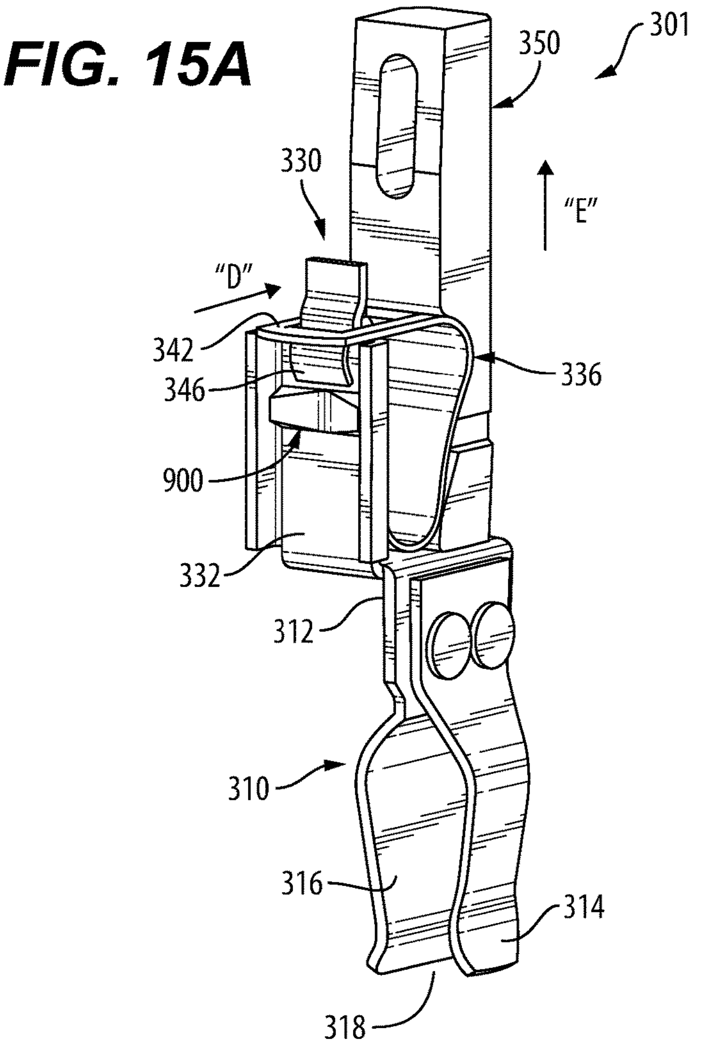
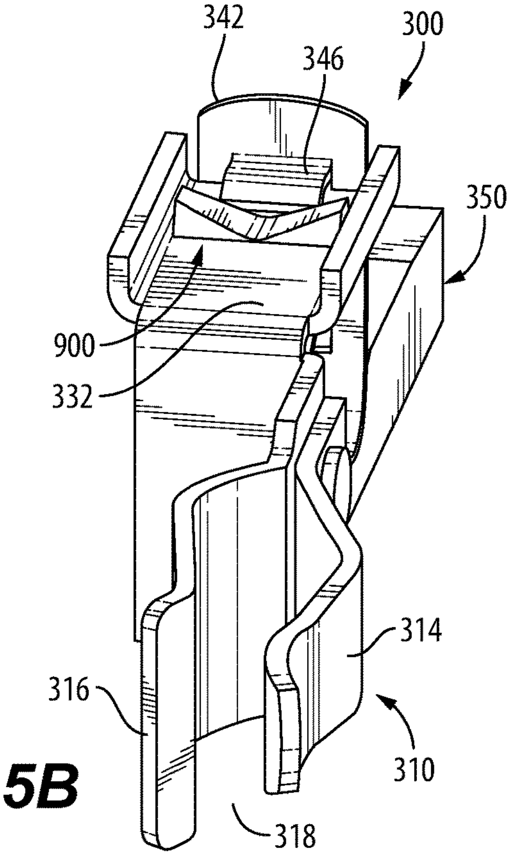
FIG. 15B

FIG. 21A
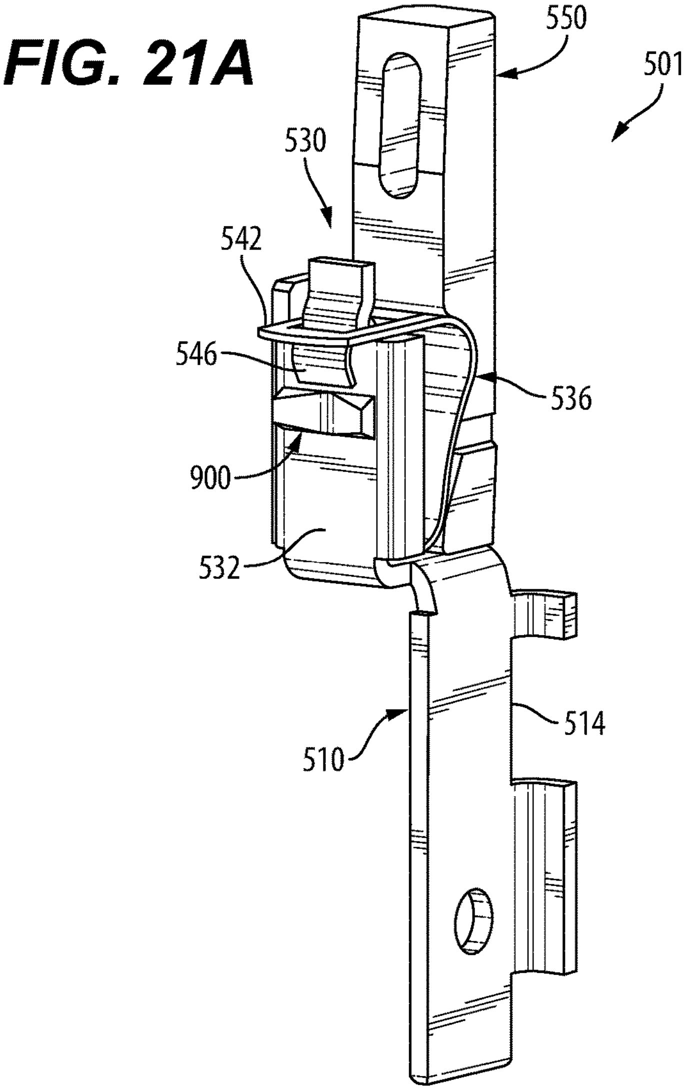
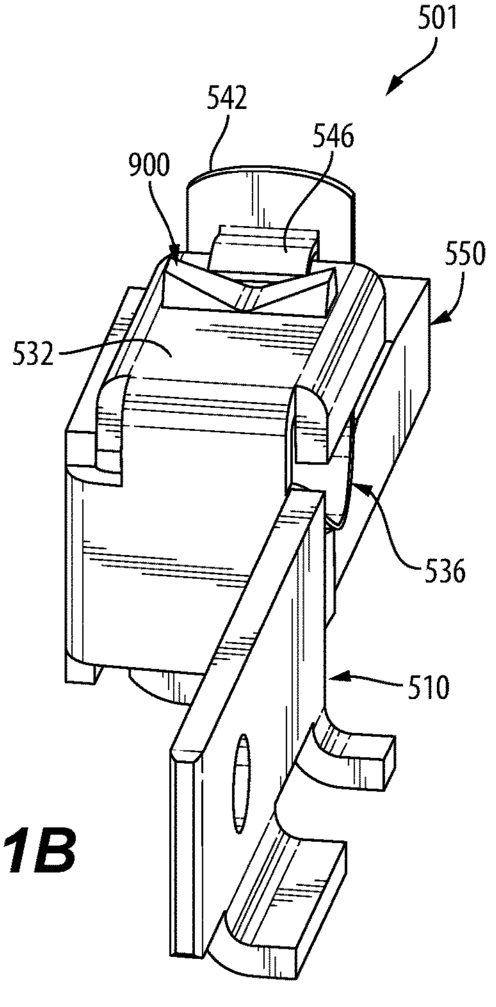
FIG. 21B

FIG. 31A
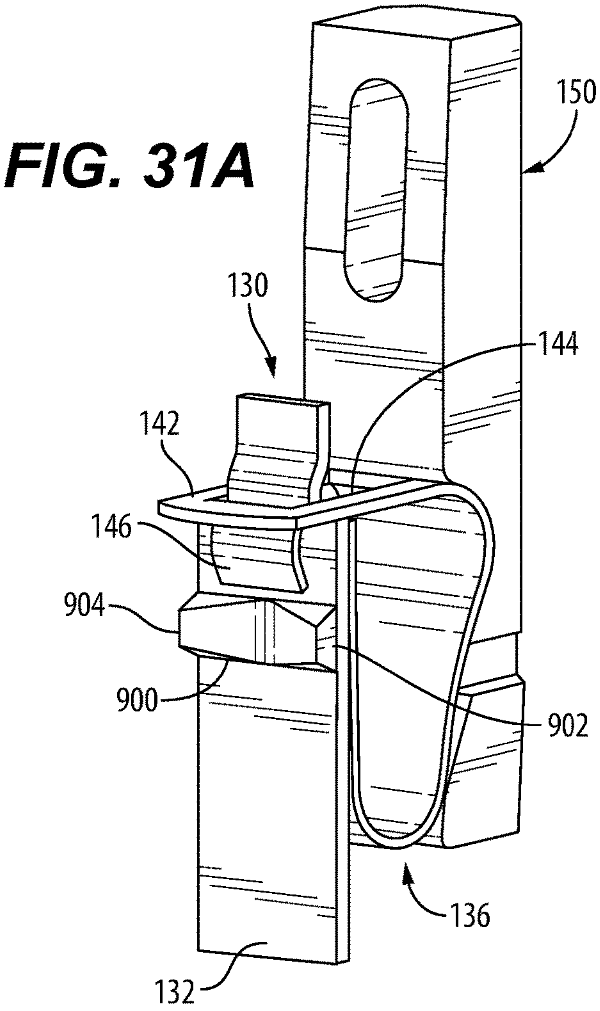
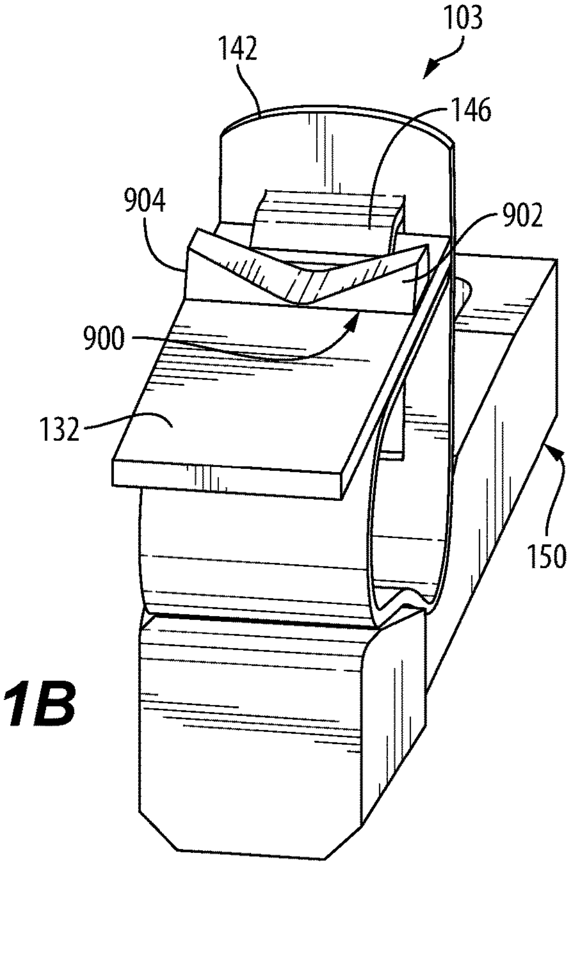
FIG. 31B

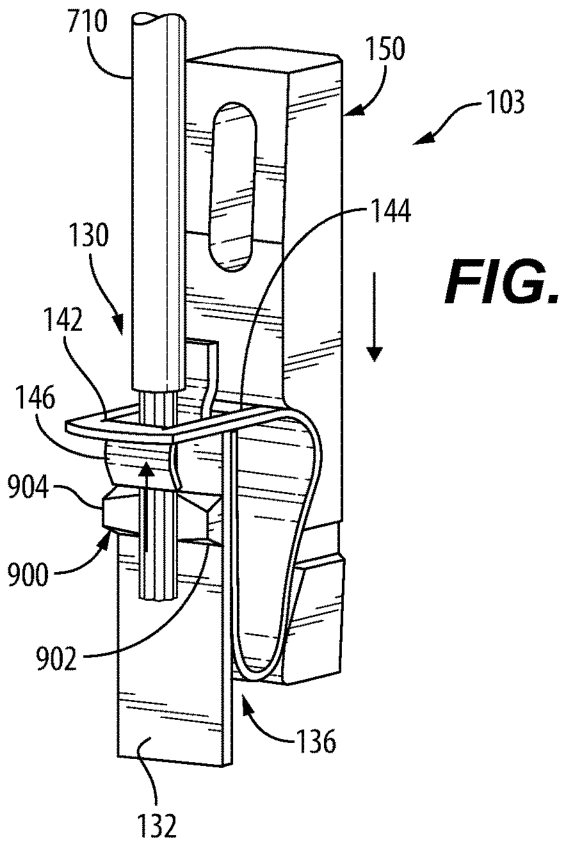
FIG. 32B
FIG. 32C
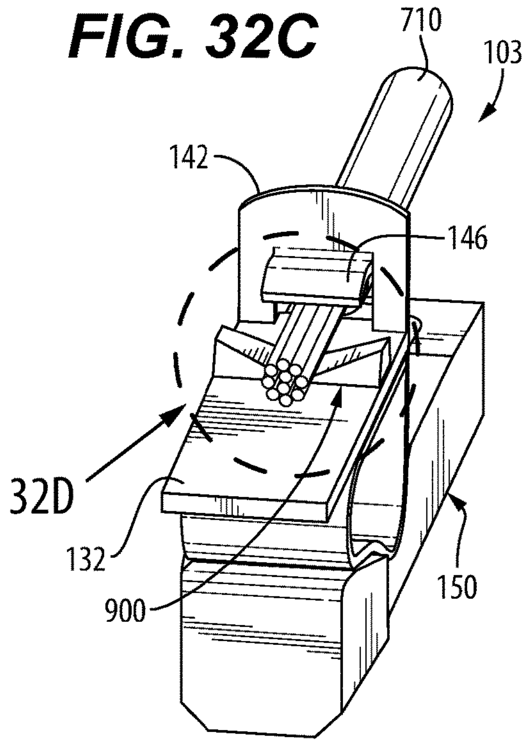
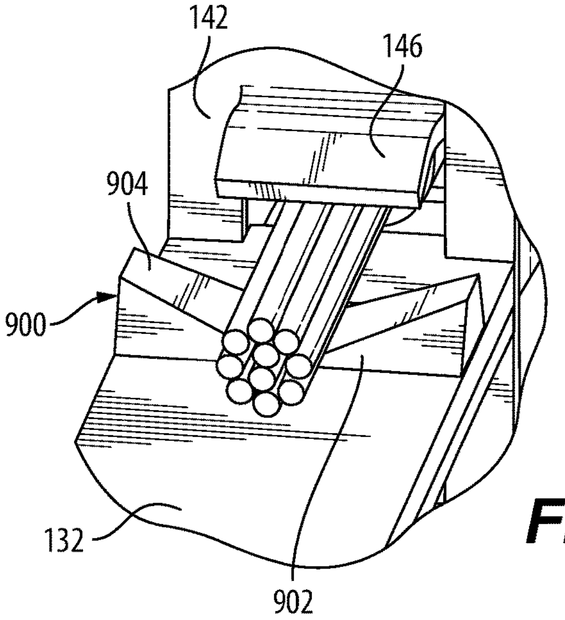
FIG. 32D

FIG. 36
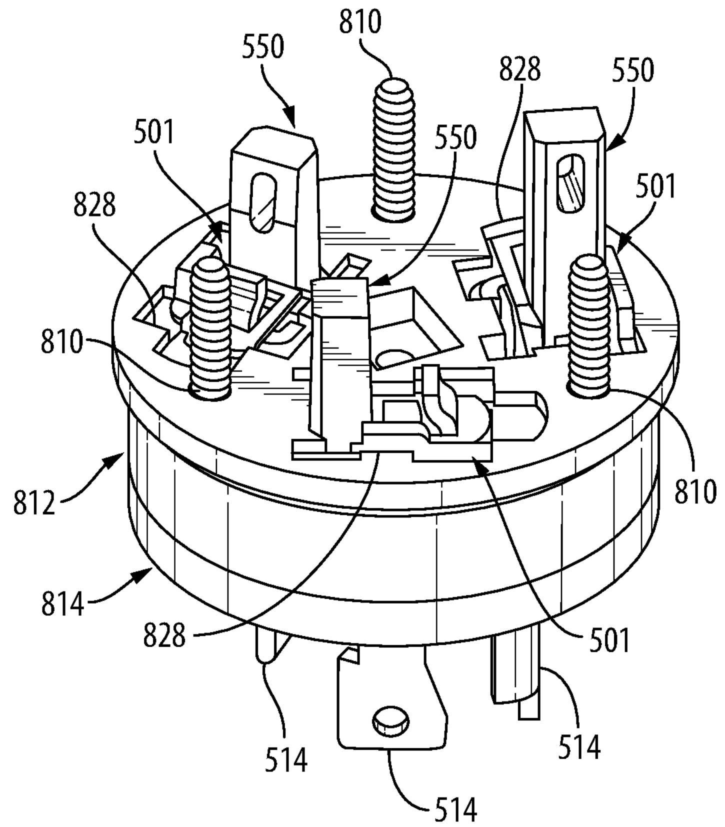
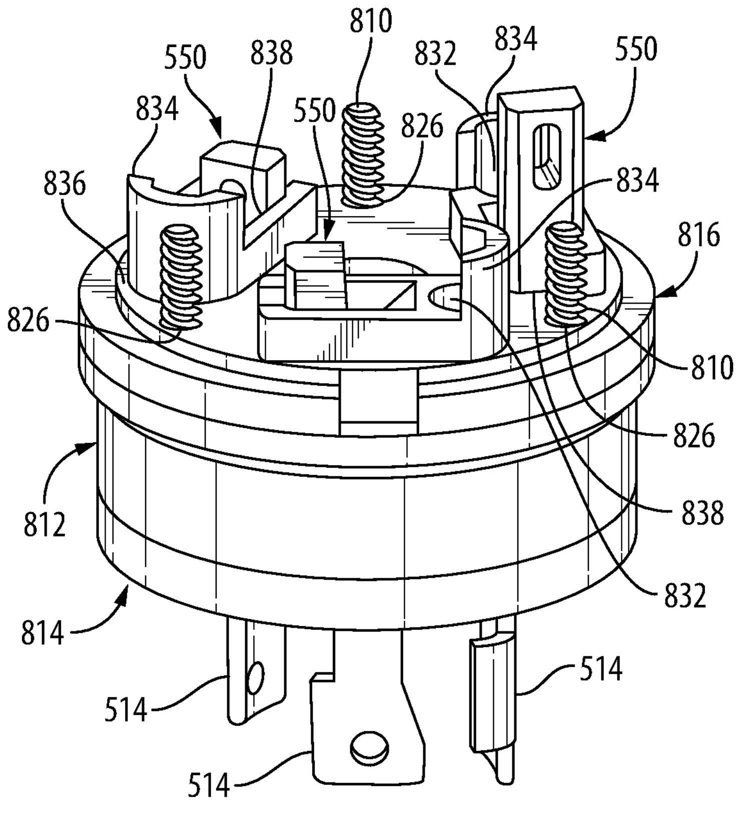
FIG. 37

FIG. 41
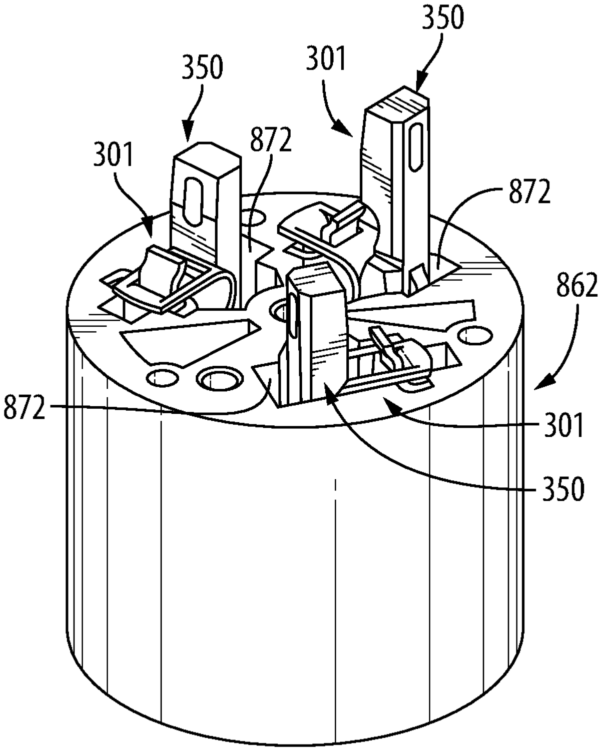
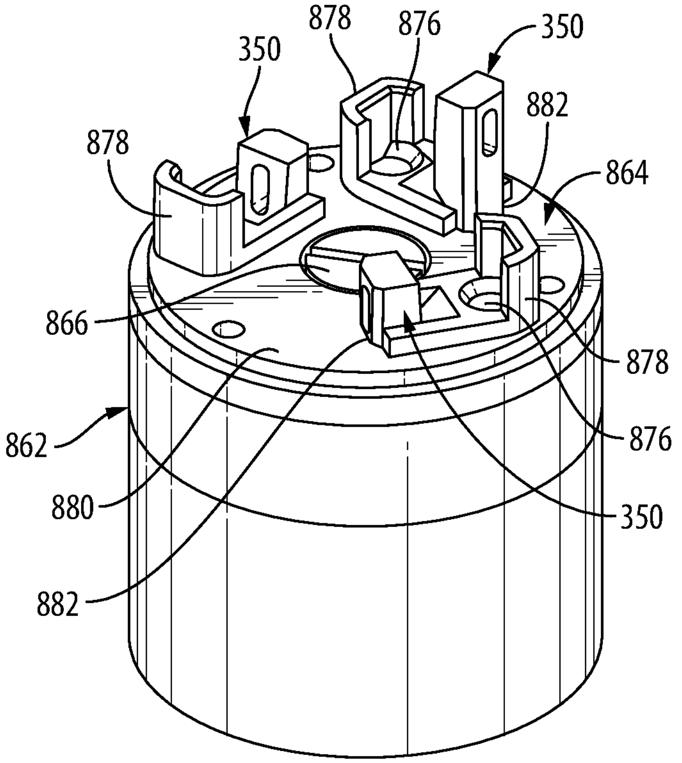
FIG. 42

SCREWLESS CONNECTION TERMINALS WITH WIRE MANAGER

CROSS REFERENCE TO RELATED APPLICATIONS

The present disclosure is based on and claims benefit from U.S. Provisional Patent Application No. 63/248,609 filed on Sep. 27, 2021 entitled "Screwless Connection Terminals With Wire Manager" the contents of which are incorporated herein in their entirety by reference.

BACKGROUND

Field

The present disclosure relates generally to connection terminals for electrical wiring devices and more particularly to screwless connection terminals for use in receptacles, plug assemblies, plug connectors, switches, and other electrical wiring devices.

Description of the Related Art

Present electrical wire terminations in many electrical wiring devices are either direct pressure type terminations or screw and clamp type terminations. In direct pressure type terminations, a terminal screw is tightened directly against an electrical wire to press the wire against a fixed plate. In screw and clamp type terminations, a wire is inserted between a fixed plate and a movable plate, and a terminal screw is tightened so that the wire is clamped between the plates. With direct pressure type terminations, stranded or solid wires if incorrectly installed can be cut or nicked. Cut or nicked wires can result in poor electrical connections increasing the resistance in the connections which can cause overheating. In addition, with stranded wires, both direct pressure type terminations and screw and clamp type terminations may be susceptible to strand relaxation. Strand relaxation is a result of copper wire heating and cooling under the stress of the termination, either direct pressure type or screw and clamp type causing the electrical connection between the stranded wire and the termination to loosen increasing the resistance in the connections which can cause overheating. To alleviate strand relaxation concerns, installers typically re-torque terminal screws after some duration of time after original installation increasing costs to consumers.

SUMMARY

The present disclosure provides embodiments of various electrical wiring devices, including receptacles, power cord plugs and connectors, and switches. In an exemplary embodiment, a blade-type electrical receptacle includes a housing and a plurality of contact assemblies. The housing has a main body with a plurality of cavities, a front cover and a rear cover. The front cover is removably secured to a first side of the main body and includes a plurality of blade receiving slots. The rear cover is removably secured to a second side of the main body and includes a plurality of wire receiving apertures and a plurality of plunger openings.

In one exemplary embodiment, one of the plurality of contact assemblies is positioned at least partially within one of the plurality of cavities and is accessible from one of the plurality of wire receiving apertures, from one of the plurality of plunger openings in the rear cover and is accessible from one of the plurality of blade receiving slots in the front cover. Each of the plurality of the contact assemblies includes a contact member, a wire terminal and a plunger. In an exemplary embodiment, the contact member has a contact body and at least two contact fingers extending from the contact body. The at least two contact fingers are aligned with one of the plurality of blade receiving slots in the front cover. The wire terminal forms an electrically conductive path with the contact member and includes a contact arm secured to the contact body, a clamp brace secured to the contact arm, a clamp spring secured to the clamp brace and a wire manager. The clamp spring is movable relative to the clamp brace between a closed position where a wire can be clamped between the clamp spring and the clamp brace and an open position where a wire can be inserted through one of the plurality of wire receiving apertures in the rear cover and between the clamp spring and the clamp brace. The wire manager is positioned on the clamp brace in close proximity to where the wire can be clamped between the clamp spring and the clamp brace. The plunger is positioned within one of the plurality of cavities and extends at least partially through one of the plurality of plunger openings in the rear cover. The plunger is interactive with the clamp spring such that movement of the plunger in a first direction relative to the clamp brace causes the plunger to apply a mechanical load to the clamp spring to cause the clamp spring to move from the closed position to the open position, and movement of the plunger in a second direction relative to the clamp brace removes the mechanical load from the clamp spring so that to the clamp spring is biased from the open position to the closed position.

The present disclosure also provides embodiments of blade type electrical power cord connectors. In an exemplary embodiment, a blade-type electrical power cord connector includes a housing and a plurality of contact assemblies. The housing includes a main body, a cover and a retainer. The main body has a plurality of cavities and a plurality of blade receiving slots. The cover is removably secured to the main body and has a cable receiving aperture. The retainer is removably secured to the main body between the main body and the cover and has a plurality of wire receiving apertures and a plurality of plunger openings.

In one exemplary embodiment, one of the plurality of contact assemblies is positioned at least partially within one of the plurality of a cavities and is accessible from one of the plurality of wire receiving apertures, from one of the plurality of plunger openings in the retainer and is accessible from one of the plurality of blade receiving slots in the main body. Each of the plurality of the contact assemblies includes a contact member, a wire terminal and a plunger. In an exemplary embodiment, the contact member has a contact body and at least two contact fingers extending from the contact body. The at least two contact fingers are aligned with one of the plurality of blade receiving slots in the main body of the housing. The wire terminal forms an electrically conductive path with the contact member and includes a clamp brace secured to the contact body, a clamp spring secured to the clamp brace and a wire manager. The clamp spring is movable relative to the clamp brace between a closed position where a wire can be clamped between the clamp spring and the clamp brace and an open position where a wire can be inserted through one of the plurality of wire receiving apertures in the retainer and between the clamp spring and the clamp brace. The wire manager is positioned on the clamp brace in close proximity to where the wire can be clamped between the clamp spring and the clamp brace. The plunger is positioned within one of the plurality of cavities and extends at least partially through one of the plurality of plunger openings in the retainer. The plunger is interactive with the clamp spring such that movement of the plunger in a first direction relative to the clamp brace causes the plunger to apply a mechanical load to the clamp spring to cause the clamp spring to move from the closed position to the open position, and movement of the plunger in a second direction relative to the clamp brace removes the mechanical load from the clamp spring so that to the clamp spring is biased from the open position to the closed position.

The present disclosure also provides embodiments of blade type electrical power cord plugs. In an exemplary embodiment, a blade-type electrical power cord plug includes a housing and a plurality of contact assemblies. The housing includes a main body, a bottom cover, a top cover and a retainer. The main body has a plurality of cavities. The bottom cover is removably secured to a first side of the main body and has a plurality of blade receiving slots. The top cover is removably secured to a second side of the main body and has a cable receiving aperture. The retainer is removably secured to the second side of the main body between the main body and the top cover and has a plurality of wire receiving apertures and a plurality of plunger openings.

In one exemplary embodiment, one of the plurality of contact assemblies is positioned at least partially within one of the plurality of a cavities and is accessible from one of the plurality of wire receiving apertures, from one of the plurality of plunger openings in the retainer and is accessible from one of the plurality of blade receiving slots in the bottom cover. In an exemplary embodiment, the each of the plurality of the contact assemblies includes a contact member, a wire terminal and a plunger. The contact member has a contact body and a contact blade extending from the contact body. The contact blade is aligned with one of the plurality of blade receiving slots in the bottom cover such that the blade can pass through the blade receiving slot and extend from the housing. The wire terminal forms an electrically conductive path with the contact member and includes a clamp brace secured to the contact body, a clamp spring secured to the clamp brace and a wire manager. The clamp spring is movable relative to the clamp brace between a closed position where a wire can be clamped between the clamp spring and the clamp brace and an open position where a wire can be inserted through one of the plurality of wire receiving apertures in the retainer and between the clamp spring and the clamp brace. The wire manager is positioned on the clamp brace in close proximity to where the wire can be clamped between the clamp spring and the clamp brace. The plunger is positioned within one of the plurality of cavities and extends at least partially through one of the plurality of plunger openings in the retainer. The plunger is interactive with the clamp spring such that movement of the plunger in a first direction relative to the clamp brace causes the plunger to apply a mechanical load to the clamp spring to cause the clamp spring to move from the closed position to the open position, and movement of the plunger in a second direction relative to the clamp brace removes the mechanical load from the clamp spring so that to the clamp spring is biased from the open position to the closed position.

The present disclosure also provides embodiments of electrical wiring device for installation into an electrical box. In an exemplary embodiment, the electrical wiring device includes a housing and a plurality of contact assemblies. The housing includes a main body portion having a plurality of cavities, a front cover portion removably secured to a first side of the main body portion, and a rear cover portion removably secured to a second side of the main body portion and having a plurality of wire receiving apertures and a plurality of plunger openings. In this embodiment, one of the plurality of contact assemblies is positioned at least partially within one of the plurality of a cavities and is accessible from one of the plurality of wire receiving apertures and one of the plurality of plunger openings in the rear cover portion. Each of the plurality of the contact assemblies includes a wire terminal and a plunger. The wire terminal includes a clamp brace secured to a clamp spring and a wire manager. The clamp spring is movable relative to the clamp brace between a closed position where a wire can be clamped between the clamp spring and the clamp brace, and an open position where a wire can be inserted through one of the plurality of wire receiving apertures in the rear cover and between the clamp spring and the clamp brace. The wire manager is positioned on the clamp brace in close proximity to where the wire can be clamped between the clamp spring and the clamp brace. The plunger is positioned within one of the plurality of cavities and extends at least partially through one of the plurality of plunger openings in the rear cover. The plunger is interactive with the clamp spring such that movement of the plunger in a first direction relative to the clamp brace causes the plunger to apply a mechanical load to the clamp spring to cause the clamp spring to move from the closed position to the open position and movement of the plunger in a second direction relative to the clamp brace removes the mechanical load from the clamp spring so that to the clamp spring is biased from the open position to the closed position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 8A is a perspective view of another exemplary embodiment of a screwless connection terminal for the receptacle of FIG. 1, illustrating a wire manager secured to a clamp brace of a wire terminal;

FIG. 8B is a bottom perspective view of the screwless connection terminal of FIG. 8A, illustrating the wire manager secured to the clamp brace;

FIG. 15A is a perspective view of another exemplary embodiment of a screwless connection terminal for the receptacle of FIG. 10, illustrating a wire manager secured to a clamp brace of a wire terminal;

FIG. 15B is a bottom perspective view of the screwless connection terminal of FIG. 15A, illustrating the wire manager secured to the clamp brace;

FIG. 21A is a perspective view of another exemplary embodiment of a screwless connection terminal for the receptacle of FIG. 17, illustrating a wire manager secured to a clamp brace of a wire terminal;

FIG. 21B is a bottom perspective view of the screwless connection terminal of FIG. 21A, illustrating the wire manager secured to the clamp brace;

FIG. 31A is a perspective view of another exemplary embodiment of a screwless connection terminal for the receptacle of FIG. 27, illustrating a wire manager secured to a clamp brace of a wire terminal;

FIG. 31B is a bottom perspective view of the screwless connection terminal of FIG. 31A, illustrating the wire manager secured to the clamp brace;

FIG. 32B is a perspective view of the screwless connection terminal of FIG. 32A with the stranded wire inserted into the screwless connection terminal and the stranded wire resting in the wire manager;

FIG. 32C is a bottom perspective view of the screwless connection terminal of FIG. 32B, illustrating the screwless connection terminal in the closed position and the stranded wire resting in the wire manager;

FIG. 32D is an enlarged perspective view of a portion of the screwless connection terminal of FIG. 32C taken from detail 32D, illustrating the stranded wire resting in the wire manager;

FIG. 36 is a top perspective view of the contact assembly of FIG. 34, illustrating a plurality of contact assemblies in a main body of the plug assembly;

FIG. 37 is a top perspective view of the contact assembly of FIG. 18, with a retainer secured to the main body of the plug assembly;

FIG. 41 is a top perspective view of the receptacle assembly of FIG. 40, illustrating a plurality of contact assemblies in a main body of the receptacle assembly;

FIG. 42 is a top perspective view of the contact assembly of FIG. 41, with a retainer secured to the main body of the plug assembly;

DETAILED DESCRIPTION

Figure 1:
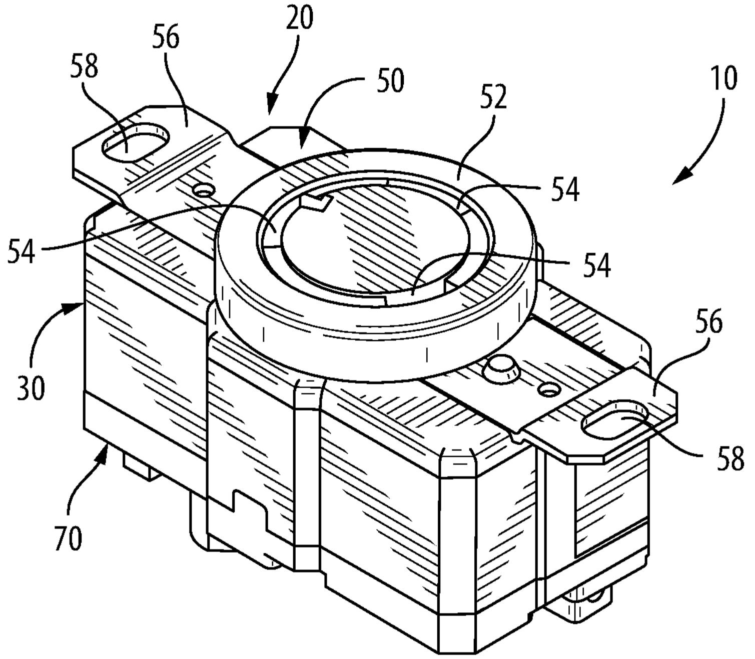
FIG. 1 is a top perspective view of an exemplary embodiment of an electrical receptacle having screwless connection terminals according to the present disclosure.

Exemplary embodiments of electrical wiring devices that incorporate the screwless or clamp wire terminal of the present disclosure are shown and described. Non-limiting examples of the electrical wiring devices contemplated by the present disclosure include, single and duplex blade-type electrical receptacles, blade-type locking electrical receptacles, single or multi-pole electrical switches, combination switches and blade-type receptacles, blade-type plugs for electrical cords and blade-type connectors for electrical cords. Blade-type electrical wiring devices as described herein are; a) male blade-type electrical wiring devices with a plurality of non-circular, e.g., substantially flat or arcuate, power contact blades (hot and/or neutral contact blades) that can mate with corresponding finger contacts within a female blade-type electrical wiring device, or b) female blade-type electrical wiring devices with a plurality of non-circular, e.g., substantially flat or arcuate, power contact blade apertures (hot and/or neutral contact blade apertures) that provide access to contact fingers within the female electrical wiring devices that can mate with corresponding non-circular power contact blades of male blade-type electrical wiring devices. Examples of blade-type electrical wiring devices are described in NEMA standard WD6, which is publicly available and incorporated herein in its entirety by reference. In one exemplary embodiment, a blade-type electrical receptacle includes a housing and a plurality of female contact assemblies within the housing that are accessible from an exterior of the housing. In another exemplary embodiment, a blade-type electrical power cord connector includes a housing and a plurality of female contact assemblies within the housing that are accessible from an exterior of the housing and capable of receiving a plurality of blades of a plug. In another exemplary embodiment, a blade-type electrical power cord plug includes a housing and a plurality of male contact assemblies within the housing that extend beyond an exterior of the housing.

In some embodiments, the housing has a front cover and a main body. In other embodiments, the housing has a front cover, a main body and a rear cover. In each embodiment of an electrical wiring device, each contact assembly has a contact member, a wire terminal and a plunger. The contact member is used to form a portion of a conductive electrical path. The wire terminal is used to terminate an electrical conductor inserted into the housing, and the plunger moves the wire terminal between open and closed positions. The wire terminal includes a clamp brace, a contact arm and a clamp spring. The contact arm connects the wire terminal to the contact member, and the clamp spring is used to apply a constant and continuous load (or spring force) against an electrical conductor to electrically connect the electrical conductor to the clamp brace. The plunger is used to move the clamp spring between the open position permitting an electrical conductor to enter the wire terminal and the closed position binding or squeezing the electrical conductor within the wire terminal.

For the purposes of the present disclosure, the electrical conductor may also be referred to as the "wire." Further, the electrical conductor can be any size wire used to conduct electricity, such as 14 AWG wire, 12 AWG wire, 10 AWG wire or 8 AWG wire. Depending upon the number of conductors in a power cord, generally, 14 AWG wires are rated for between 15 and 18 amps, 12 AWG wires are rated for between 20 and 25 amps, 10 AWG wires are rated for between 25 and 30 amps, and 8 AWG wires are rated for between 35 and 40 amps.

Referring now to FIGS. 1-9, an exemplary embodiment of a locking blade type electrical receptacle is shown. In this exemplary embodiment, the receptacle 10 has a housing 20 and a plurality of contact assemblies 100, seen in detail in FIGS. 8 and 9, within the housing that are accessible from an exterior of the housing. The housing 20 has a main body 30, a front cover 50 and a rear cover 70. The front cover 50 is secured to one side of the main body 30 and the rear cover 70 is secured to the other side of the main body 30. The housing 20 is made of a suitable electrical insulating material, such as plastic, including injection molded thermoplastic, and is configured to fit within an electrical box.

Figure 4:
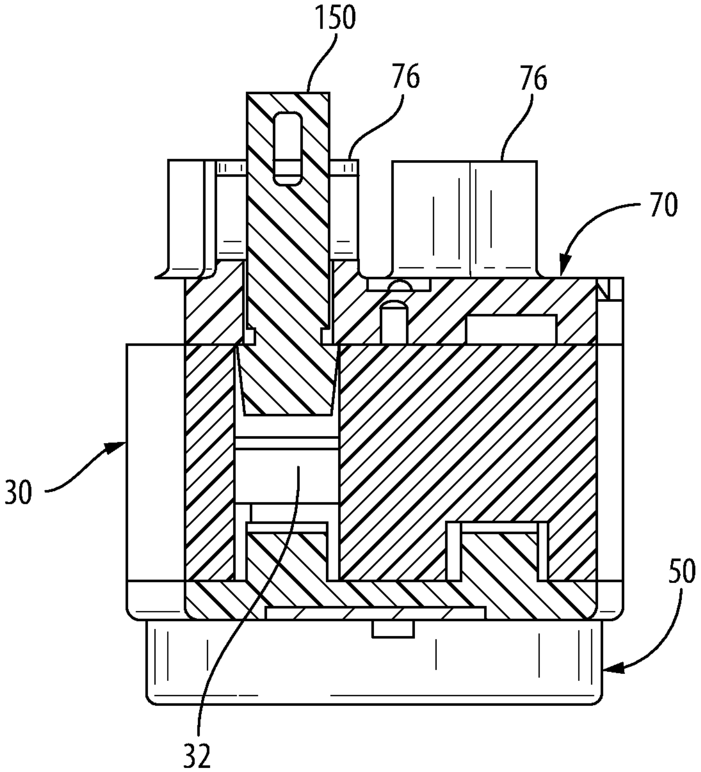
FIG. 4 is a cross sectional view of the receptacle of FIG. 3 taken along line 4-4.
Figure 5:
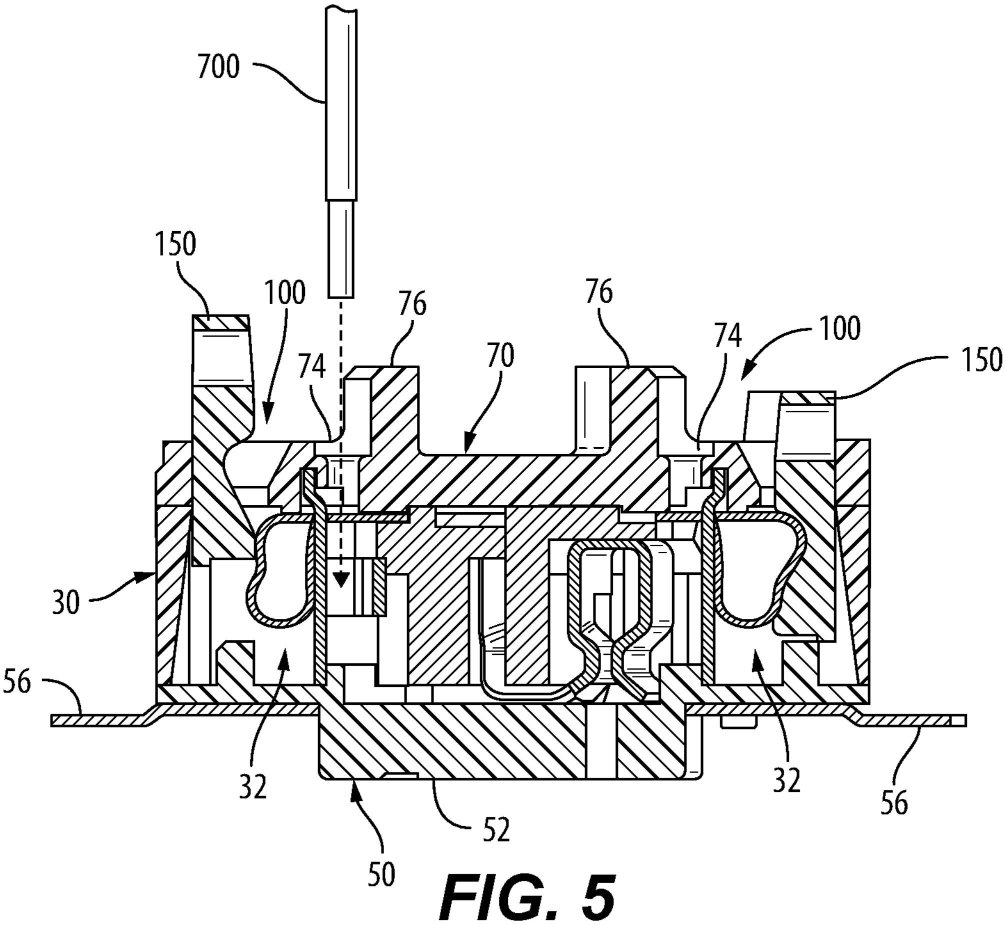
FIG. 5 is a cross sectional view of the receptacle of FIG. 3 taken along line 5-5.
Figure 6:
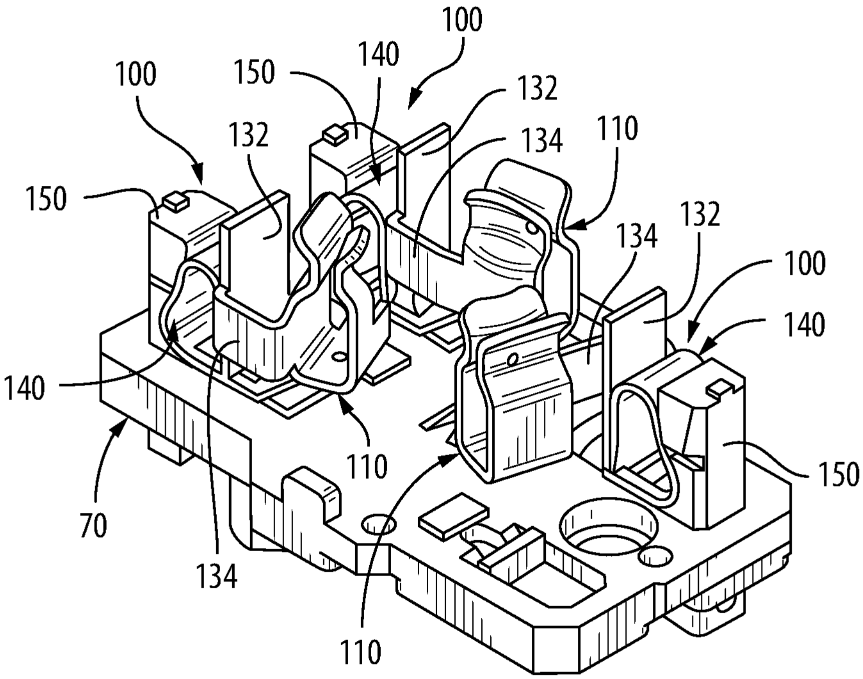
FIG. 6 is a top perspective view of a rear cover of the receptacle housing of FIG. 1 with three contact assemblies resting on the rear cover.
Figure 7:
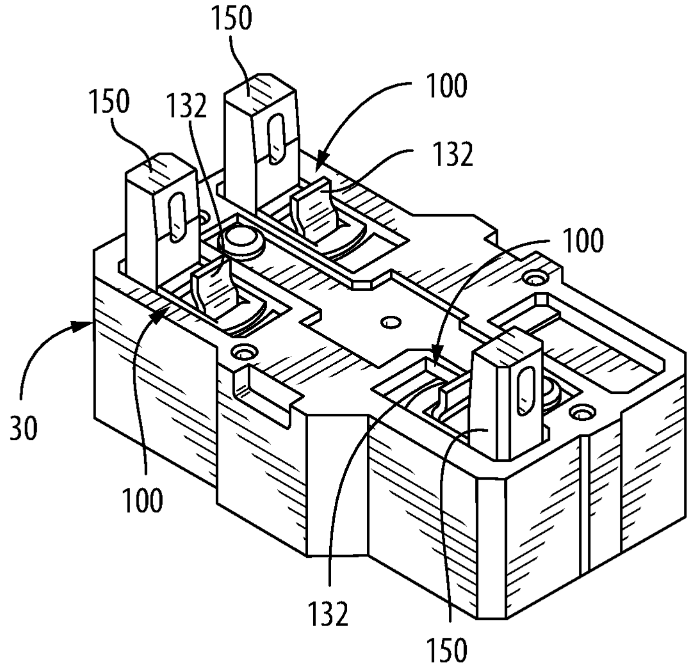
FIG. 7 is a bottom perspective view of a housing of the receptacle of FIG. 1 having three cavities each housing a contact assembly.

The main body 30 includes a plurality of chambers or cavities 32, seen in FIGS. 4 and 5. Each cavity 32 is configured to receive and position a contact assembly 100 within the main body 30, as shown in FIGS. 6 and 7. Each contact assembly 100 is configured to receive a wire, such as wire 700 shown in FIG. 5, and to mate with a contact blade of a plug connector, such as the plug connector of FIG. 17.

Figure 17:
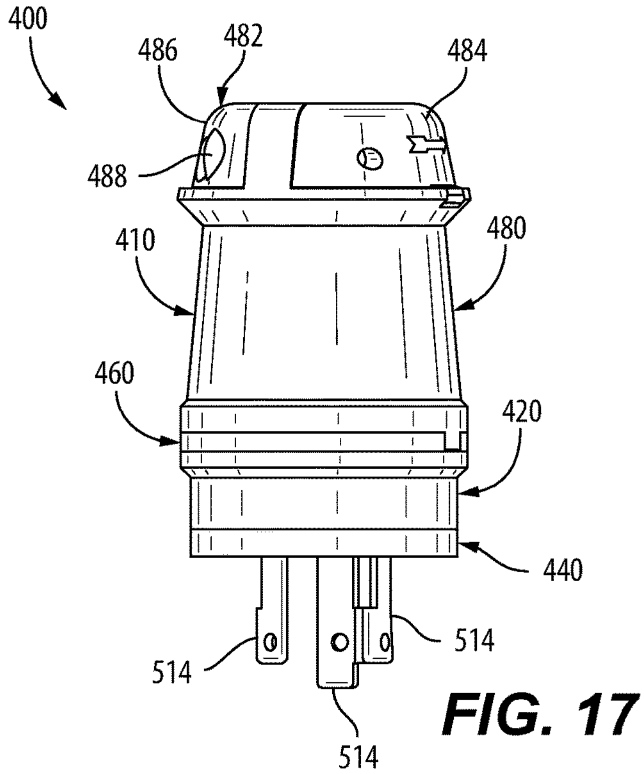
FIG. 17 is a side elevation view of an exemplary embodiment of an electrical power cord plug having the screwless connection terminals according to the present disclosure.

As shown in FIG. 1, the front cover 50 of the receptacle 10 includes a face 52 having a plurality of blade-receiving slots 54 through which contact blades of a plug connector, such as the contact blades of the plug connector shown in FIG. 17, can be inserted in the usual manner into adjacent cavities 32 within the main body 30. The front cover 50 has one or more mounting straps 56 that are secured to an exterior surface of the front cover 50 using, for example, mechanical fasteners or adhesives. The mounting straps 56 are used to secure the receptacle 10 to an electrical box via apertures 58 as is known. The mounting straps 56 may also be connected to electrical ground via a contact assembly 100 within the main body 30. The front cover 50 can be secured to the main body 30 using mechanical fasteners, adhesives or welds such as sonic welds.

Figure 2:
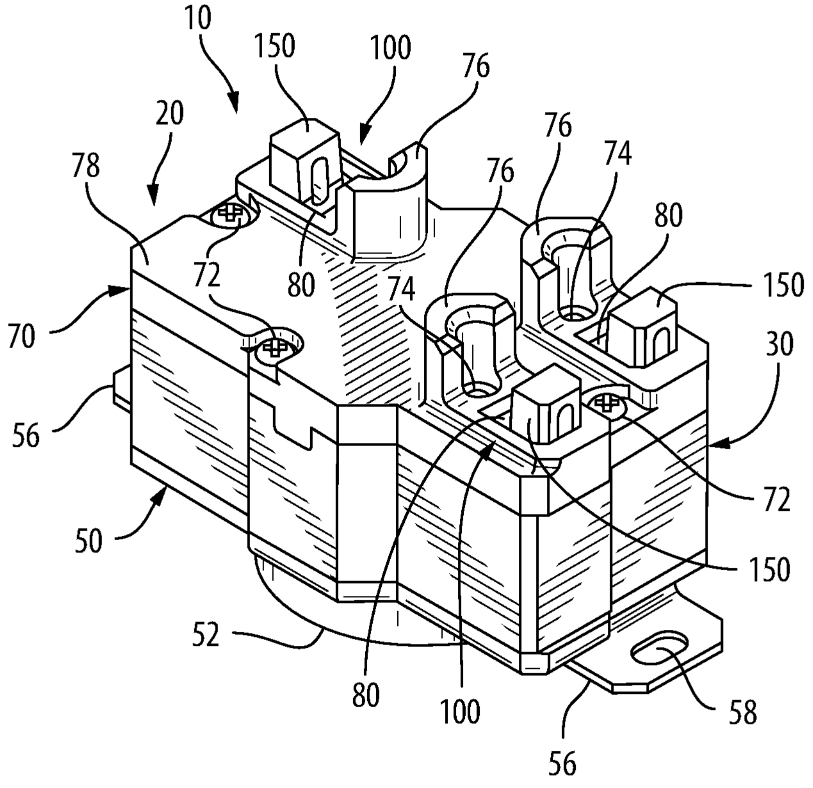
FIG. 2 is a bottom perspective view of the receptacle of FIG. 1.
Figure 3:
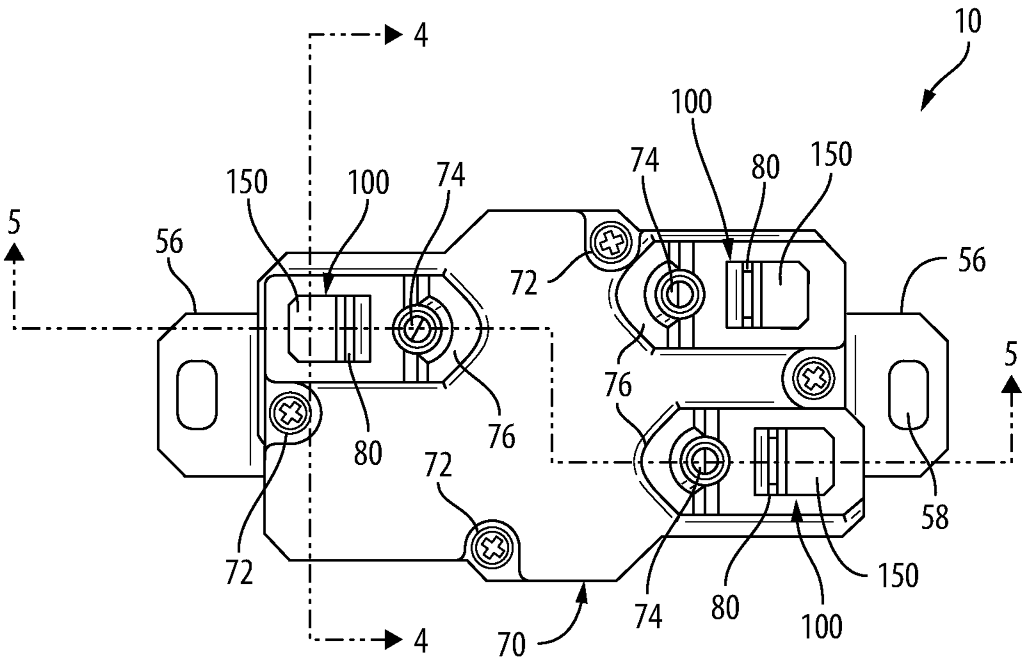
FIG. 3 is a bottom plan view of the receptacle of FIG. 1.

Referring to FIGS. 2, 3 and 5, the rear cover 70 can be secured to the main body 30 using mechanical fasteners, such as screws 72, adhesives or welds such as sonic welds. The rear cover 70 includes a plurality of wire receiving apertures 74. Each wire receiving aperture 74 is positioned to align with a cavity 32 in the main body 30 so that a wire can pass through the rear cover 70 into a contact assembly 100 resting within a cavity 32 in the main body 30. The rear cover 70 may also include a plurality of wire guides 76 extending outwardly from an exterior surface 78 of the rear cover, as shown. In the embodiment shown, one wire guide 76 corresponds to one wire receiving aperture 74. Each wire guide 76 has an arcuate shape that corresponds to the round shape of a wire being inserted into the wire receiving aperture 74. The rear cover 70 also includes a plurality of plunger openings 80, seen in FIGS. 2 and 3, that permits a portion of a plunger 150, forming a portion of the contact assembly 100 described below, to extend outside the housing 20.

Figure 8:
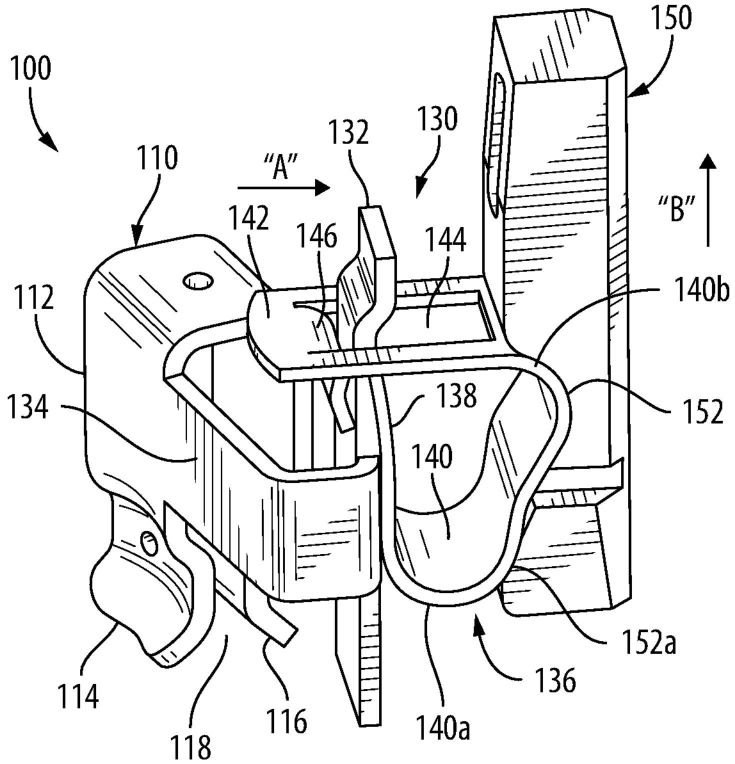
FIG. 8 is a top perspective view of an exemplary embodiment of a screwless connection terminal for the receptacle of FIG. 1 in a closed position.
Figure 9:
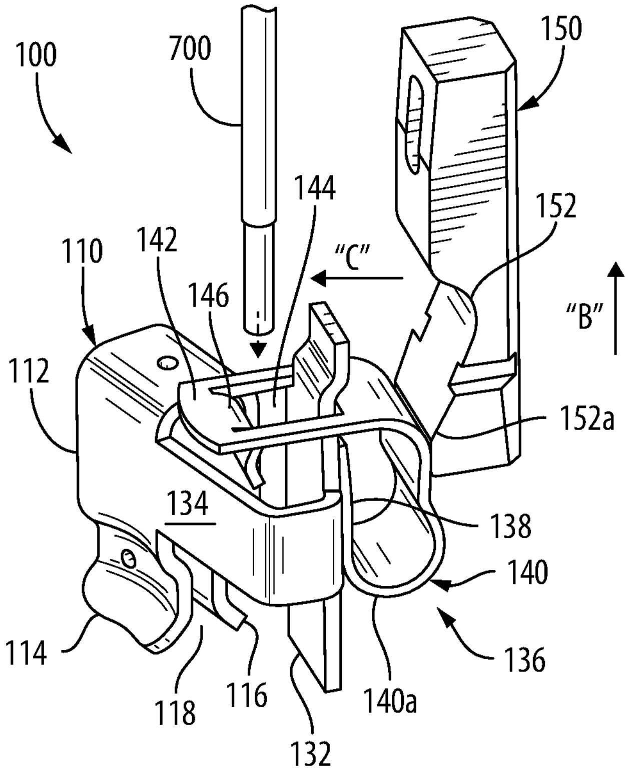
FIG. 9 is a top perspective view of the screwless connection terminal of FIG. 8 in an open position.
Figure 9A:
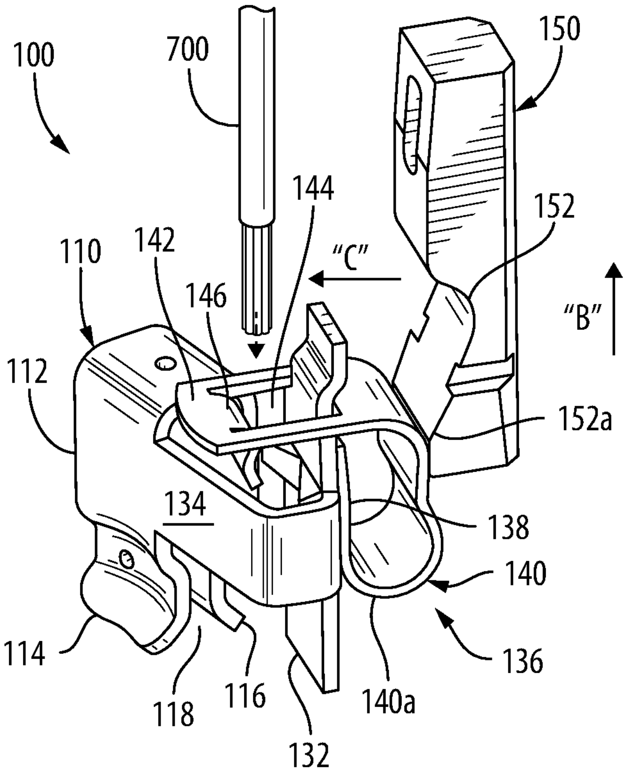
FIG. 9A is a top perspective view of the screwless connection terminal of FIG. 8A in an open position and illustrating a stranded wire ready for insertion into the screwless connection terminal.
Figure 9B:
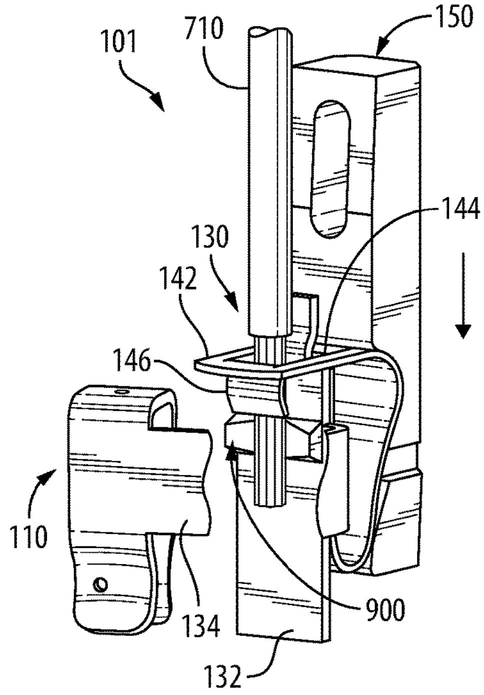
FIG. 9B is a perspective view of the screwless connection terminal of FIG. 9A with the stranded wire inserted into the screwless connection terminal and the stranded wire resting in the wire manager.
Figure 9C:
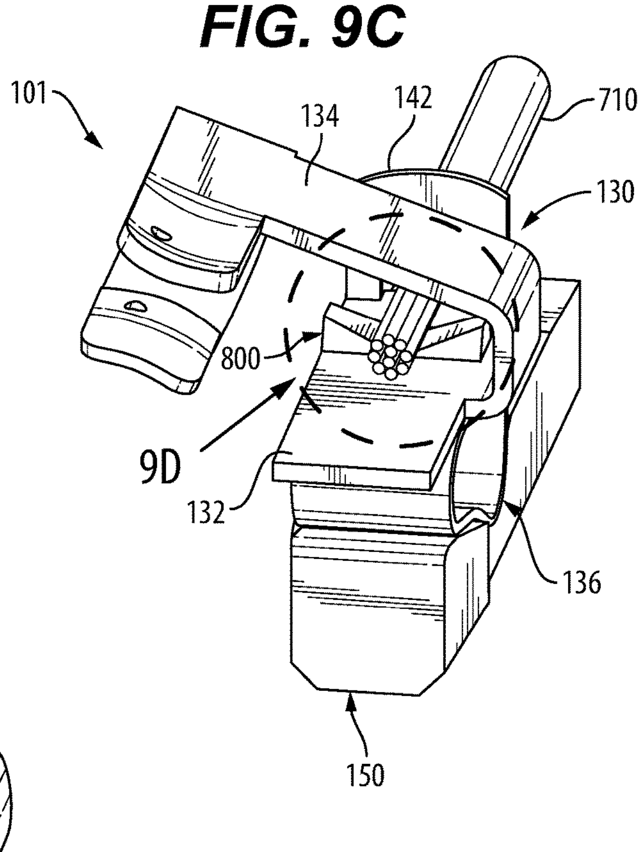
FIG. 9C is a bottom perspective view of the screwless connection terminal of FIG. 9B, illustrating the stranded wire resting in the wire manager.
Figure 9D:
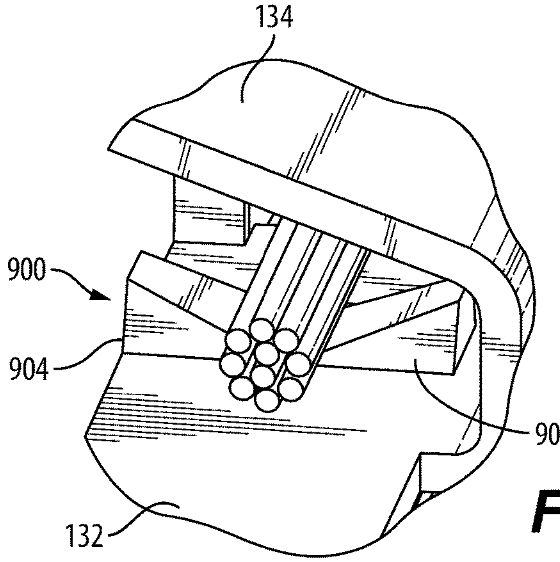
FIG. 9D is an enlarged perspective view of a portion of the screwless connection terminal of FIG. 9C taken from detail 9D, illustrating the stranded wire resting in the wire manager.

Turning to FIGS. 8 and 9, an exemplary embodiment of a contact assembly 100 according to the present disclosure is shown. In this exemplary embodiment, the contact assembly 100 includes a contact member 110, a wire terminal 130 and a plunger 150. The contact member 110 is made of an electrically conductive material, such as brass, copper or aluminum. The wire terminal 130 is made of an electrically conductive resilient material with sufficient stiffness to flex when a mechanical load is applied and return to its normal position when the mechanical load is removed. An example of such an electrically conductive resilient material is spring steel. The plunger 150 is made of a suitable rigid electrical insulating material, such as plastic materials. An example of a plastic material is injection molded thermoplastic. The contact member 110 and the wire terminal 130 can be formed as a unitary structure, or the contact member 110 and wire terminal 130 can be individual components secured together by, for example, a solder joint, a brazed joint, or a welded joint.

The contact member 110 includes a contact body 112 and a pair of flexible fingers 114 and 116 extending from the contact body 112, as shown. The flexible fingers 114 and 116 form a female contact configured to engage a contact blade of a blade-type electrical power cord plug, such as a contact blade of the plug shown in FIG. 17. The distal ends of the flexible fingers 114 and 116 contact each other or are in close proximity to each other to form a gripping portion 118 between the fingers. The gripping portion 118 is capable of receiving a contact blade so as to electrically couple or connect the contact member 110 to the contact blade. Thus, each contact assembly 100 is adapted to engage one of a plurality of contact blades of a blade-type electrical power cord plug.

The wire terminal 130 is a mechanical clamping terminal that uses one or more springs that can deflect under a mechanical load applied by the plunger 150 and recover to their initial shape when the mechanical load is removed. The energy stored by the one or more springs should be sufficient to apply a constant and continuous force to mechanically secure one or more wires, e.g., wire 700 shown in FIG. 5, to the wire terminal 130.

In the exemplary configuration shown in FIGS. 8 and 9, the wire terminal 130 includes a clamp brace 132, a contact arm 134 and a clamp spring 136. The clamp brace 132 is a fixed terminal body that may be a substantially planar shaped member or an arcuate shaped member secured to the contact body 112 of the contact member 110 via the contact arm 134. The contact arm 134 also provides an electrically conductive path between the contact member 110 and the wire terminal 130. The clamp spring 136 includes an end portion 138, a spring member 140 and a clamp arm 142. The end portion 138 can be a substantially planar shaped member or an arcuate shaped member that is configured to mate with the clamp brace 132 and is secured to the clamp brace 132 by, for example, a solder joint, a brazed joint, or a welded joint. The spring member 140 has a lower lobe **140*a* and an upper lobe 140*b*. The lower lobe 140*a* and the upper lobe 140*b* are configured to interact with the plunger 150 so that vertical movement of the plunger 150 relative to the spring member 140 is translated to the application of a mechanical load on the spring member 140 or the removal of the mechanical load on the spring member 140. For example, the plunger 150 can be a rectangular shaped member having a notch 152 that is configured to receive the upper lobe 140*b* of the spring member 140, as shown in FIG. 8. The notch 152 has a camming surface 152*a* that rides along the spring member 140 when the plunger 150 is moved in the direction of arrow "B" applying a mechanical load on the spring member 140 causing the spring member 140 to deflect in the direction of arrow "C" toward the open position, seen in FIG. 9. The clamp arm 142 extends from the upper lobe 140*b* of the spring member 140 toward the clamp brace 132, as shown. The clamp arm 142 has an elongated opening 144 configured to receive a portion of the clamp brace 132 and a clamp member 146 that contacts a wire, e.g., wire 700 seen in FIG. 5, positioned between the clamp brace 132 and the clamp member 146 when the clamp spring 136 is in the closed position. The clamp arm 142 is movable relative to the clamp brace 132 between the closed position, seen in FIG. 8, and the open position, seen in FIG. 9**.

As noted, the wire terminal 130 can connect to electrical conductors of different sizes. For example, if the blade-type electrical receptacle 10 is rated for 15 amps, then the wire terminal 130 should also be configured and rated for at least 15 amps. The wire size, i.e., the bare conductor size, for 15 amps is 14 AWG wire such that the clamp arm 142 should be able to move to an open position where the outer diameter of 14 AWG wire can fit. As another example, if the blade-type electrical receptacle 10 is rated for 20 amps, then the wire terminal 130 should also be rated for at least 20 amps. The wire size, i.e., the bare conductor size, for 20 amps is 12 AWG wire such that the clamp arm 142 should be able to move to an open position where the outer diameter of 12 AWG wire can fit. As another example, if the blade-type electrical receptacle 10 is rated for 30 amps, then the wire terminal 130 should also be rated for at least 30 amps. The wire size, i.e., the bare conductor size, for 30 amps is 10 AWG wire such that the clamp arm 142 should be able to move to an open position where the outer diameter of 10 AWG wire can fit. As another example, if the blade-type electrical receptacle 10 is rated for 40 amps, then the wire terminal 130 should also be rated for at least 40 amps. The wire size, i.e., the bare conductor size, for 40 amps is 8 AWG wire such that the clamp arm 142 should be able to move to an open position where the outer diameter of 8 AWG wire can fit.

As noted, the spring member 140 is made of an electrically conductive resilient material with sufficient stiffness to flex when the plunger 150 pushes the spring member 140 from the closed position to the open position while applying a biasing force (i.e., a spring force) through the clamp member 146 to a wire between the clamp member 146 and the clamp brace 132. As an example, the spring arm 140 can be made of metal, such as spring steel. The biasing force (or spring force) exerted by the spring arm 140 clamping a wire between the clamp member 146 and the clamp brace 132 should be sufficient to apply a constant and continuous force on the wire to electrically couple or connect the wire terminal 130 to the wire in various temperature and environmental conditions. The spring member 140 is configured so that it is normally biased toward the closed position, i.e., in the direction of arrow "A" which is away from the clamp brace 132, as seen in FIG. 8. In the spring member's 140 normal position without a conductor inserted into the elongated opening 144, the clamp member 146 of the clamp arm 142 can contact the clamp brace 132.

Turning to FIGS. 8A, 8B and 9A-9D, another exemplary embodiment of a contact assembly 101 according to the present disclosure is shown. The contact assembly 101 is substantially similar to the contact assembly 100 such that like reference numerals are used to reference like components. The contact assembly 101 includes the contact member 110, the wire terminal 130 and the plunger 50. In this exemplary embodiment, the wire terminal 130 includes a wire manager 900.

The wire terminal 130 is a mechanical clamping terminal that uses, for example, one or more springs that can deflect under a mechanical load applied by the plunger 150 and recover to its initial shape when the mechanical load is removed. The energy stored by the one or more springs should be sufficient to apply a constant and continuous force in the range of, for example, about 5 pound force to about 35 pound force, to mechanically secure one or more wires, e.g., wire 710 shown in FIG. 9A, to the wire terminal 130. The wire terminal 130 is made of an electrically conductive resilient material with sufficient stiffness to flex when a mechanical load is applied and return to its normal position when the mechanical load is removed. An example of such an electrically conductive resilient material is spring steel. In the exemplary configuration shown in FIGS. 8A and 8B, the wire terminal 130 includes a clamp brace 132, a contact arm 134 and a clamp spring 136. The clamp brace 132 is a fixed terminal body that may be a substantially planar shaped member or an arcuate shaped member secured to or integrally formed into the contact body 112 of the contact member 110 via the contact arm 134. The clamp spring 136 includes an end portion 138, a spring member 140 and a clamp arm 142. The clamp arm 142 has an elongated opening 144 configured to receive a portion of the clamp brace 132 and a clamp member 146 that contacts a wire, e.g., wire 710 seen in FIG. 9A, positioned within the elongated opening 144 between the clamp brace 132 and the clamp member 146 when the clamp spring 136 is in the closed position. The clamp arm 142 is movable relative to the clamp brace 132 between the closed position, seen in FIG. 8A, and the open position, seen in FIG. 9A.

In this exemplary embodiment, the clamp brace 132 has a wire manager 900 integrally or monolithically formed into the clamp brace 132. In another embodiment, the wire manager 900 may be secured to the clamp brace 132 by, for example, a solder joint, a brazed joint or a welded joint. It is to be appreciated that the wire manager 900 may also be integrally or monolithically formed into the clamp spring 136. It is also to be appreciated that the wire manager 900 may also be secured to the clamp spring 136 by, for example, a solder joint, a brazed joint or a welded joint. The wire manager 900 is provided to urge the wire, e.g., wire 700 or 710, to be concentrated toward a center or middle of the clamp brace 132 and/or a center or middle of the clamp member 146. Preferably, the wire manager 900 is provided to urge wire strands of stranded wire, e.g., stranded wire 710, to be concentrated toward a center or middle the clamp brace 132 and/or a center or middle of the clamp member 146. Concentrating the wire, e.g., wire strands of stranded wire 710, toward a middle the clamp brace 132 and/or a middle of the clamp member 146 increases the force or pressure applied by the clamp member 146 of the clamp arm 142 of the clamp spring 136 to the wire. For example, concentrating the wire toward a middle the clamp brace 132 and/or a middle of the clamp member 146 can increase the force or pressure applied by the clamp member 146 by, for example, about 20 percent when compared to instances where the wire, e.g., wire 710, is not concentrated wire toward a center or middle the clamp brace 132 and/or a center or middle of the clamp member 146. This results in a higher wire retention force in the range of about 1 pound force and about 7 pound force that can be applied by the clamp spring 136 to hold the wire, e.g., the wire strands of the stranded wire 710, against the clamp brace 132. For example, in the example where the energy stored by the one or more springs should be sufficient to apply a constant and continuous force in the range of, for example, about 5 pound force to about 35 pound force, the higher wire retention force would be in the range of, for example, 6 pound force to about 42 pound force. In addition, the higher spring force or pressure on the wire also provides an improved electrical connection by lowering the contact resistance. Exemplary embodiments of the wire manager 900 are shown in FIGS. 43-47 and are described herein below. However, the present disclosure contemplates other wire manager embodiments where the wire manager urges a wire or wire strands toward a center or middle of a clamp brace and/or a center or middle of the clamp member.

As noted, the wire terminal 130 can connect to electrical conductors of different sizes. For example, if the blade-type electrical receptacle 10 is rated for 15 amps, then the wire terminal 130 should also be configured and rated for at least 15 amps. The wire size, i.e., the bare conductor size, for 15 amps is 14 AWG wire such that the clamp arm 142 should be able to move to an open position where the outer diameter of 14 AWG wire can fit. As another example, if the blade-type electrical receptacle 10 is rated for 20 amps, then the wire terminal 130 should also be rated for at least 20 amps. The wire size, i.e., the bare conductor size, for 20 amps is 12 AWG wire such that the clamp arm 142 should be able to move to an open position where the outer diameter of 12 AWG wire can fit. As another example, if the blade-type electrical receptacle 10 is rated for 30 amps, then the wire terminal 130 should also be rated for at least 30 amps. The wire size, i.e., the bare conductor size, for 30 amps is 10 AWG wire such that the clamp arm 142 should be able to move to an open position where the outer diameter of 10 AWG wire can fit. As another example, if the blade-type electrical receptacle 10 is rated for 40 amps, then the wire terminal 130 should also be rated for at least 40 amps. The wire size, i.e., the bare conductor size, for 40 amps is 8 AWG wire such that the clamp arm 142 should be able to move to an open position where the outer diameter of 8 AWG wire can fit.

As noted, the spring member 140 is made of a resilient material with sufficient stiffness to flex when the plunger 150 pushes the spring member 140 from the closed position to the open position while applying a biasing force (i.e., a spring force) through the clamp member 146 to a wire between the clamp member 146 and the clamp brace 132. As an example, the spring arm 140 can be made of metal, such as spring steel. The biasing force (or spring force) exerted by the spring arm 140 clamping a wire between the clamp member 146 and the clamp brace 132 should be sufficient to apply a constant and continuous force on the wire to electrically couple or connect the wire terminal 130 to the wire in various temperature and environmental conditions. The spring member 140 is configured so that it is normally biased toward the closed position, i.e., in the direction of arrow “A” which is away from the clamp brace 132, as seen in FIG. 8. In the spring member’s 140 normal position without a conductor inserted into the elongated opening 144, the clamp member 146 of the clamp arm 142 can contact the clamp brace 132.

As described herein, the receptacle 10 uses contact assemblies 100 to terminate electrical conductors or wires within an electrical box. To connect wires within an electrical box to the receptacle 10, an installer, e.g., an electrician, strips the insulation from the end of each wire. In this exemplary embodiment, the receptacle 10 has three contact assemblies 100 such that three wires can be connected to the receptacle 10. However, it is also contemplated that each contact assembly could be configured to electrically connect more than one wire to the contact assembly 100. The plungers 150 for each contact assembly 100 extending through the rear cover 70 are then pulled vertically relative to a longitudinal axis of the receptacle 10, i.e., in the direction of arrow “B” seen in FIG. 8, to cause the camming surface 152*a* of the notch 152 in the plunger 150 to ride along the spring member 140 applying a mechanical load on the spring member 140 causing the spring member to deflect in the direction of arrow “C” from the closed position toward the open position, seen in FIG. 9. With the wire terminals 130 in the open position, the electrical wires are then inserted into the appropriate wire receiving aperture 74 in the rear cover 70 of the receptacle 10. The wire receiving apertures 74 and wire guides 76 guide the bare end of the wires into the portion of the elongated opening 144 of the clamp spring 136 between clamp brace 132 and clamp member 146. When the bare end of each wire is positioned between the clamp brace 132 and the clamp member 146, the respective plunger 150 is then pushed back into the receptacle 10 removing the mechanical load applied by the plunger on the spring member 140 so that the energy stored by the spring member 140 moves the spring member 140 to the closed position securing or clamping the wire between the clamp brace 132 and the clamp member 146 completing an electrically conductive path between the wire and the contact member 110.

To remove the wires from the contact assembly 100, the plungers 150 for each contact assembly 100 extending through the rear cover 70 are pulled vertically relative to a longitudinal axis of the receptacle 10 to cause the camming surface 152*a* of the notch 152 in the plunger 150 to ride along the spring member 140 applying a mechanical load on the spring member 140 causing the spring member to deflect from the closed position to the open position. With the wire terminals 130 in the open position, the electrical wires can be removed from the receptacle.

Referring now to FIGS. 10-16, an exemplary embodiment of a blade-type electrical power cord connector is shown. In this exemplary embodiment, the blade-type connector 200 has a housing 210 and a plurality of contact assemblies 300 within the housing that are accessible from an exterior of the housing. The housing 210 has a main body 220, a retainer 240 and a cover 260. The retainer 240 is secured to a top side of the main body 220 using screw 242. The cover 260 is secured to the top side of the main body 220 using screws 222 inserted through apertures in a face 224 in the main body 220 and through the main body 220. The housing 210 is made of a suitably rigid, electrical insulating material, such as a plastic material, including injection molded thermoplastic, or a rubber material.

Figure 12:
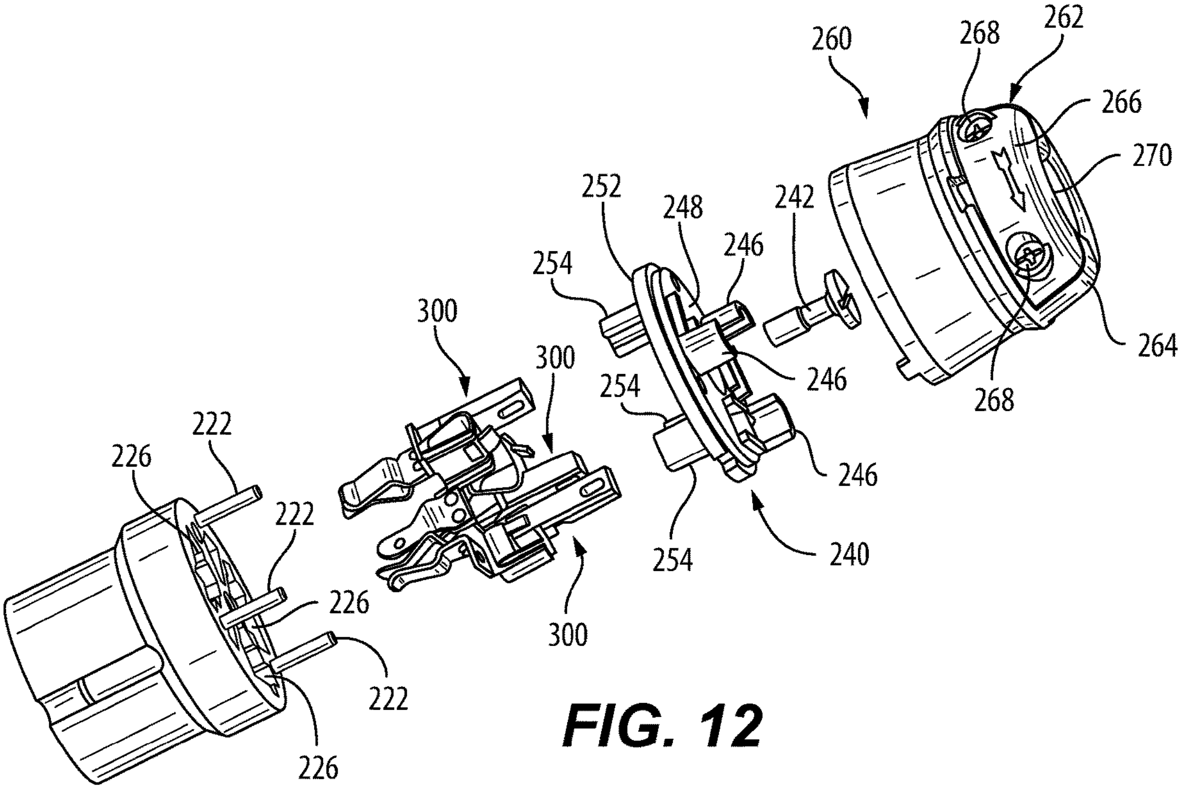
FIG. 12 is a side perspective view with parts separated of the cord connector of FIG. 10.
Figure 13:
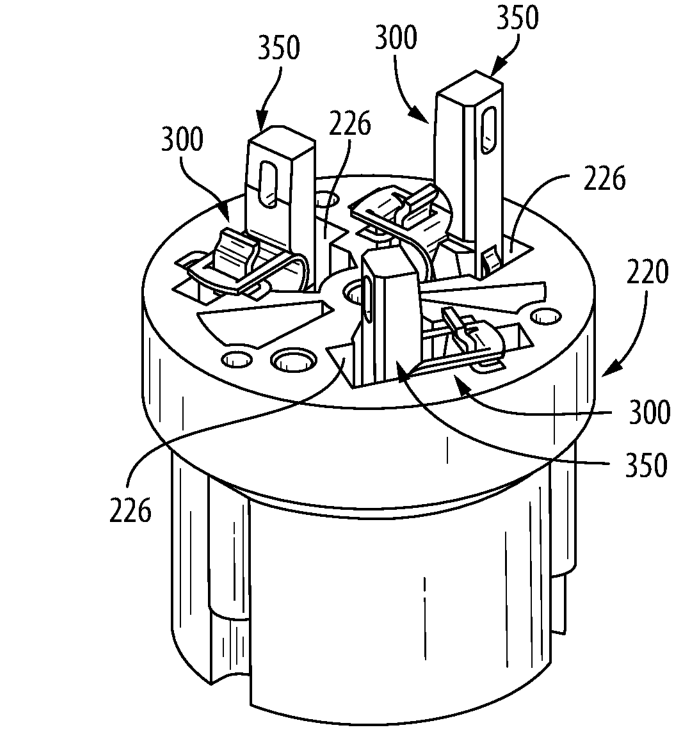
FIG. 13 is a top perspective view of a portion of the cord connector of FIG. 12, illustrating a plurality of contact assemblies within a housing of the cord connector.

The main body 220 includes a plurality of chambers or cavities 226 seen in FIGS. 12 and 13. Each cavity 226 is configured to receive and position a contact assembly 300 within the main body 220. Each contact assembly 300 is configured to receive a conductor and to mate with a contact blade of a blade-type plug connector, such as a contact blade of the plug connector of FIG. 17. The face 224 of the main body 220 has a plurality of blade-receiving slots 228 through which contact blades of a blade-type plug connector can be inserted in the usual manner into adjacent cavities 226 within the main body 220 and into a respective contact assembly 300.

Figure 10:
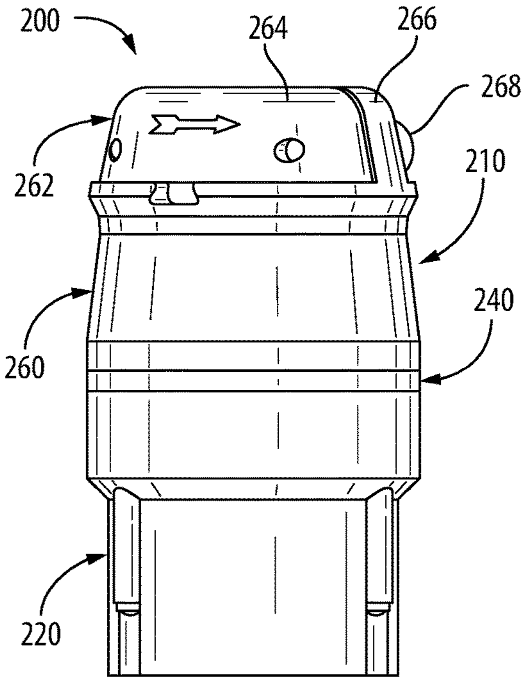
FIG. 10 is a side elevation view of an exemplary embodiment of an electrical power cord connector having the screwless connection terminals according to the present disclosure.
Figure 11:
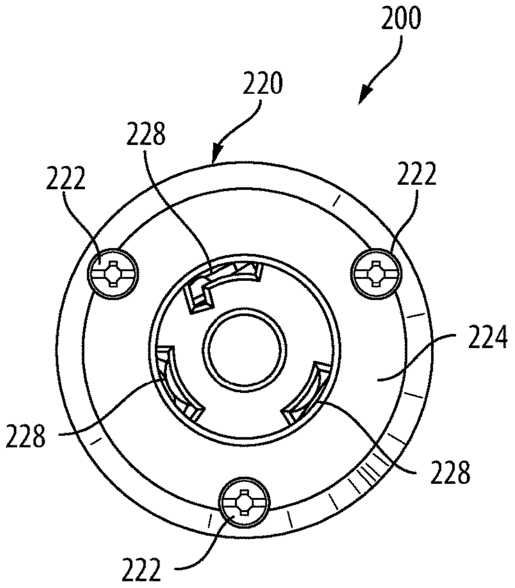
FIG. 11 is a bottom plan view of the cord connector of FIG. 10.

The cover 260 of the connector 200 may be hollow, partially hollow or solid. As shown in FIGS. 10 and 12, the cover 260 includes a cable connector 262 at a top portion of the cover 260. The cable connector 262 includes a fixed bracket 264 and a movable bracket 266 releasably secured to the fixed bracket 264 using screws 268. In a central portion of the connector 262 is a cable receiving opening 270 that extends through the cover 260. The cable receiving opening 270 permits an electrical power cord (not shown) to pass through the cover 260 so that electrical wires within the electrical power cord can be connected to the contact assemblies 300.

Figure 14:
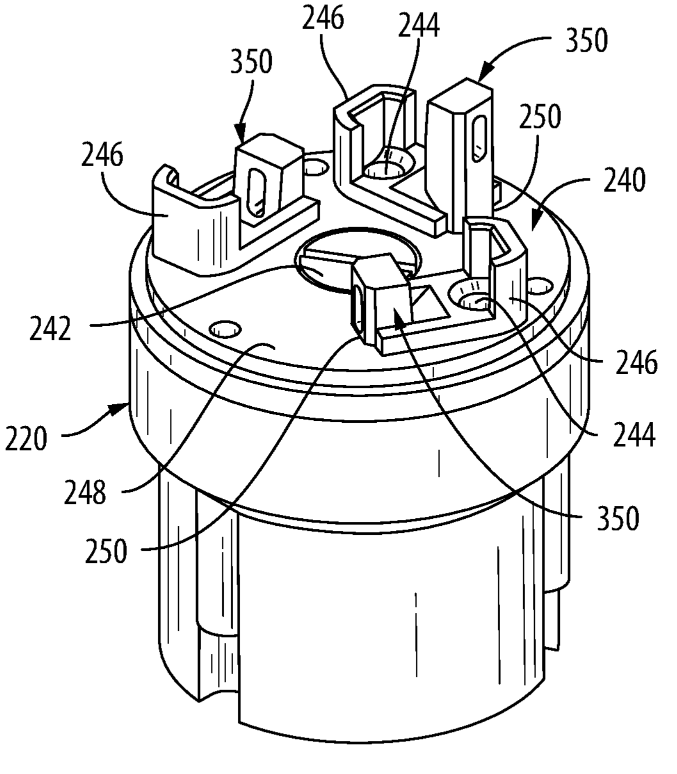
FIG. 14 is a top perspective view of the portion of the cord connector of FIG. 12 with a retainer secured to a main body of the housing.

Referring to FIGS. 12 and 14, the retainer 240 is secured to the main body 220 using mechanical fasteners, such as screw 242. The retainer 240 includes a plurality of wire receiving apertures 244. Each wire receiving aperture 244 is positioned to align with a cavity 226 in the main body 220 so that a wire can pass through the retainer 240 into a contact assembly 300 resting within a cavity 226 in the main body 220. The retainer 240 may also include a plurality of wire guides 246 extending outwardly from surface 248 of the retainer, as shown. In the embodiment shown, one wire guide 246 corresponds to one wire receiving aperture 244. Each wire guide 246 may have an arcuate like shape that corresponds to the shape of a wire being inserted into the wire receiving aperture 244. The retainer 240 also includes a plurality of plunger openings 250, seen in FIG. 14. In the embodiment shown, one plunger opening 250 corresponds to one wire receiving aperture 244. The plunger openings 250 permit a portion of a respective plunger 350 forming a portion of the contact assembly 300, described below, to extend outside the main body 220. The retainer 240 may also include a plurality of plunger guides 254 extending outwardly from surface 252 of the retainer, as shown in FIG. 12. In the embodiment shown, one plunger guide 254 corresponds to one plunger opening 250. The plunger guides 254 guide the plungers 350 as they are moved relative to the retainer 240.

Figure 15:
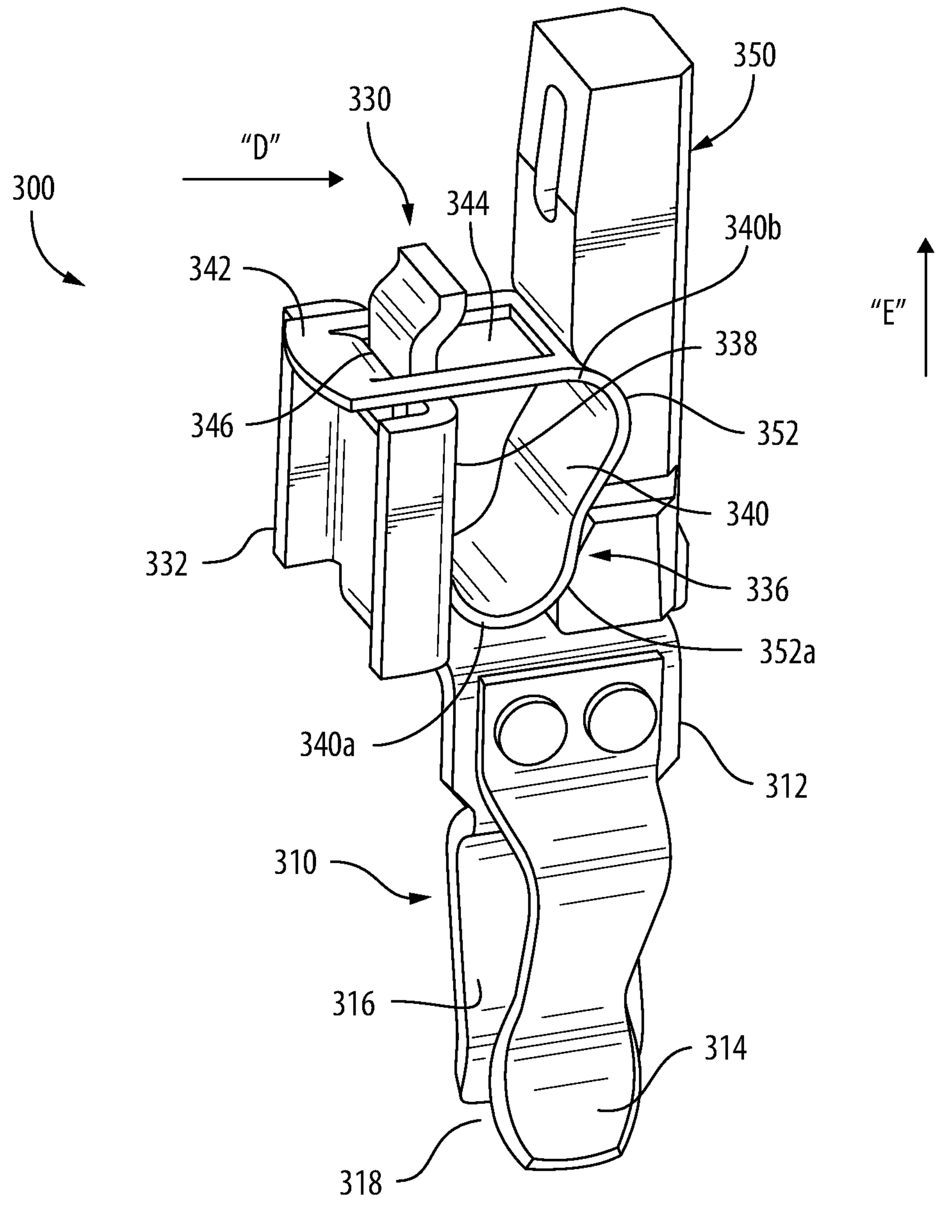
FIG. 15 is a top perspective view of an exemplary embodiment of a screwless connection terminal for the cord connector of FIG. 10 in a closed position.
Figure 16:
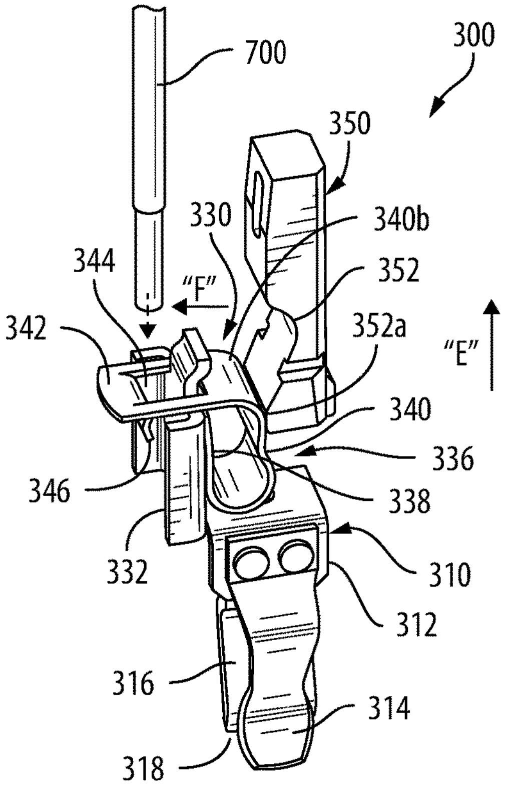
FIG. 16 is a top perspective view of the screwless connection terminal of FIG. 15 in an open position.
Figure 16A:
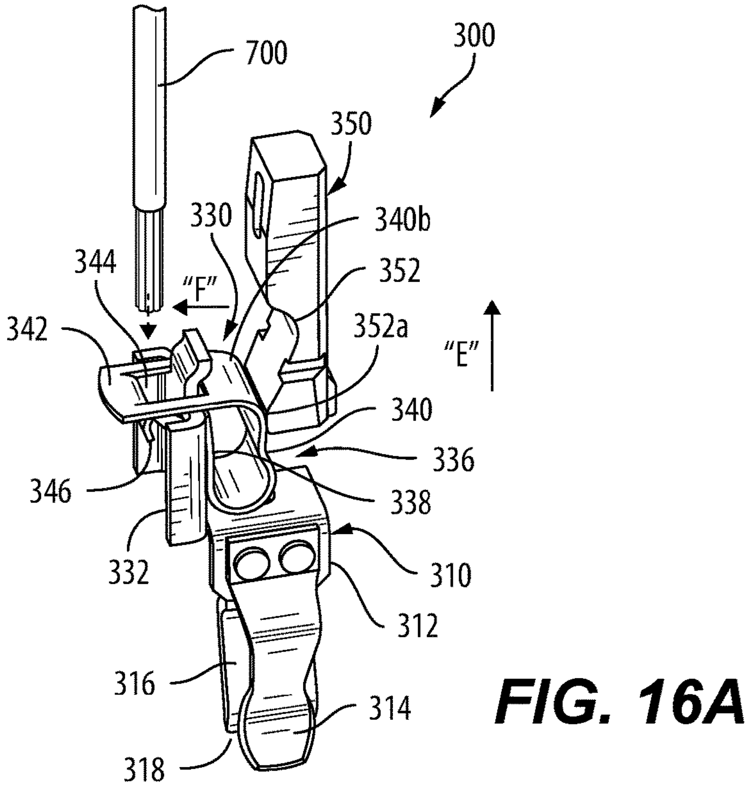
FIG. 16A is a top perspective view of the screwless connection terminal of FIG. 15A in an open position and illustrating a stranded wire ready for insertion into the screwless connection terminal.
Figure 16B:
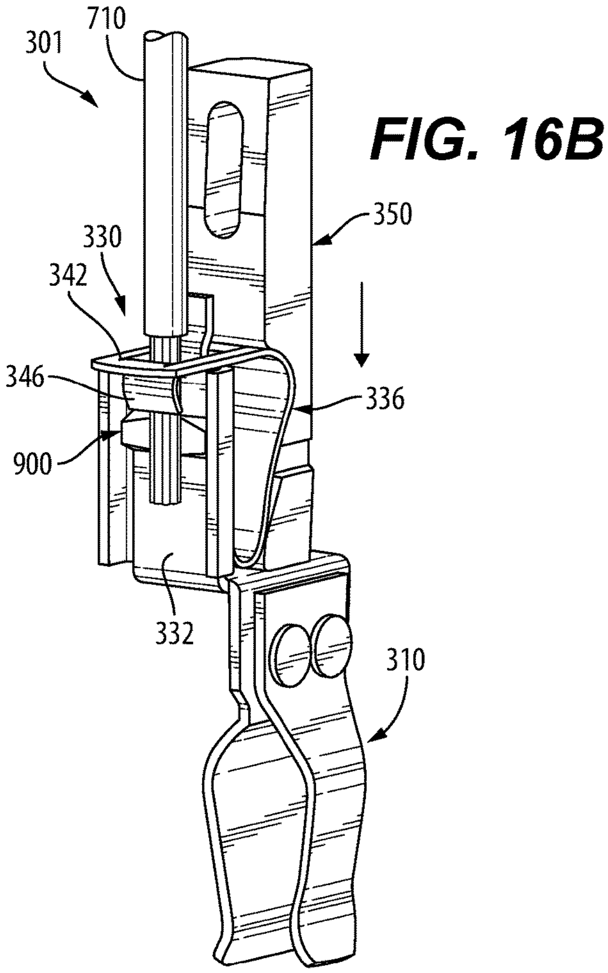
FIG. 16B is a perspective view of the screwless connection terminal of FIG. 16A with the stranded wire inserted into the screwless connection terminal and the stranded wire resting in the wire manager.
Figure 16C:
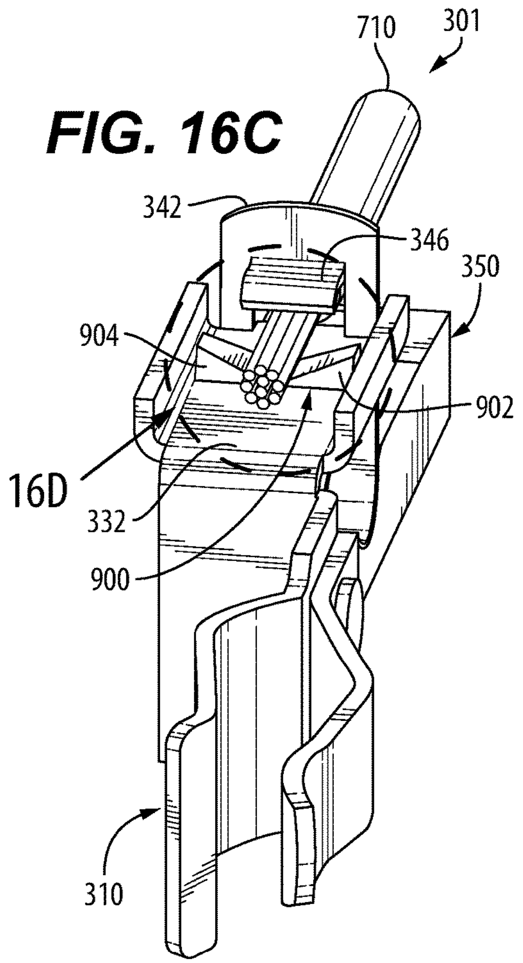
FIG. 16C is a bottom perspective view of the screwless connection terminal of FIG. 16B, illustrating the screwless connection terminal in the closed position and the stranded wire resting in the wire manager.
Figure 16D:
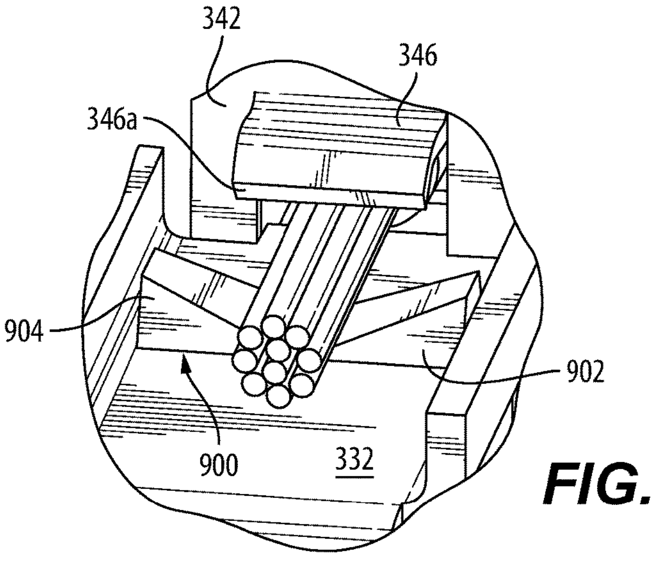
FIG. 16D is an enlarged perspective view of a portion of the screwless connection terminal of FIG. 16C taken from detail 16D, illustrating the stranded wire resting in the wire manager.

Referring to FIGS. 15 and 16, another exemplary embodiment of a contact assembly 300 according to the present disclosure is shown. In this exemplary embodiment, the contact assembly 300 includes a contact member 310, a wire terminal 330 and a plunger 350. The contact member 310 is made of an electrically conductive material, such as brass, copper or aluminum. The wire terminal 330 is made of an electrically conductive resilient material with sufficient stiffness to flex when a mechanical load is applied to the material and return to its normal position when the mechanical load is removed. An example of an electrically conductive resilient material is spring steel. The plunger 350 is made of a suitable rigid electrical insulating material, such as plastic materials. An example of a plastic material is injection molded thermoplastic. The contact member 310 and wire terminal 330 can be formed as a unitary structure, or the contact member and wire terminal can be individual components secured together by, for example, a solder joint, a brazed joint, or a welded joint.

The contact member 310 includes a contact body 312 and a pair of flexible fingers 314 and 316 extending from the contact body 312, as shown. The flexible fingers 314 and 316 form a female contact configured to engage a contact blade of a blade-type electrical power cord plug, such as a contact blade of the plug shown in FIG. 17. The distal end of the flexible fingers 314 and 316 contact each other or are in close proximity to each other to form a gripping portion 318 between the fingers. The gripping portion 318 is capable of receiving a contact blade so as to electrically couple or connect the contact member 310 to the contact blade. Thus, each contact assembly 300 is adapted to engage one of a plurality of contact blades of a blade-type electrical power cord plug.

The wire terminal 330 is a mechanical clamping terminal that uses one or more springs that can deflect under a mechanical load applied by the plunger 350 and recover to their initial shape when the mechanical load is removed. The energy stored by the one or more springs should be sufficient to apply a constant and continuous force to mechanically secure one or more wires, e.g., wire 700 shown in FIG. 16, to the wire terminal 330.

In the exemplary configuration shown in FIGS. 15 and 16, the wire terminal 330 includes a clamp brace 332 and a clamp spring 336. The clamp brace 332 is a fixed terminal body that may be a substantially planar shaped member or an arcuate shaped member secured to or integrally formed into the contact body 312 of the contact member 310. The clamp brace 332 also forms an electrically conductive path between the contact body 312 and the clamp brace 332. The clamp spring 336 includes an end portion 338, a spring member 340 and a clamp arm 342. The end portion 338 can be a substantially planar shaped member or an arcuate shaped member that is configured to mate with the clamp brace 332 and is secured to the clamp brace by, for example, a solder joint, a brazed joint, or a welded joint. The spring member 340 has a lower lobe **340*a* and an upper lobe 340*b*. The lower lobe 340*a* and the upper lobe 340*b* are configured to interact with the plunger 350 so that vertical movement of the plunger relative to the spring member 340 is translated to the application of a mechanical load on the spring member 340 or the removal of the mechanical load on the spring member 340. For example, the plunger 350 can be a rectangular shaped member having a notch 352 that is configured to receive the upper lobe 340*b* of the spring member 340, as shown in FIG. 15. The notch 352 has a camming surface 352*a* that rides along the spring member 340 when the plunger 350 is moved in the direction of arrow "E" applying a mechanical load on the spring member 340 causing the spring member 340 to deflect in the direction of arrow "F" toward the open position, seen in FIG. 16. The clamp arm 342 extends from the upper lobe 340*b* of the spring member 340 toward the clamp brace 332, as shown. The clamp arm 342 has an elongated opening 344 configured to receive a portion of the clamp brace 332 and a clamp member 346 that contacts a wire, e.g., wire 700 seen in FIG. 16, positioned between the clamp brace 332 and the clamp member 346 when the clamp spring 336 is in the closed position, seen in FIG. 15. The clamp arm 342 is movable relative to the clamp brace 332 between the closed position, seen in FIG. 15, and the open position, seen in FIG. 16**.

Turning to FIGS. 15A, 1513 and 16A-16D, another exemplary embodiment of a contact assembly 301 according to the present disclosure is shown. The contact assembly 301 is substantially similar to the contact assembly 300 such that like reference numerals are used to reference like components. The contact assembly 301 includes the contact member 310, the wire terminal 330 and the plunger 350. In this exemplary embodiment, the wire terminal 130 includes a wire manager 900.

The wire terminal 330 is a mechanical clamping terminal that uses, for example, one or more springs that can deflect under a mechanical load applied by the plunger 350 and recover to its initial shape when the mechanical load is removed. The energy stored by the one or more springs should be sufficient to apply a constant and continuous force in the range of, for example, about 5 pound force to about 35 pound force, to mechanically secure one or more wires, e.g., wire 710 shown in FIG. 16A, to the wire terminal 330. In this exemplary embodiment, the wire terminal 330 is made of an electrically conductive resilient material with sufficient stiffness to flex when a mechanical load is applied and return to its normal position when the mechanical load is removed. An example of such an electrically conductive resilient material is spring steel. In the exemplary configuration shown in FIGS. 15A and 15B, the wire terminal 330 includes the clamp brace 332, the contact arm 334 and the clamp spring 336. The clamp brace 332 is a fixed terminal body that may be a substantially planar shaped member or an arcuate shaped member secured to or integrally formed into the contact body 312 of the contact member 310. The clamp spring 336 includes an end portion, the spring member 340 and the clamp arm 342. The clamp arm 342 has the elongated opening 344 configured to receive a portion of the clamp brace 332 and the clamp member 346 that contacts a wire, e.g., the wire strands of stranded wire 710 seen in FIG. 16A, positioned within the elongated opening 344 between the clamp brace 332 and the clamp member 346 when the clamp spring 336 is in the closed position. The clamp arm 342 is movable relative to the clamp brace 332 between the closed position, seen in FIG. 15A, and the open position, seen in FIG. 16A.

In this exemplary embodiment, the clamp brace 332 has a wire manager 900 integrally or monolithically formed into the clamp brace 332. In another embodiment, the wire manager 900 may be secured to the clamp brace 332 by, for example, a solder joint, a brazed joint or a welded joint. It is to be appreciated that the wire manager 900 may also be integrally or monolithically formed into the clamp spring 336. It is also to be appreciated that the wire manager 900 may also be secured to the clamp spring 336 by, for example, a solder joint, a brazed joint or a welded joint. The wire manager 900 is provided to urge the wire, e.g., wire 700 or the wire strands of stranded wire 710, to be concentrated toward a center or middle of the clamp brace 332 and/or a center or middle of the clamp member 346. Preferably, the wire manager 900 is provided to urge wire strands of stranded wire, e.g., stranded wire 710, to be concentrated toward a center or middle the clamp brace 332 and/or a center or middle of the clamp member 346. Concentrating the wire, e.g., wire strands of stranded wire 710, toward a middle the clamp brace 332 and/or a middle of the clamp member 346 increases the force or pressure applied by the clamp member 346 of the clamp arm 342 of the clamp spring 336 to the wire. For example, concentrating the wire toward a middle the clamp brace 332 and/or a middle of the clamp member 346 can increase the force or pressure applied by the clamp member 346 by, for example, about 20 percent when compared to instances where the wire, e.g., wire 710, is not concentrated wire toward a center or middle the clamp brace 332 and/or a center or middle of the clamp member 346. This results in a higher wire retention force in the range of, for example, about 1 pound force and about 7 pound force that can be applied by the clamp spring 336 to hold the wire, e.g., the wire strands of the stranded wire 710 against the clamp brace 332. For example, in the example where the energy stored by the one or more springs should be sufficient to apply a constant and continuous force in the range of, for example, about 5 pound force to about 35 pound force, the higher wire retention force would be in the range of, for example, 6 pound force to about 42 pound force. In addition, the higher spring force or pressure on the wire also provides an improved electrical connection by lowering the contact resistance. Exemplary embodiments of the wire manager 900 are shown in FIGS. 43-47 and are described herein below. However, the present disclosure contemplates other wire manager embodiments where the wire manager urges a wire or wire strands toward a center or middle of a clamp brace and/or a center or middle of the clamp member.

As noted, the wire terminal 330 can connect to electrical conductors of different sizes. For example, if the blade-type connector 200 is rated for 15 amps, then the wire terminal 330 should also be configured and rated for at least 15 amps. The wire size, i.e., the bare conductor size, for 15 amps is 14 AWG wire such that the clamp arm 342 should be able to move to an open position where the outer diameter of 14 AWG wire can fit. As another example, if the blade-type connector 200 is rated for 20 amps, then the wire terminal 330 should also be rated for at least 20 amps. The wire size, i.e., the bare conductor size, for 20 amps is 12 AWG wire such that the clamp arm 342 should be able to move to an open position where the outer diameter of 12 AWG wire can fit. As another example, if the blade-type connector 200 is rated for 30 amps, then the wire terminal 330 should also be rated for at least 30 amps. The wire size, i.e., the bare conductor size, for 30 amps is 10 AWG wire such that the clamp arm 342 should be able to move to an open position where the outer diameter of 10 AWG wire can fit. As another example, if the blade-type connector 200 is rated for 40 amps, then the wire terminal 330 should also be rated for at least 40 amps. The wire size, i.e., the bare conductor size, for 40 amps is 8 AWG wire such that the clamp arm 342 should be able to move to an open position where the outer diameter of 8 AWG wire can fit.

As noted, the spring member 340 is made of an electrically conductive resilient material with sufficient stiffness to flex when the plunger 350 pushes the spring member 340 from the closed position to the open position while applying a biasing force (i.e., a spring force) to the clamp member 346 to secure or clamp a wire between the clamp member 346 and the clamp brace 332. As an example, the spring arm 340 can be made of metal, such as spring steel. The biasing force (or spring force) exerted by the spring arm 340 clamping a wire between the clamp member 346 and the clamp brace 332 should be sufficient to apply a constant and continuous force on the wire to electrically couple or connect the wire terminal 330 to the wire in various temperature and environmental conditions. The spring member 340 is configured so that it is normally biased toward the closed position, i.e., in the direction of arrow "D" which is away from the clamp brace 332, as seen in FIG. 15. In the spring member's 340 normal position without a conductor inserted into the elongated opening 344, the clamp member 346 of the clamp arm 342 can contact the clamp brace 332.

As described herein, the connector 200 uses the contact assemblies 300 to terminate electrical wires within the connector. To connect wires within the connector 200, an installer, e.g., an electrician, passes a wire cable through the cable receiving opening 270 in cover 260. The insulation at the end of each wire within the cable is then striped. In this exemplary embodiment, the connector 200 has three contact assemblies 300 such that three wires within the wire cable can be connected to the connector. The portion of the plungers 350 for each contact assembly 300 extending through the retainer 240 are then pulled vertically relative to a longitudinal axis of the connector 200, i.e., in the direction of arrow "E" seen in FIG. 15, to cause the camming surface 352*a* of the notch 352 in the plunger 350 to ride along the spring member 340 applying a mechanical load on the spring member 340. Applying a mechanical load to the spring member 340 in such a manner causes the spring member 340 to deflect in the direction of arrow "F" (i.e., from the closed position toward the open position), seen in FIG. 16. With the wire terminals 330 in the open position, the electrical wires are then inserted into the appropriate wire receiving aperture 244 in the retainer 240 of the connector 200. The wire receiving apertures 244 and wire guides 246 guide the bare end of the wires into the portion of the elongated opening 344 of the clamp spring 336 between clamp brace 332 and clamp member 346. When the bare end of each wire is positioned between the clamp brace 332 and the clamp member 346, the respective plunger 350 is then pushed back toward the main body 220 removing the mechanical load applied by the plunger 350 on the spring member 340 so that the energy stored by the spring member 340 biases the spring member 340 toward the closed position securing the wire between the clamp brace 332 and the clamp member 346, and completing an electrically conductive path between the wire and the contact member 310. To remove the wires from the contact assembly 300, the plungers 350 for each contact assembly 300 extending through the retainer 240 are pulled vertically relative to a longitudinal axis of the connector 200 to cause the camming surface 352*a* of the notch 352 in the plunger 350 to ride along the spring member 340 applying a mechanical load on the spring member 340 causing the spring member 340 to deflect from the closed position to the open position. With the wire terminals 330 in the open position, the electrical wires can be removed from the connector 200.

Figure 18:
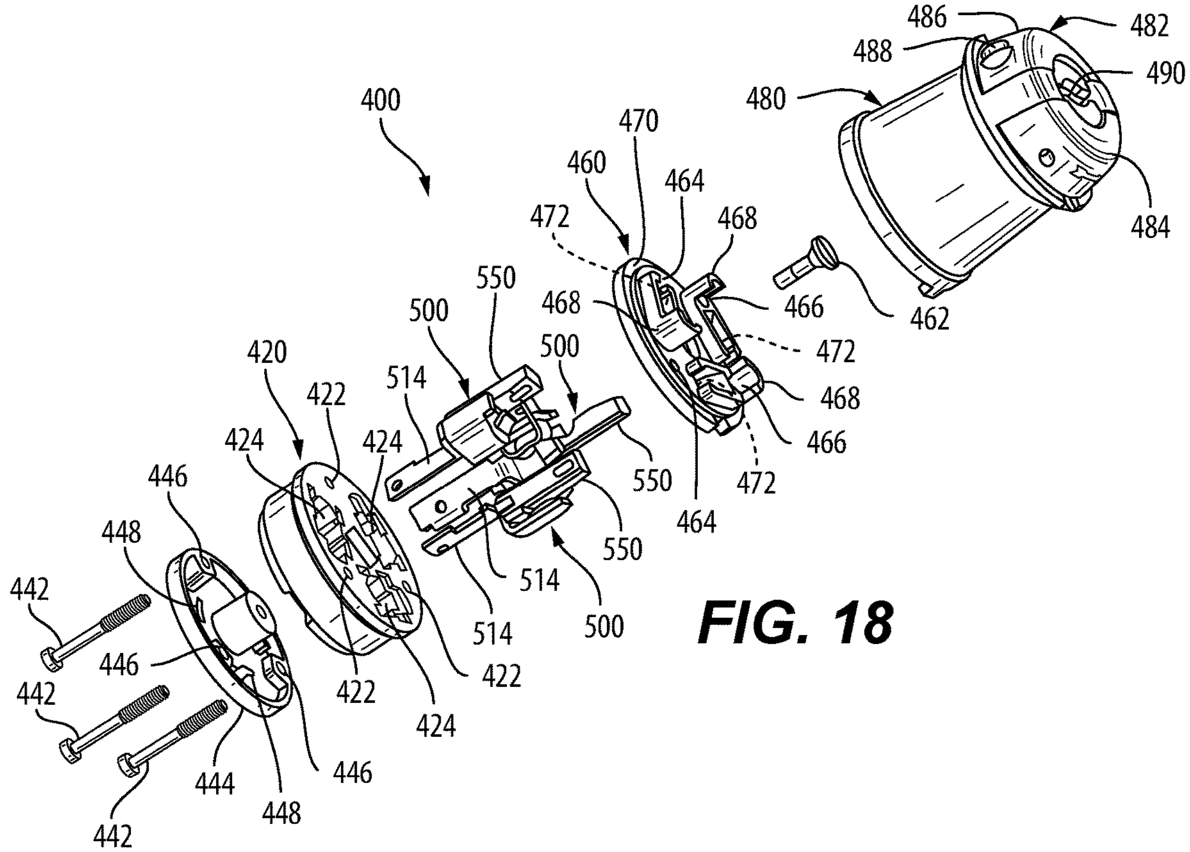
FIG. 18 is a side perspective view with parts separated of the cord plug of FIG. 17.

Referring now to FIGS. 17-22, an exemplary embodiment of a blade-type electrical power cord plug is shown. In this exemplary embodiment, the blade-type plug 400 has a housing 410 and a plurality of contact assemblies 500 within the housing 410 and extending at least partially from an exterior of the housing 410. As seen in FIG. 18, the housing 410 has a main body 420, a bottom cover 440, a retainer 460 and a top cover 480. The retainer 460 is secured to a top side of the main body 420 using screw 462. The bottom cover 440 is secured to the top cover 480 by passing screws 442 through a face 444 and apertures 446 in the bottom cover 440, through corresponding apertures 422 in the main body 420 and through corresponding apertures 464 in the retainer 460. The screws 442 are then secured to corresponding mounting holes (not shown) in the top cover 480. The housing 410 is made of a suitably rigid, electrical insulating material, such as a plastic material, or a rubber material. An example of a plastic material is injection molded thermoplastic.

Figure 19:
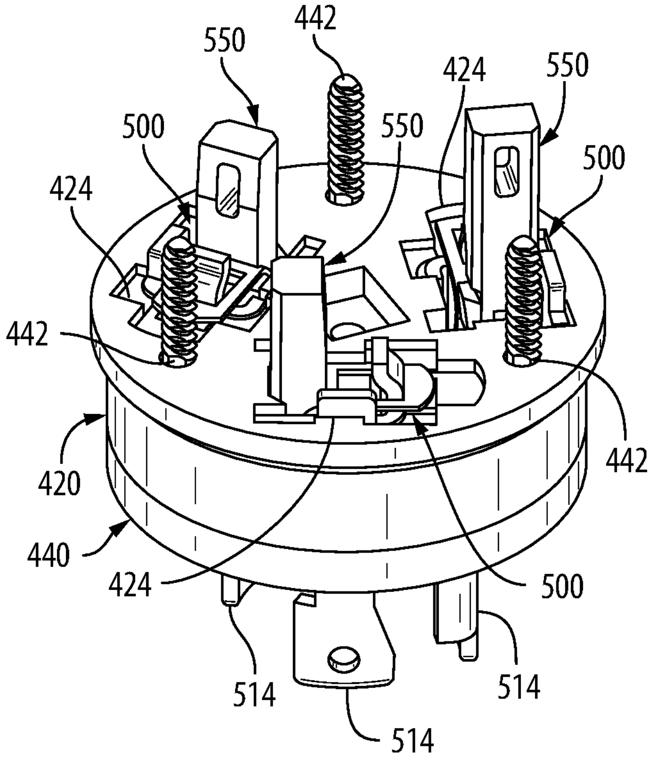
FIG. 19 is a top perspective view of a portion of the cord plug of FIG. 18, illustrating a plurality of contact assemblies in a main body of a housing of the cord plug.

The main body 420 includes a plurality of chambers or cavities 424 seen in FIGS. 18 and 19. Each cavity 424 is configured to receive and position a contact assembly 500 within the main body 420. Each contact assembly 500 is configured to receive a conductor and to mate with a female contact of a blade-type connector, such as the female contacts of FIG. 8 or 15. The face 444 of the bottom cover 440 has a plurality of blade-receiving slots 448 through which contact blades 514 of the contact assemblies 500 can be inserted so that the contact blades extend outside the housing 410.

The bottom cover 440 when secured to the top cover 480 helps hold the contact assemblies 500 within the main body 420. The top cover 480 of the connector 400 may be hollow, partially hollow or solid. As shown in FIGS. 17 and 18, the cover 480 includes a cable connector 482 at a top portion of the cover 480. The cable connector 482 includes a fixed bracket 484 and a movable bracket 486 releasably secured to the fixed bracket using screws 488. In a central portion of the connector 482 is a cable receiving opening 490 that extends through the cover 480. The cable receiving opening 490 permits an electrical power cord (not shown) to pass through the cover 480 so that electrical wires within the electrical power cord can be connected to the contact assemblies 500.

Figure 20:
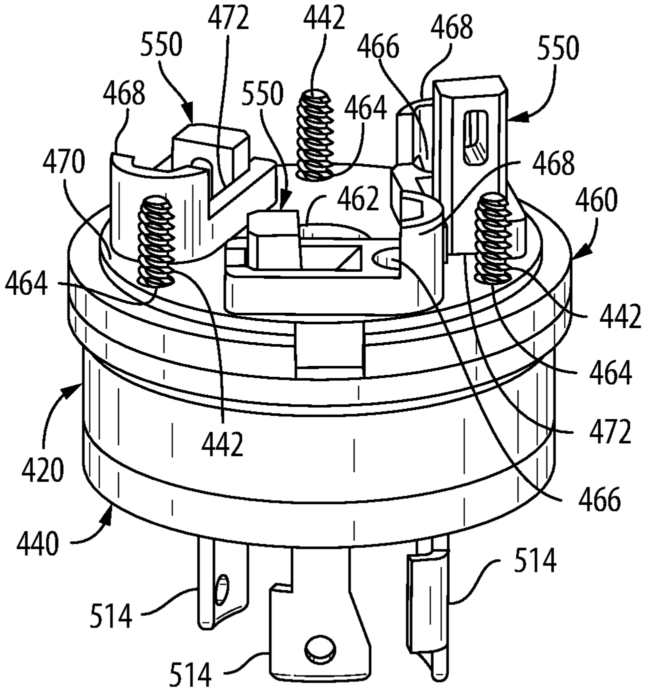
FIG. 20 is a top perspective view of the portion of the cord plug of FIG. 18 with a retainer secured to the main body of the cord plug housing.

Referring to FIGS. 18 and 20, the retainer 460 is secured to the main body 420 using mechanical fasteners, such as screw 462. The retainer 460 includes a plurality of wire receiving apertures 466. Each wire receiving aperture 466 is positioned to align with a cavity 424 in the main body 420 so that a wire can pass through the retainer 460 into a contact assembly 500 resting within a cavity 424 in the main body 420. The retainer 460 may also include a plurality of wire guides 468 extending outwardly from surface 470 of the retainer 460, as shown. In the embodiment shown, one wire guide 468 corresponds to one wire receiving aperture 466. Each wire guide 468 may have an arcuate like shape that corresponds to the shape of a wire being inserted into the wire receiving aperture 466. The retainer 460 also includes a plurality of plunger openings 472. In the embodiment shown, one plunger opening 472 corresponds to one wire receiving aperture 466. The plunger openings 472 permit a portion of a respective plunger 550 forming a portion of the contact assembly 500 described below, to extend outside the main body 420 and into the top cover 480.

Figure 21:
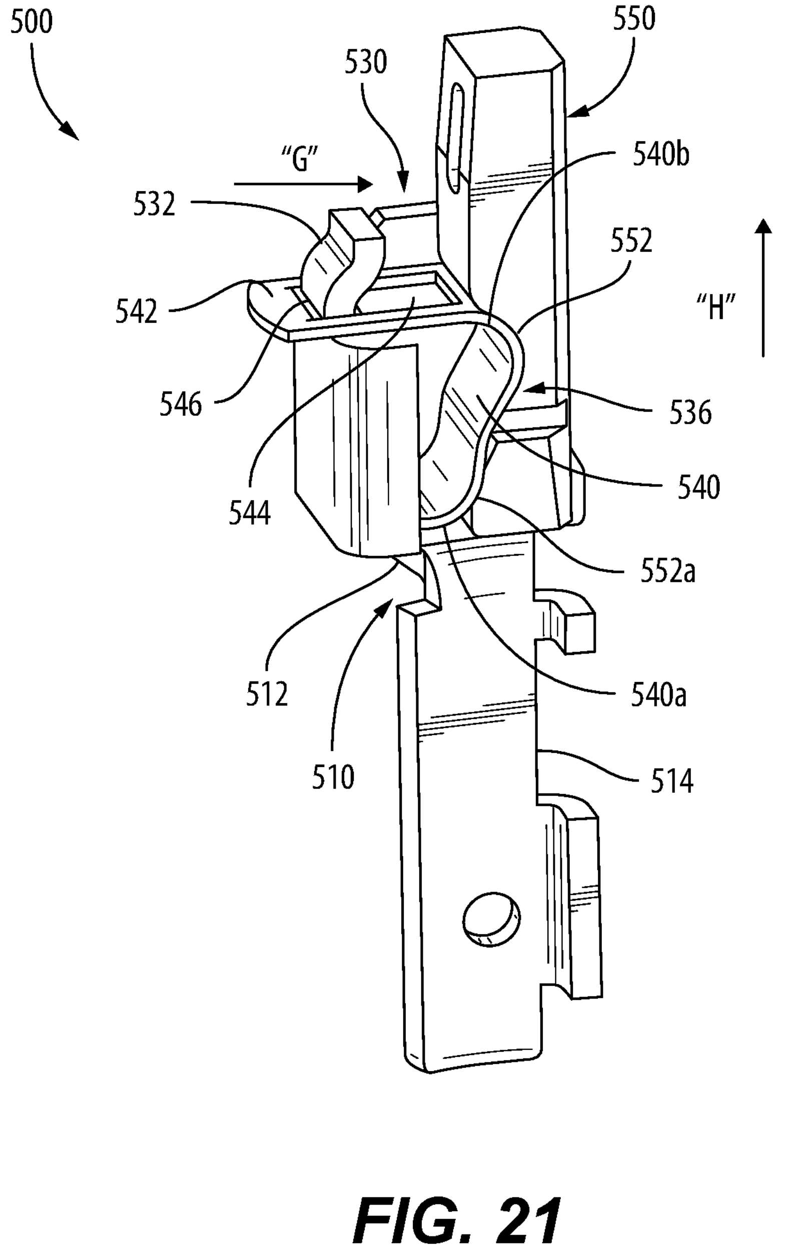
FIG. 21 is a top perspective view of an exemplary embodiment of a screwless connection terminal for the cord plug of FIG. 17 in a closed position.
Figure 22:
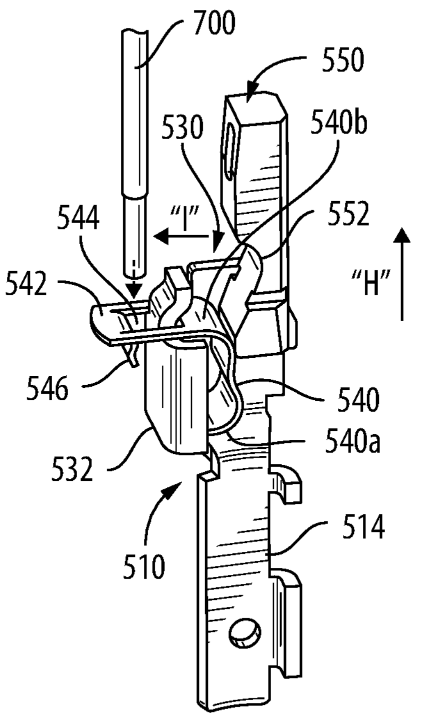
FIG. 22 is a top perspective view of the screwless connection terminal of FIG. 21 in an open position.
Figure 22A:
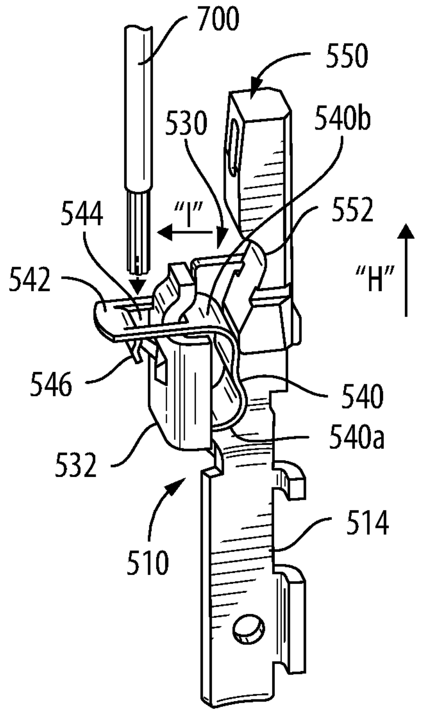
FIG. 22A is a top perspective view of the screwless connection terminal of FIG. 21A in an open position and illustrating a stranded wire ready for insertion into the screwless connection terminal.
Figure 22B:
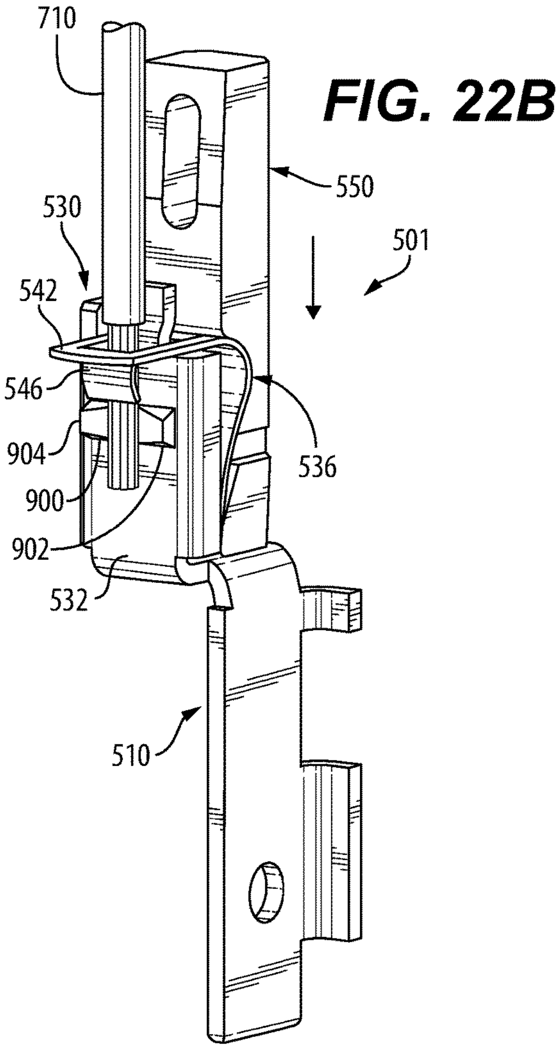
FIG. 22B is a perspective view of the screwless connection terminal of FIG. 22A with the stranded wire inserted into the screwless connection terminal and the stranded wire resting in the wire manager.
Figure 22C:
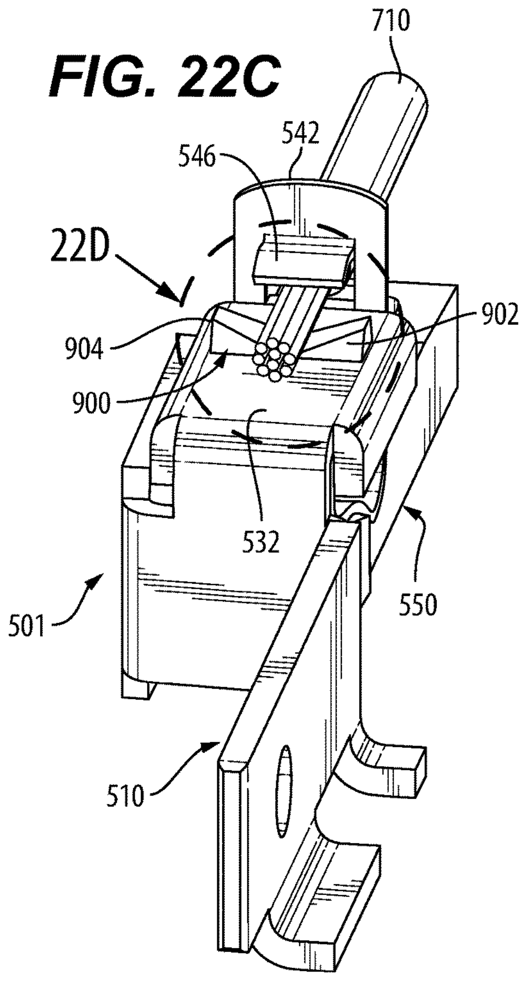
FIG. 22C is a bottom perspective view of the screwless connection terminal of FIG. 22B, illustrating the screwless connection terminal in the closed position and the stranded wire resting in the wire manager.
Figure 22D:
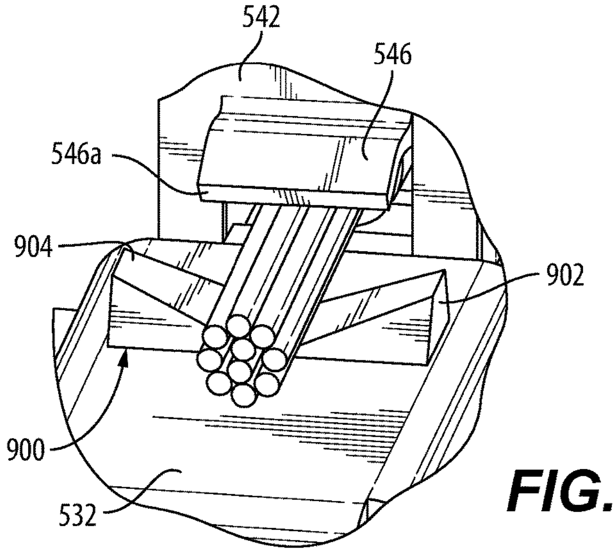
FIG. 22D is an enlarged perspective view of a portion of the screwless connection terminal of FIG. 22C taken from detail 22D, illustrating the stranded wire resting in the wire manager.

Referring now to FIGS. 21 and 22, another exemplary embodiment of a contact assembly 500 according to the present disclosure is shown. In this exemplary embodiment, the contact assembly 500 includes a contact member 510, a wire terminal 530 and a plunger 550. The contact member 510 is made of an electrically conductive material, such as brass, copper or aluminum. The wire terminal 530 is made of an electrically conductive resilient material with sufficient stiffness to flex when a mechanical load is applied and return to its normal position when the mechanical load is removed. An example of an electrically conductive resilient material is spring steel. The plunger 550 is made of a rigid electrical insulating material, such as a plastic material. An example of a plastic material is injection molded thermoplastic. The contact member 510 and wire terminal 530 can be formed as a unitary structure, or the contact member 510 and wire terminal 530 can be individual components secured together by, for example, a solder joint, a brazed joint, or a welded joint.

The contact member 510 includes a contact body 512 and a blade 514 extending from the contact body 512, as shown. The blade 514 is non-circular in shape and may be, for example, substantially flat in shape, arcuate in shape, L-shape or U-shape. The blade 514 forms a male contact configured to engage a female contact of a blade-type receptacle or a blade-type electrical power cord connector. The wire terminal 530 is a mechanical clamping terminal that uses one or more springs that can deflect under a mechanical load applied by the plunger 550 and recover to their initial shape when the mechanical load is removed. The energy stored by the one or more springs should be sufficient to apply a constant and continuous force to mechanically secure one or more wires, e.g., wire 700 shown in FIG. 22, to the wire terminal 530.

In the exemplary configuration shown in FIGS. 21 and 22, the wire terminal 530 includes a clamp brace 532 and a clamp spring 536. The clamp brace 532 is a fixed terminal body that may be a substantially planar shaped member or an arcuate shaped member secured to or integrally formed into the contact body 512 of the contact member 510. The clamp brace 532 also provides an electrically conductive path between the contact body 512 and the clamp brace 532. The clamp spring 536 includes an end portion, a spring member 540 and a clamp arm 542. The end portion can be a substantially planar shaped member or an arcuate shaped member that is configured to mate with the clamp brace 532 and is secured to the clamp brace 532 by, for example, a solder joint, a brazed joint, or a welded joint. The spring member 540 has a lower lobe 540*a* and an upper lobe 540*b*. The lower lobe 540*a* and the upper lobe 540*b* are configured to interact with the plunger 550 so that vertical movement of the plunger 550 relative to the spring member 540 is translated to the application of a mechanical load on the spring member 540 or the removal of the mechanical load on the spring member 540. For example, the plunger 550 can be a rectangular shaped member having a notch 552 that is configured to receive the upper lobe 540*b* of the spring member 540, as shown in FIG. 21. The notch 552 has a camming surface 552*a* that rides along the spring member 540 when the plunger 550 is moved in the direction of arrow "H" applying a load on the spring member 540 causing the spring member 540 to deflect in the direction of arrow "I" toward the open position, seen in FIG. 22. The clamp arm

542 extends from the upper lobe 540*b* of the spring member 540 toward the clamp brace 532, as shown. The clamp arm 542 has an elongated opening 544 configured to receive a portion of the clamp brace 532 and a clamp member 546 that contacts a wire, e.g., wire 700 seen in FIG. 22, positioned between the clamp brace 532 and the clamp member 546 when the clamp spring 536 is in the closed position. The clamp arm 542 is movable relative to the clamp brace 532 between the closed position, seen in FIG. 21, and the open position, seen in FIG. 22.

Turning to FIGS. 21A, 21B and 22A-22D, another exemplary embodiment of a contact assembly 501 according to the present disclosure is shown. The contact assembly 501 is substantially similar to the contact assembly 500 such that like reference numerals are used to reference like components. The contact assembly 501 includes the contact member 510, the wire terminal 530 and the plunger 550. In this exemplary embodiment, the wire terminal 530 includes a wire manager 900.

The wire terminal 530 is a mechanical clamping terminal that uses, for example, one or more springs that can deflect under a mechanical load applied by the plunger 550 and recover to its initial shape when the mechanical load is removed. The energy stored by the one or more springs should be sufficient to apply a constant and continuous force in the range of, for example, about 5 pound force to about 35 pound force, to mechanically secure one or more wires, e.g., wire 710 shown in FIG. 22A, to the wire terminal 530. In this exemplary embodiment, the wire terminal 530 is made of an electrically conductive resilient material with sufficient stiffness to flex when a mechanical load is applied and return to its normal position when the mechanical load is removed. An example of such an electrically conductive resilient material is spring steel.

In the exemplary configuration shown in FIGS. 21A and 21B, the wire terminal 530 includes the clamp brace 532 and a clamp spring 536. The clamp brace 532 is a fixed terminal body that may be a substantially planar shaped member or an arcuate shaped member secured to or integrally formed into the contact body 512 of the contact member 510. The clamp spring 536 includes an end portion, the spring member 540 and the clamp arm 542. The clamp arm 542 has an elongated opening 544 configured to receive a portion of the clamp brace 532 and the clamp member 546 that contacts a wire, e.g., wire 710 seen in FIG. 22A, positioned within the elongated opening 544 between the clamp brace 532 and the clamp member 546 when the clamp spring 536 is in the closed position. The clamp arm 542 is movable relative to the clamp brace 532 between the closed position, seen in FIG. 21A, and the open position, seen in FIG. 22A.

In this exemplary embodiment, the clamp brace 532 has a wire manager 900 integrally or monolithically formed into the clamp brace 532. In another embodiment, the wire manager 900 may be secured to the clamp brace 532 by, for example, a solder joint, a brazed joint or a welded joint. It is to be appreciated that the wire manager 900 may also be integrally or monolithically formed into the clamp spring 536. It is also to be appreciated that the wire manager 900 may also be secured to the clamp spring 536 by, for example, a solder joint, a brazed joint or a welded joint. The wire manager 900 is provided to urge the wire, e.g., wire 700 or the wire strands of the stranded wire 710, to be concentrated toward a center or middle of the clamp brace 532 and/or a center or middle of the clamp member 546. Preferably, the wire manager 900 is provided to urge wire strands of stranded wire, e.g., stranded wire 710, to be concentrated toward a center or middle the clamp brace 532 and/or a center or middle of the clamp member 546. Concentrating the wire, e.g., wire strands of stranded wire 710, toward a middle the clamp brace 532 and/or a middle of the clamp member 546 increases the force or pressure applied by the clamp member 546 of the clamp arm 542 of the clamp spring 536 to the wire. For example, concentrating the wire toward a middle the clamp brace 532 and/or a middle of the clamp member 546 can increase the force or pressure applied by the clamp member 546 by, for example, about 20 percent when compared to instances where the wire, e.g., wire 710, is not concentrated wire toward a center or middle the clamp brace 532 and/or a center or middle of the clamp member 546. This results in a higher wire retention force in the range of, for example, about 1 pound force and about 7 pound force that can be applied by the clamp spring 536 to hold the wire, e.g., the wire strands of the stranded wire 710 against the clamp brace 532. For example, in the example where the energy stored by the one or more springs should be sufficient to apply a constant and continuous force in the range of, for example, about 5 pound force to about 35 pound force, the higher wire retention force would be in the range of, for example, 6 pound force to about 42 pound force. In addition, the higher spring force or pressure on the wire also provides an improved electrical connection by lowering the contact resistance. Exemplary embodiments of the wire manager 900 are shown in FIGS. 43-47 and are described herein below. However, the present disclosure contemplates other wire manager embodiments where the wire manager 900 urges a wire or wire strands toward a center or middle of a clamp brace and/or a center or middle of the clamp member.

As noted, the wire terminal 530 can connect to electrical conductors of different sizes. For example, if the plug 400 is rated for 15 amps, then the wire terminal 530 should also be configured and rated for at least 15 amps. The wire size, i.e., the bare conductor size, for 15 amps is 14 AWG wire such that the clamp arm 542 should be able to move to an open position where the outer diameter of 14 AWG wire can fit. As another example, if the plug 400 is rated for 20 amps, then the wire terminal 530 should also be rated for at least 20 amps. The wire size, i.e., the bare conductor size, for 20 amps is 12 AWG wire such that the clamp arm 542 should be able to move to an open position where the outer diameter of 12 AWG wire can fit. As another example, if the plug 400 is rated for 30 amps, then the wire terminal 530 should also be rated for at least 30 amps. The wire size, i.e., the bare conductor size, for 30 amps is 10 AWG wire such that the clamp arm 542 should be able to move to an open position where the outer diameter of 10 AWG wire can fit. As another example, if the plug 400 is rated for 40 amps, then the wire terminal 530 should also be rated for at least 40 amps. The wire size, i.e., the bare conductor size, for 40 amps is 8 AWG wire such that the clamp arm 542 should be able to move to an open position where the outer diameter of 8 AWG wire can fit.

As noted, the spring member 540 is made of an electrically conductive resilient material with sufficient stiffness to flex when the plunger 550 pushes the spring member 540 from the closed position to the open position while applying a biasing force (i.e., a spring force) to the clamp member 546 to secure or clamp a wire between the clamp member 546 and the clamp brace 532. As an example, the spring arm 540 can be made of metal, such as spring steel. The biasing force exerted by the spring arm 540 clamping a wire between the clamp member 546 and the clamp brace 532 should be sufficient to apply a constant and continuous force on the wire to electrically couple or connect the wire terminal 530 to the wire in various temperature and environmental conditions. The spring member 540 is configured so that it is normally biased toward the closed position, i.e., in the direction of arrow "G" which is away from the clamp brace 532, as seen in FIG. 21. In the spring member's 540 normal position without a conductor inserted into the elongated opening 544, the clamp member 546 of the clamp arm 542 can contact the clamp brace 532.

As described herein, the plug 400 uses the contact assemblies 500 to terminate electrical wires within the blade-type plug. To connect wires within the plug 400, an installer passes a wire cable through the cable receiving opening 490 in cover 480. The insulation at the end of each wire within the cable is then striped. In this exemplary embodiment, the plug 400 has three contact assemblies 500 such that three wires within the wire cable can be connected to the plug 400. The portion of the plunger 550 for each contact assembly 500 extending through the retainer 460 are then pulled vertically relative to a longitudinal axis of the plug 400, i.e., in the direction of arrow "H" seen in FIGS. 21 and 22, to cause the camming surface 552*a* of the notch 552 in the plunger 550 to ride along the spring member 540 applying a mechanical load to the spring member 540. Applying such mechanical load to the spring member 540 causes the spring member 540 to deflect in the direction of arrow "I" (i.e., from the closed position toward the open position). With the wire terminals 530 in the open position, the electrical wires are then inserted into the appropriate wire receiving aperture 466 in the retainer 460. The wire receiving apertures 466 and wire guides 468 guide the bare end of the wires into the portion of the elongated opening 544 of the clamp spring 536 between clamp brace 532 and clamp member 546. When the bare end of each wire is positioned between the clamp brace 532 and the clamp member 546, the respective plunger 550 is then pushed back toward the main body 420 removing the mechanical load applied by the plunger 550 on the spring member 540 so that the energy stored by the spring member biases the spring member to the closed position securing the wire between the clamp brace 532 and the clamp member 546, and completing an electrically conductive path between the wire and the contact member 510. To remove the wires from the contact assembly 500, the plungers 550 for each contact assembly 500 extending through the retainer 460 are pulled vertically relative to a longitudinal axis of the plug 400 to cause the camming surface 552*a* of the notch 552 in the plunger 550 to ride along the spring member 540 applying a mechanical load on the spring member 540 causing the spring member 540 to deflect from the closed position toward the open position. With the wire terminals 530 in the open position, the electrical wires can be removed from the plug 400.

Referring now to FIGS. 23-26, an exemplary embodiment of a non-locking blade type electrical receptacle is shown. In this exemplary embodiment, the receptacle 600 has a housing 620 and a plurality of contact assemblies, which are similar to the contact assemblies 100, described herein and shown in FIGS. 8 and 9, within the housing that are accessible from an exterior of the housing. The housing 620 has a main body 630, a front cover 650 and a rear cover 670. The front cover 650 is secured to one side of the main body 630 and the rear cover 670 is secured to the other side of the main body. The housing 620 is made of a suitable electrical insulating material, such as plastic, including injection molded thermoplastic, and is configured to fit within an electrical box.

Figure 26:
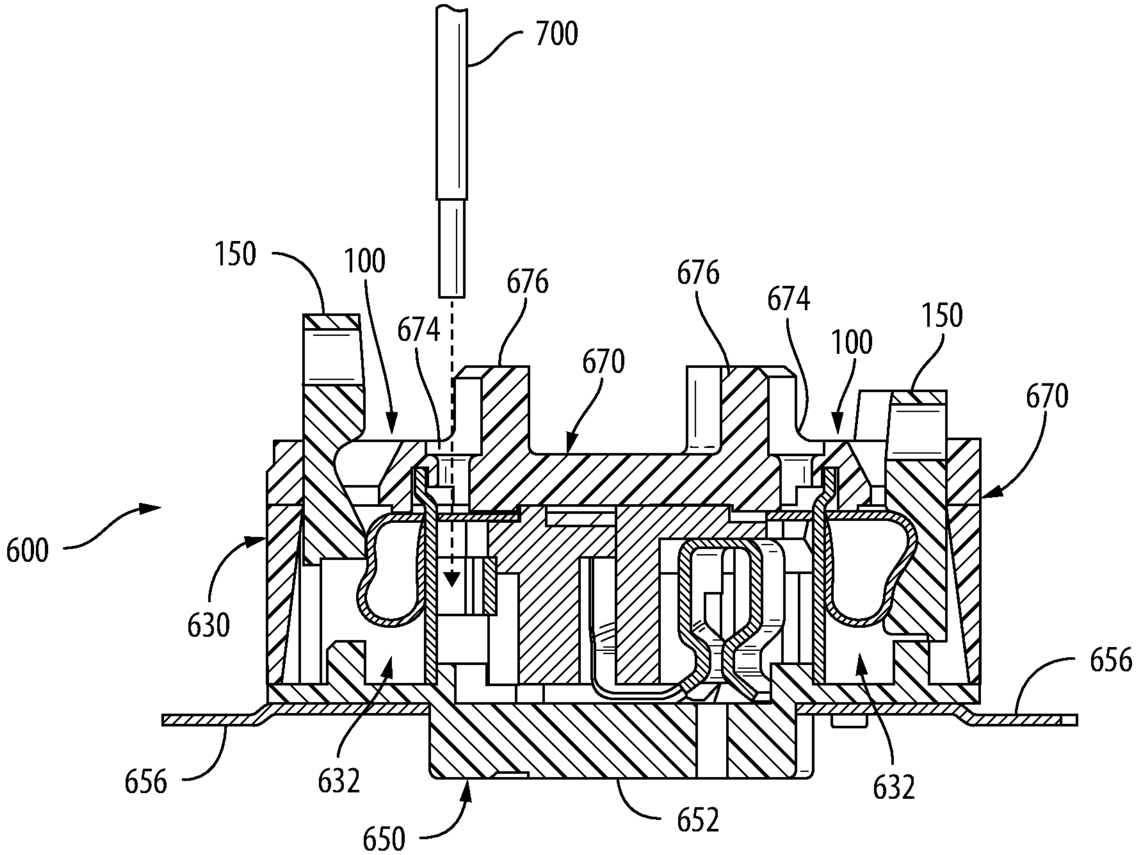
FIG. 26 is a cross sectional view of the receptacle of FIG. 25 taken along line 26-26.

The main body 630 includes a plurality of chambers or cavities 632, seen in FIG. 26. Each cavity 632 is configured to receive and position a contact assembly 100 within the main body 630, as shown in FIG. 26. Each contact assembly 100 is configured to receive a wire, such as wire 700, and to mate with a contact blade of a conventional plug connector as described above.

Figure 23:
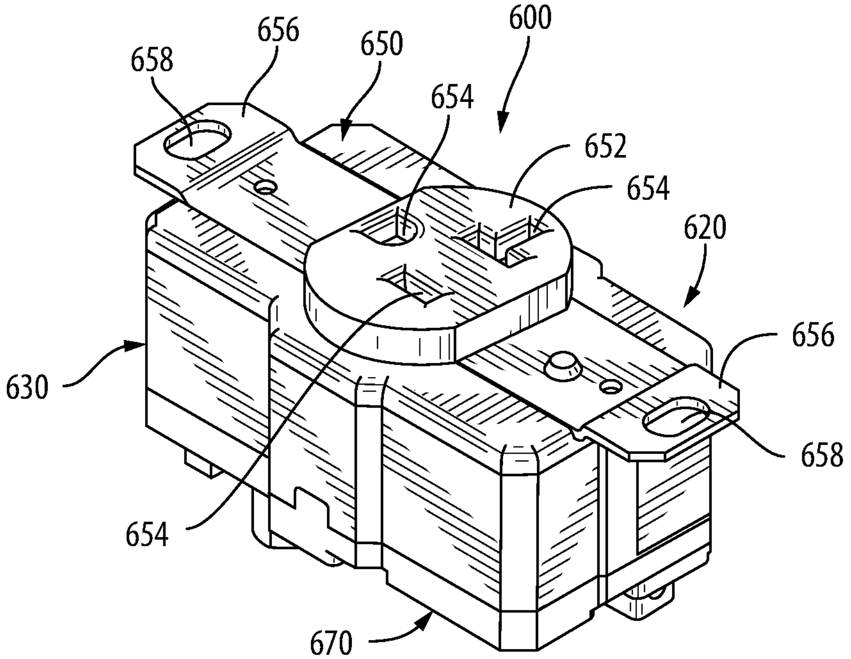
FIG. 23 is a top perspective view if another exemplary embodiment of an electrical receptacle having screwless connection terminals according to the present disclosure.

As shown in FIG. 23, the front cover 650 of the receptacle 600 includes a face 652 having a plurality of blade-receiving slots 654 through which contact blades (e.g., hot, neutral and ground contact blades) of a plug connector can be inserted in the usual manner into adjacent cavities 632 within the main body 630. The front cover 650 has one or more mounting straps 656 that are secured to an exterior surface of the front cover 650 using, for example, mechanical fasteners or adhesives. The mounting straps 656 are used to secure the receptacle 600 to an electrical box via apertures 658 as is known. The mounting straps 656 may also be connected to electrical ground via a contact assembly 100 within the main body 630. The front cover 650 can be secured to the main body 630 using mechanical fasteners, adhesives or welds such as sonic welds.

Figure 24:
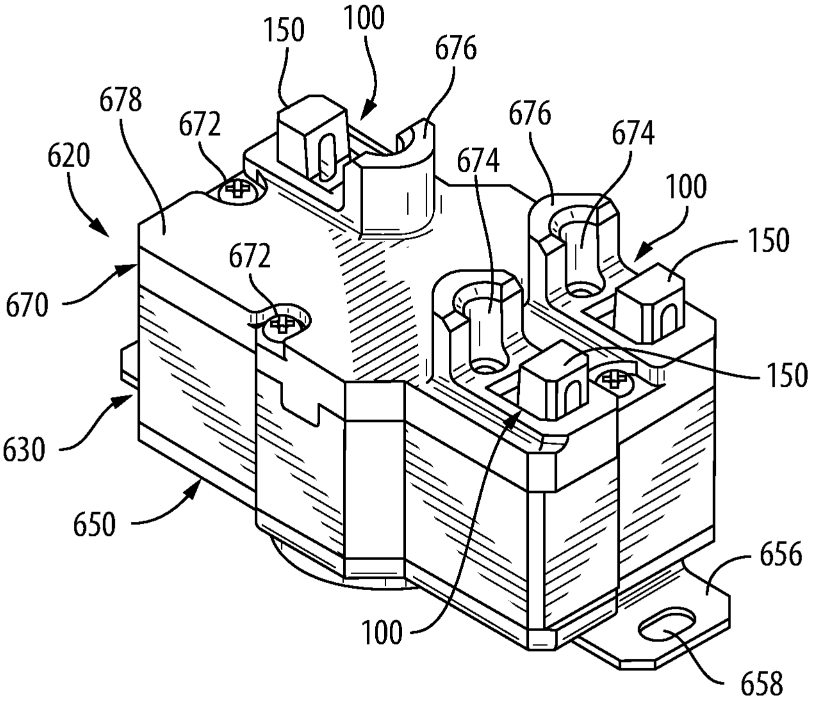
FIG. 24 is a bottom perspective view of the receptacle of FIG. 23.
Figure 25:
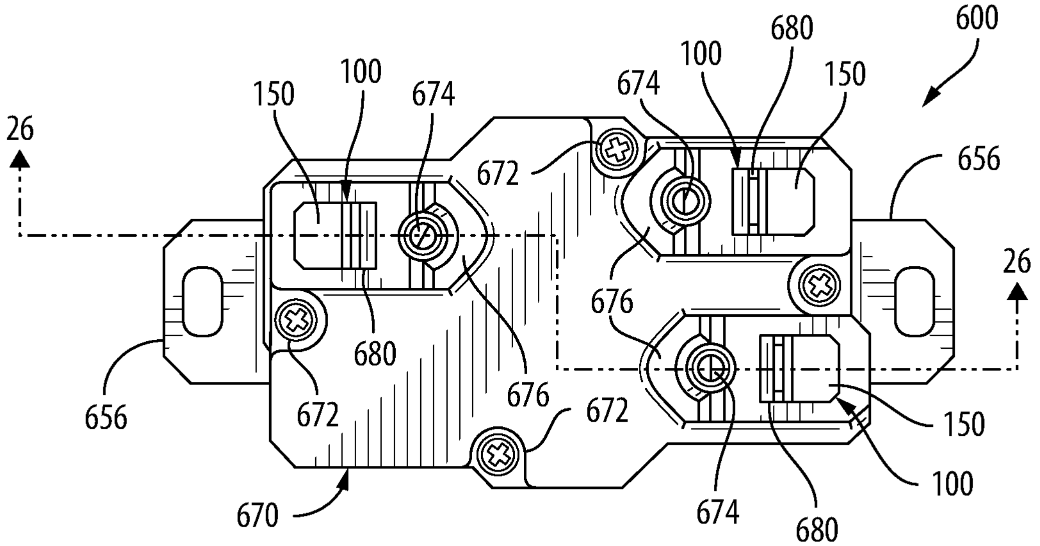
FIG. 25 is a bottom plan view of the receptacle of FIG. 24.

Referring to FIGS. 24 and 25, the rear cover 670 can be secured to the main body 630 using mechanical fasteners, such as screws 672, adhesives or welds such as sonic welds. The rear cover 670 includes a plurality of wire receiving apertures 674. Each wire receiving aperture 674 is positioned to align with a cavity 632 in the main body 630 so that a wire can pass through the rear cover 670 into a contact assembly 100 resting within a cavity 632 in the main body 630. The rear cover 670 may also include a plurality of wire guides 76 extending outwardly from an exterior surface 678 of the rear cover 670, as shown. In the embodiment shown, one wire guide 676 corresponds to one wire receiving aperture 674. Each wire guide 676 has an arcuate shape that corresponds to the round shape of a wire being inserted into the wire receiving aperture 674. The rear cover 670 also includes a plurality of plunger openings 680, seen in FIG. 25, that permits a portion of a plunger 150, forming a portion of the contact assembly 100 described above, to extend outside the housing 620.

Figure 29:
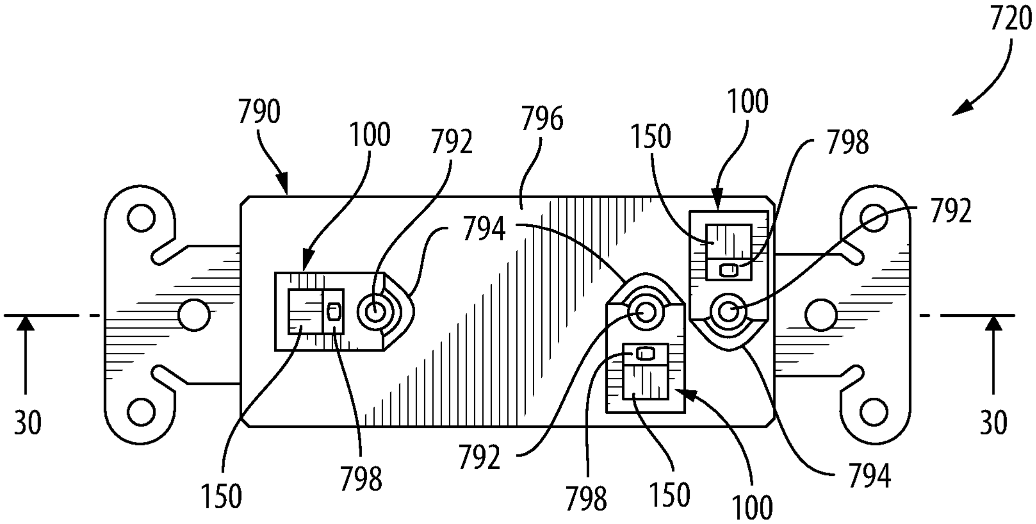
FIG. 29 is a bottom plan view of the switch of FIG. 28.
Figure 30:
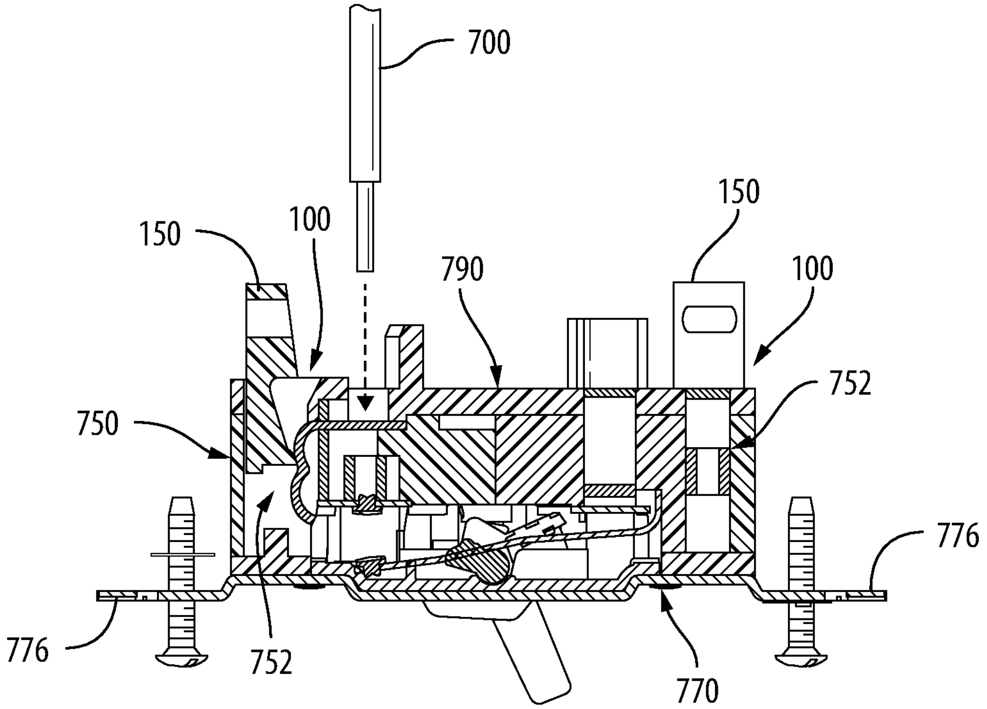
FIG. 30 is a cross sectional view of the switch of FIG. 29 taken along line 30-30.
Figure 31:
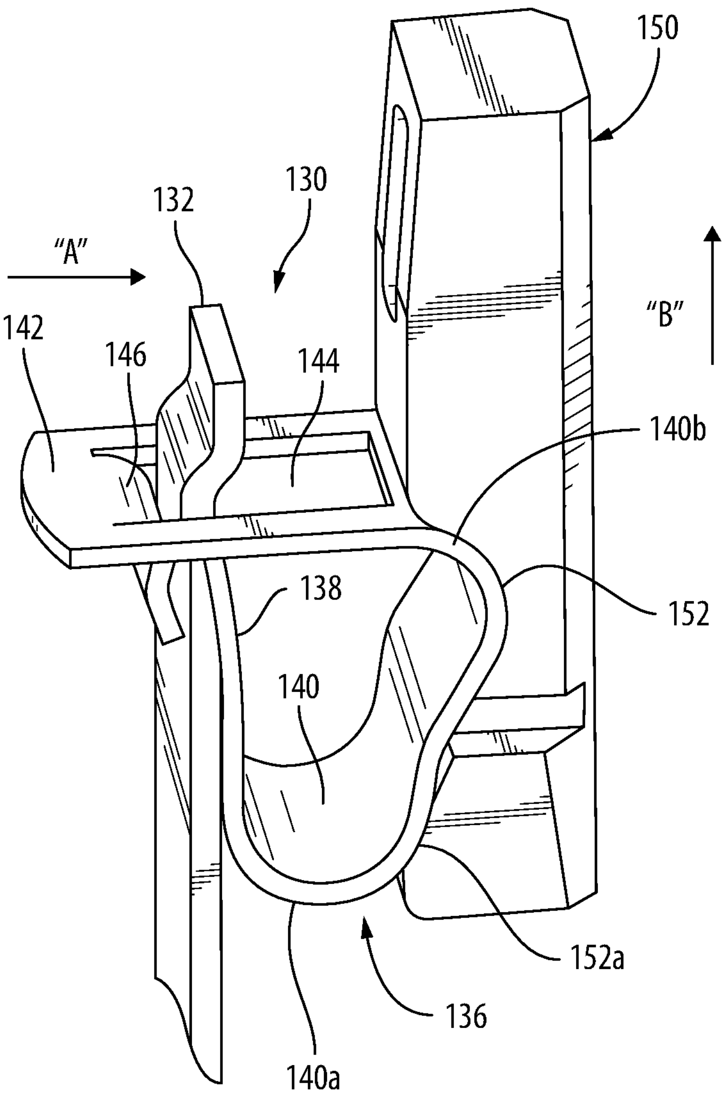
FIG. 31 is a top perspective view of another exemplary embodiment of a screwless connection terminal for the electrical switch of FIG. 27 in a closed position.
Figure 32:
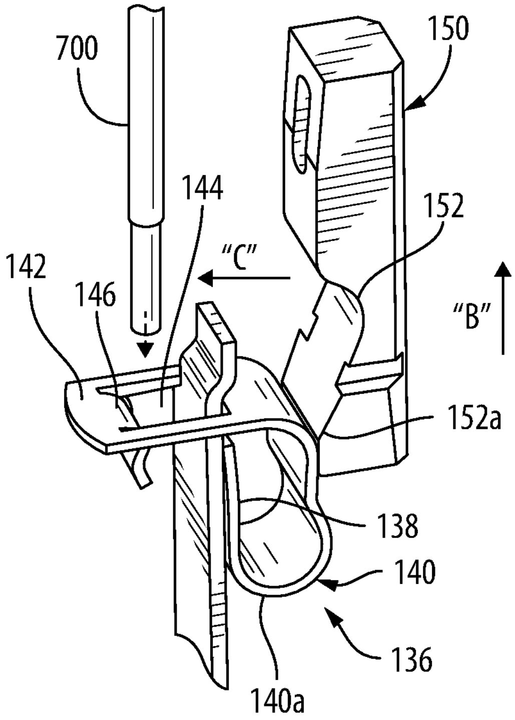
FIG. 32 is a top perspective view of the screwless connection terminal of FIG. 31 in an open position.
Figure 32A:
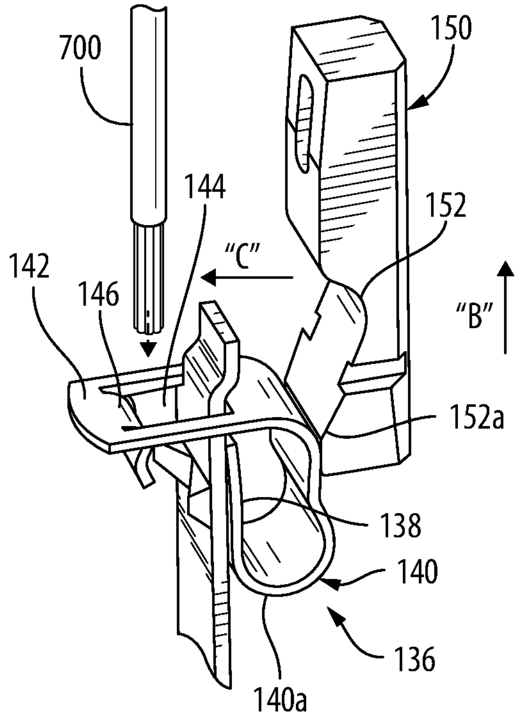
FIG. 32A is a top perspective view of the screwless connection terminal of FIG. 31A in an open position and illustrating a stranded wire ready for insertion into the screwless connection terminal.
Figure 33:
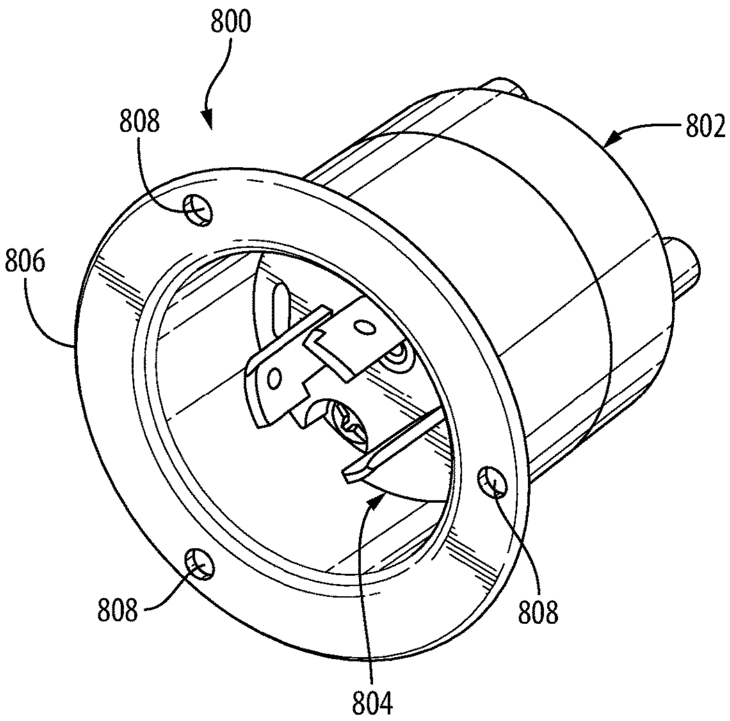
FIG. 33 is a perspective view of an exemplary embodiment of an electrical male flanged inlet having screwless connection terminals according to the present disclosure, illustrating a plug assembly within an inlet housing.
Figure 34:
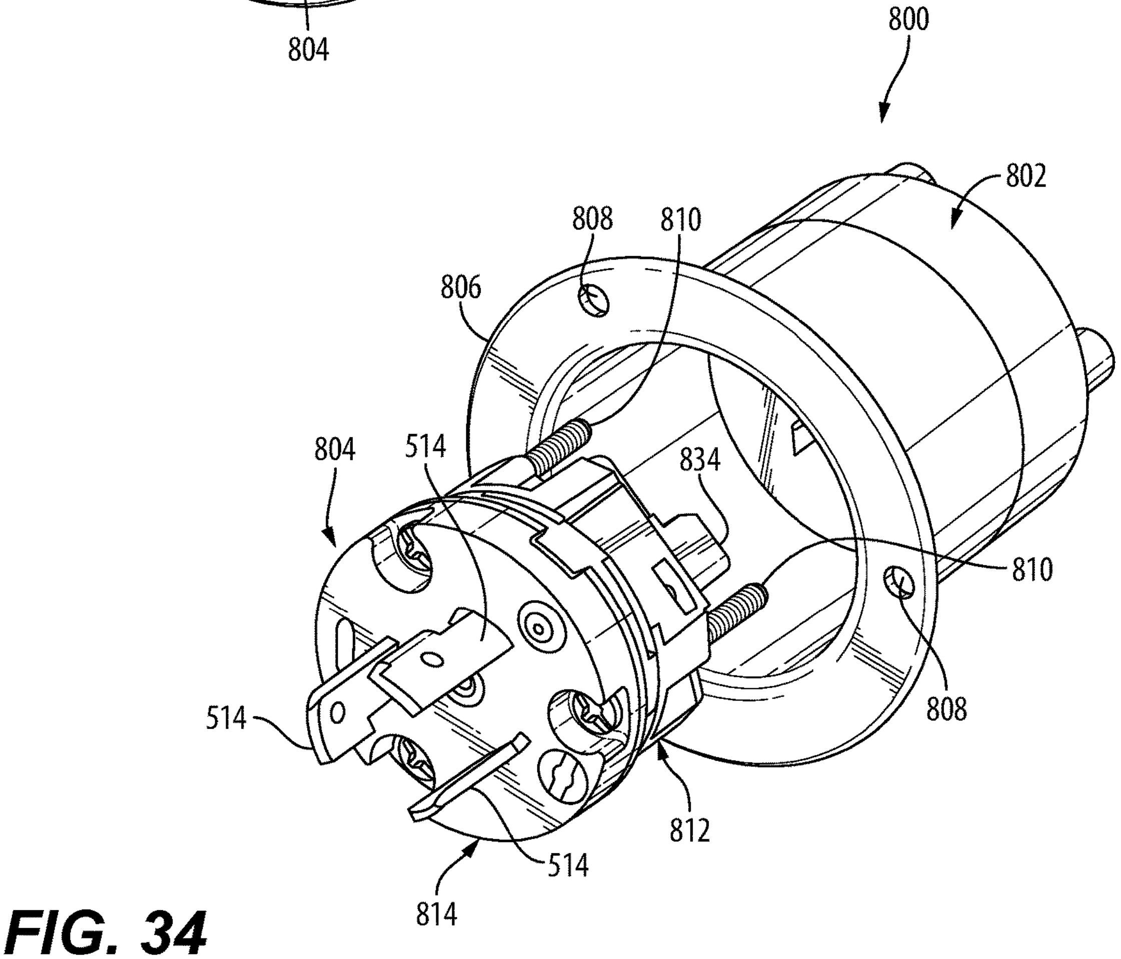
FIG. 34 is a perspective view of the electrical male flanged inlet of FIG. 33, illustrating the plug assembly separated from the inlet housing.

Referring now to FIGS. 27-30, an exemplary embodiment of a switch is shown. In this exemplary embodiment, the switch 720 has a housing 740 and a plurality of contact assemblies, which are similar to the contact assemblies 100, described herein and shown in FIGS. 8 and 9, within the housing 740 that are accessible from an exterior of the housing 740. However, in this embodiment, the contact assemblies 100 would not include the contact member 110 and contact arm 134, as seen in FIGS. 31 and 32. Instead the clamp brace 132 would connect to respective switch contacts and/or ground connections within the housing 740.

Another exemplary embodiment of a contact assembly 103 according to the present disclosure that may be used with the switch 720 is shown in FIGS. 31A, 31B and 32A-32D. The contact assembly 103 is substantially similar to the contact assembly 100 such that like reference numerals are used to reference like components. The contact assembly 103 includes the wire terminal 130 and the plunger 150. However, in this embodiment, the contact assemblies 103 would not include the contact member 110 and contact arm 134. Instead, the clamp brace 132 would connect to respective switch contacts and/or ground connections within the housing 740 of the switch 720. In addition, the wire terminal 130 would include the wire manager 900. As described above, the clamp brace 132 has the wire manager 900 integrally or monolithically formed into the clamp brace 132. However, the wire manager 900 may be secured to the clamp brace 132 by, for example, a solder joint, a brazed joint or a welded joint. It is to be appreciated that the wire manager 900 may also be integrally or monolithically formed into the clamp spring 136. It is also to be appreciated that the wire manager 900 may also be secured to the clamp spring 136 by, for example, a solder joint, a brazed joint or a welded joint. The wire manager 900 is provided to cause the wire, e.g., wire 700 or the wire strands of the stranded wire 710, to be concentrated toward a center or middle of the clamp brace 132 and/or a center or middle of the clamp member 146. Preferably, the wire manager 900 is provided to cause wire strands of stranded wire, e.g., stranded wire 710, to be concentrated toward a center or middle the clamp brace 132 and/or a center or middle of the clamp member 146. Concentrating the wire, e.g., wire strands of stranded wire 710, toward a middle the clamp brace 132 and/or a middle of the clamp member 146 increases the force or pressure applied by the clamp member 146 of the clamp arm 142 of the clamp spring 136 to the wire. For example, concentrating the wire toward a middle the clamp brace 132 and/or a middle of the clamp member 146 can increase the force or pressure applied by the clamp member 146 by, for example, about 20 percent when compared to instances where the wire, e.g., wire 710, is not concentrated wire toward a center or middle the clamp brace 132 and/or a center or middle of the clamp member 146. This results in a higher retention force in the range of, for example, about 1 pound force and about 7 pound force that can be applied by the clamp spring 136 to hold the wire, e.g., the wire strands of the stranded wire 710, to the wire terminal 130. For example, in the example where the energy stored by the one or more springs should be sufficient to apply a constant and continuous force in the range of, for example, about 5 pound force to about 35 pound force, the higher wire retention force would be in the range of, for example, 6 pound force to about 42 pound force. In addition, the higher spring force or pressure on the wire provides an improved electrical connection by lowering the contact resistance. Exemplary embodiments of the wire manager 900 are shown in FIGS. 43-47 and described herein below. However, the present disclosure contemplates other wire manager embodiments where the wire manager urges a wire or wire strands toward a center or middle of a clamp brace and/or a center or middle of the clamp member.

The housing 740 has a main body 750, a front cover 770 and a rear cover 790. The front cover 770 is secured to one side of the main body 750 and the rear cover 790 is secured to the other side of the main body 750. The housing 740 is made of a suitable electrical insulating material, such as plastic, including injection molded thermoplastic, and is configured to fit within an electrical box. The main body 750 includes a plurality of chambers or cavities 752, seen in 30. Each cavity 752 is configured to receive and position a contact assembly 100 within the main body 750, as shown in FIG. 30. Each contact assembly 100 is configured to receive a wire, such as wire 700, and to mate with a contact blade of a conventional plug connector as described above.

Figure 27:
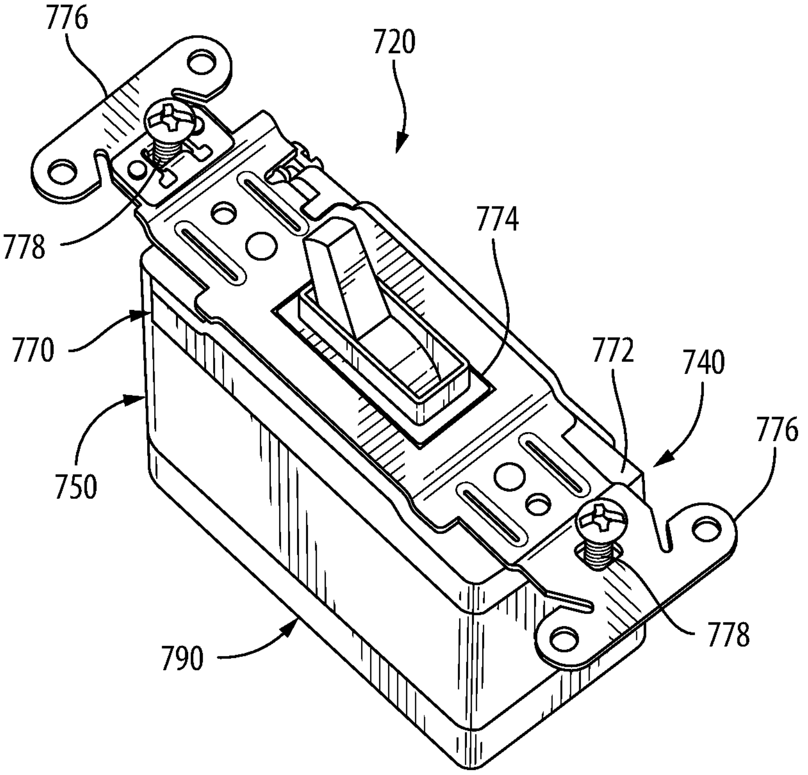
FIG. 27 is a top perspective view if an exemplary embodiment of an electrical switch having screwless connection terminals according to the present disclosure.

As shown in FIG. 27, the front cover 770 of the switch 720 includes a face 772 with a switch arm aperture 774 through which a conventional switch arm of a toggle switch can pass. The front cover 770 has one or more mounting straps 776 that are secured to an exterior surface of the front cover using, for example, mechanical fasteners or adhesives. The mounting straps 776 are used to secure the switch 720 to an electrical box via apertures 778 as is known. The mounting straps 776 may also be connected to electrical ground via a contact assembly 100 within the main body 750. The front cover 770 can be secured to the main body 750 using mechanical fasteners, adhesives or welds such as sonic welds.

Figure 28:
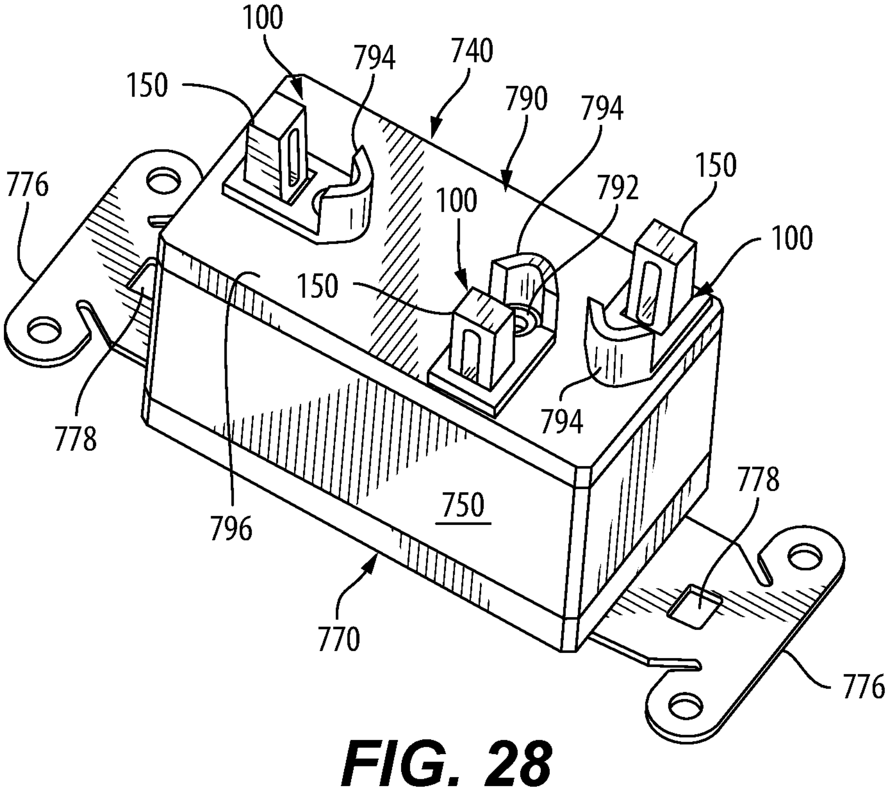
FIG. 28 is a bottom perspective view of the switch of FIG. 27.

Referring to FIGS. 28 and 29, the rear cover 790 can be secured to the main body 750 using mechanical fasteners, adhesives or welds such as sonic welds. The rear cover 790 includes a plurality of wire receiving apertures 792. Each wire receiving aperture 792 is positioned to align with a cavity 752 in the main body 750 so that a wire can pass through the rear cover 790 into a contact assembly 100 resting within a cavity 752 in the main body 750. The rear cover 790 may also include a plurality of wire guides 794 extending outwardly from an exterior surface 796 of the rear cover, as shown. In the embodiment shown, one wire guide 794 corresponds to one wire receiving aperture 792. Each wire guide 794 has an arcuate shape that corresponds to the round shape of a wire being inserted into the wire receiving aperture 792. The rear cover 790 also includes a plurality of plunger openings 798, seen in FIG. 29, that permits a portion of a plunger 150, forming a portion of the contact assembly 100 described above, to extend outside the housing 740.

Referring now to FIGS. 33-37, an exemplary embodiment of an electrical male flanged inlet having screwless connection terminals according to the present disclosure is shown. In this exemplary embodiment, the male flanged inlet 800 has a housing 802 and a plug assembly 804. The housing 802 may be a circular housing having a flange 806 at one end of the housing. The housing 802 is configured to be mounted into an opening in a structure, such as a wall, and the flange 806 is provided to prevent the housing 802 from passing through a properly created opening in the structure. The flange 806 may include mounting holes 808 that can be used to secure the flange 806 to the structure. The housing 802 is preferably made of a suitably rigid, electrical insulating material, such as a plastic material, or a rubber material. An example of a plastic material is injection molded thermoplastic. However, the housing 802 may be made of a metallic material.

Figure 35:
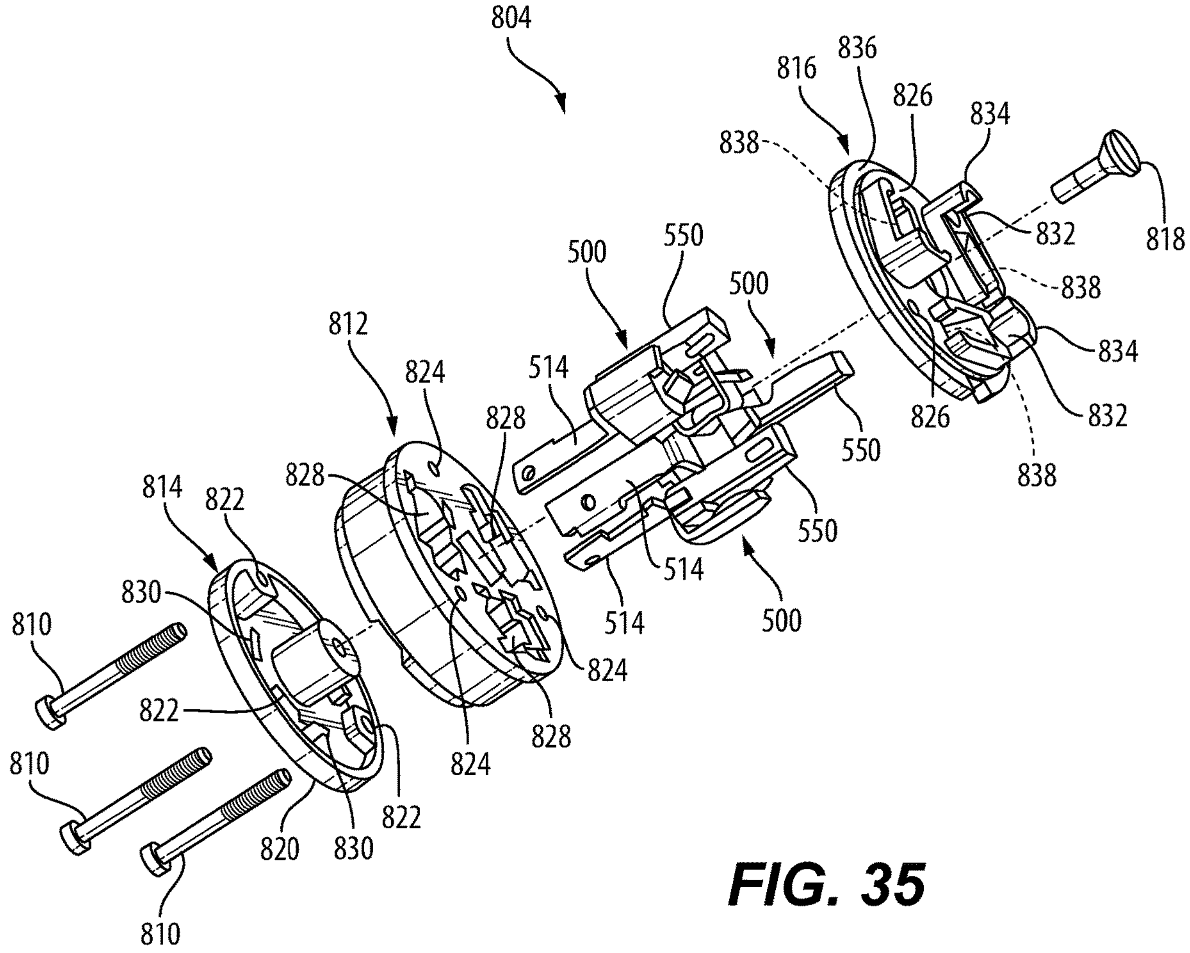
FIG. 35 is a side perspective view with parts separated of the plug assembly of the electrical male flanged inlet of FIG. 34.
Figure 38:
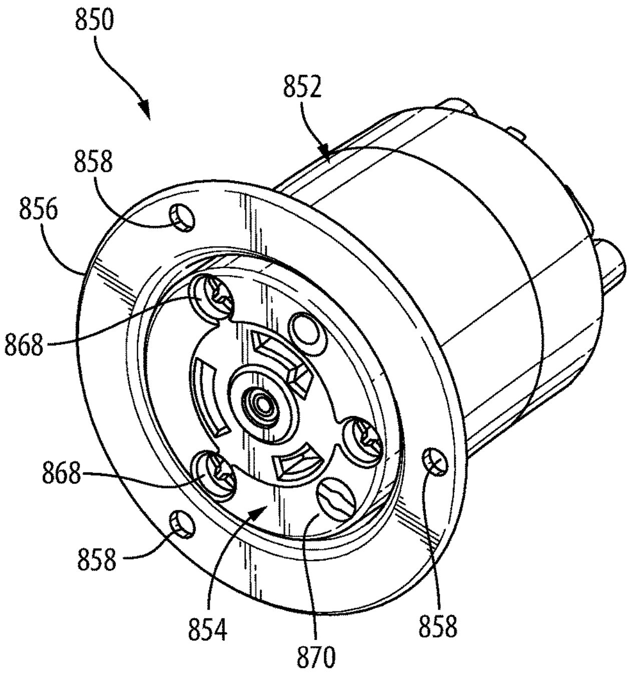
FIG. 38 is a perspective view of an exemplary embodiment of an electrical female flanged receptacle having screwless connection terminals according to the present disclosure, illustrating a receptacle assembly within a receptacle housing.
Figure 39:
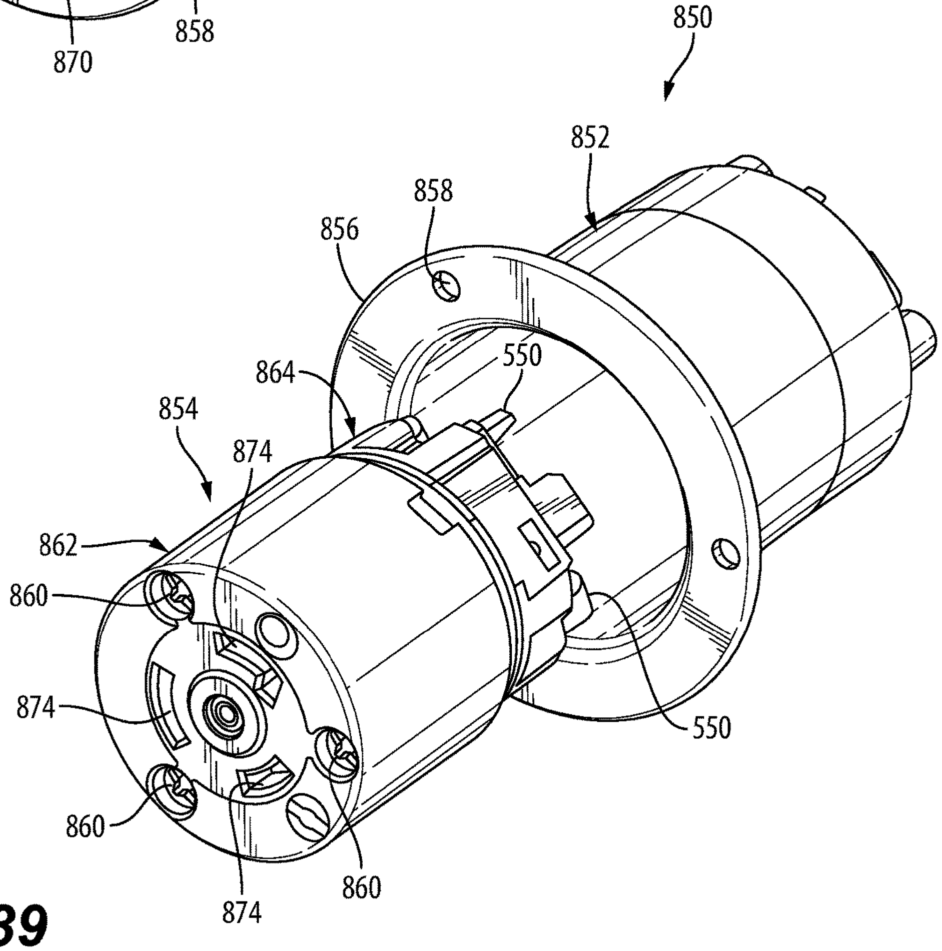
FIG. 39 is a perspective view of the electrical female flanged receptacle of FIG. 38, illustrating the receptacle assembly separated from the receptacle housing.

The plug assembly 804 is mounted within the housing 802 and secured to the housing using, for example, fasteners 810. The plug assembly 804 may be similar to the blade-type plug 400 described above. For example, the plug assembly 804 may include a main body 812, a cover 814, a retainer 816 and a plurality of contact assemblies 501 positioned within the main body 812 and extending at least partially from an exterior of the cover 814. As seen in FIG. 35, the retainer 816 is secured to a top side of the main body 812 using screw 818. The cover 814 is secured to the housing 802 by passing screws 810 through a face 820 and apertures 822 in the cover 814, through corresponding apertures 824 in the main body 812, and through corresponding apertures 826 in the retainer 816. The screws 810 are then secured to corresponding mounting holes (not shown) within the housing 802.

The main body 812 includes a plurality of chambers or cavities 828, seen in FIGS. 35 and 36. Each cavity 828 is configured to receive and position a contact assembly 501 within the main body 812. Each contact assembly 501 is configured to receive a conductor and to mate with a female contact of a blade-type connector, such as the female contacts of FIG. 8 or 15. The face 820 of the cover 814 has a plurality of blade-receiving slots 830 through which contact blades 514 of the contact assemblies 501 can be inserted so that the contact blades 514 extend outside the cover 814. The cover 814 when secured to the housing 802 helps hold the contact assemblies 501 within the main body 812.

Referring to FIGS. 35 and 37, the retainer 816 is secured to the main body 812 using mechanical fasteners, such as screw 818. The retainer 816 includes a plurality of wire receiving apertures 832. Each wire receiving aperture 832 is positioned to align with a cavity 828 in the main body 812 so that a wire can pass through the retainer 816 into a contact assembly 501 resting within the cavity 828 in the main body 812. The retainer 816 may also include a plurality of wire guides 834 extending outwardly from surface 836 of the retainer, as shown. In the embodiment shown, one wire guide 834 corresponds to one wire receiving aperture 832. Each wire guide 834 may have an arcuate like shape that corresponds to the shape of a wire being inserted into the wire receiving aperture 832. The retainer 816 also includes a plurality of plunger openings 838. In the embodiment shown, one plunger opening 838 corresponds to one wire receiving aperture 832. The plunger openings 838 permit a portion of a respective plunger 550 forming a portion of the contact assembly 501, described herein, to extend outside the main body 812 during installation. The contact assembly 501 is shown in FIGS. 21A, 21B and 22A-22D and described above, and generally includes the contact member 510, the wire terminal 530 and the plunger 550. The wire terminal 530 includes the wire manager 900.

Referring now to FIGS. 38-42, an exemplary embodiment of an electrical female flanged receptacle having screwless connection terminals according to the present disclosure is shown. In this exemplary embodiment, the female flanged receptacle 850 has a housing 852 and a cord connector assembly 854. The housing 852 may be a circular housing having a flange 856 at one end of the housing. The housing 852 is configured to be mounted into an opening in a structure, such as a wall, and the flange 856 is provided to prevent the housing 852 from passing through a properly created opening in the structure. The flange 856 may include mounting holes 858 that can be used to secure the flange 856 to the structure. The housing 852 is made of a suitably rigid, electrical insulating material, such as a plastic material, including injection molded thermoplastic, or a rubber material. However, the housing 802 may be made of a metallic material.

The cord connector assembly 854 is mounted within the housing 852 and secured to the housing 852 using, for example, fasteners 860. The cord connector assembly 854 may be similar to the blade-type power cord connector 200 described above. For example, the cord connector assembly 844 may include a main body 862, a retainer 864 and plurality of contact assemblies 301 within the main body 862 and are at least partially accessible from an exterior of the main body 862. The retainer 864 is secured to a top side of the main body 862 using fastener 866. The main body 862 is secured to housing 852 using the fasteners 860 inserted through apertures 868 in a face 870 in the main body 862 and through the main body 862.

Figure 40:
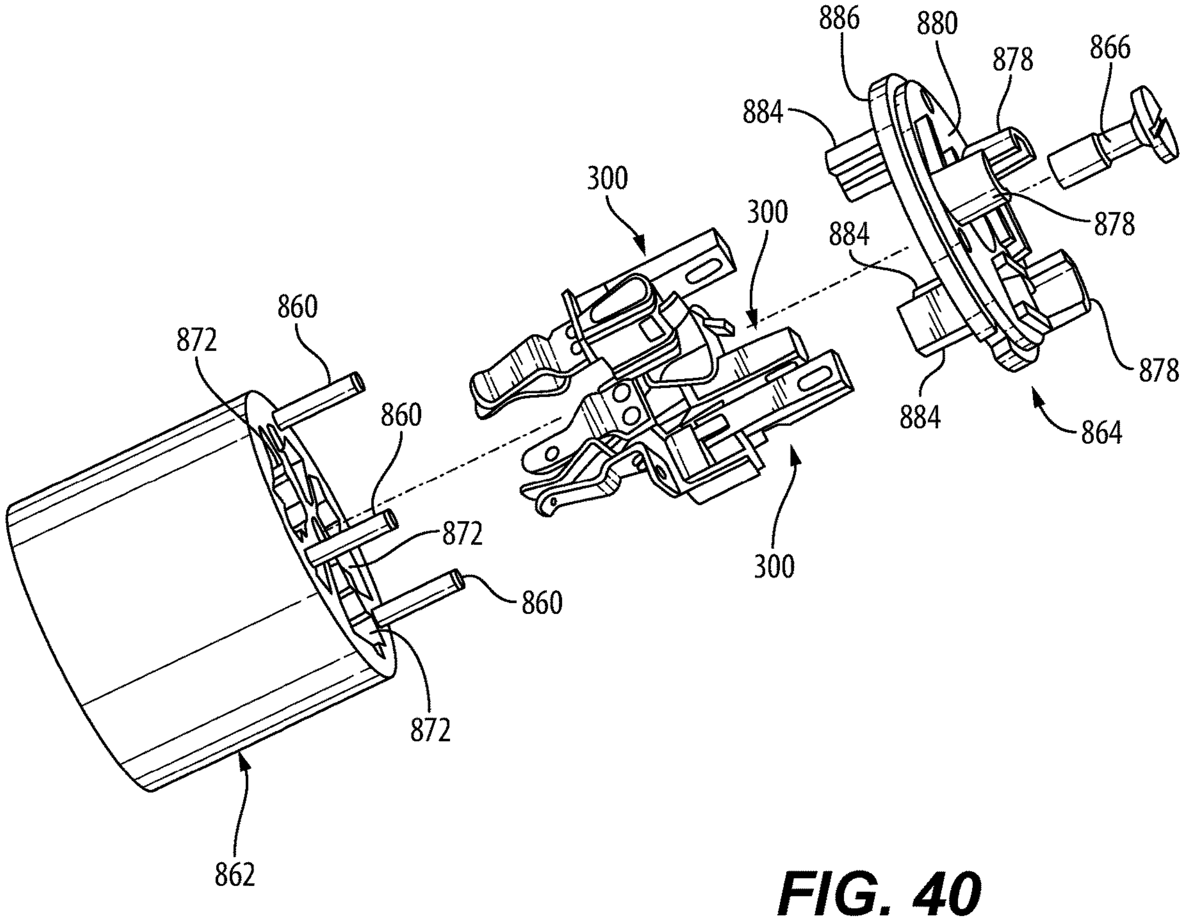
FIG. 40 is a side perspective view with parts separated of the receptacle assembly of the electrical female flanged receptacle of FIG. 39.

The main body 862 includes a plurality of chambers or cavities 872 seen in FIGS. 40 and 41. Each cavity 872 is configured to receive and position a contact assembly 301 within the main body 862. Each contact assembly 301 is configured to receive a conductor and to mate with a contact blade of a blade-type plug connector, such as a contact blade of the plug connector of FIG. 17. The face 870 of the main body 862 has a plurality of blade-receiving slots 874 through which contact blades of a blade-type plug connector can be inserted in the usual manner into adjacent cavities 872 within the main body 862 and into a respective contact assembly 301.

The retainer 864 is secured to the main body 862 using mechanical fasteners, such as screw 866. The retainer 864 includes a plurality of wire receiving apertures 876. Each wire receiving aperture 876 is positioned to align with a cavity 872 in the main body 862 so that a wire can pass through the retainer 864 into a contact assembly 301 resting within a cavity 872 in the main body 862. The retainer 864 may also include a plurality of wire guides 878 extending outwardly from surface 880 of the retainer, as shown. In the embodiment shown, one wire guide 878 corresponds to one wire receiving aperture 876. Each wire guide 878 may have an arcuate like shape that corresponds to the shape of a wire being inserted into the wire receiving aperture 876. The retainer 864 also includes a plurality of plunger openings 882, seen in FIG. 42. In the embodiment shown, one plunger opening 882 corresponds to one wire receiving aperture 876. The plunger openings 882 permit a portion of a respective plunger 350 forming a portion of the contact assembly 301, described herein, to extend outside the main body 862. The contact assembly 301 is shown in FIGS. 15A, 15B and 16A-16D and described above, and generally includes the contact member 310, the wire terminal 330 and the plunger 350. The wire terminal 530 includes the wire manager 900. The retainer 864 may also include a plurality of plunger guides 884 extending outwardly from surface 886 of the retainer 864, as shown in FIG. 40. In the embodiment shown, one plunger guide 884 corresponds to one plunger opening 882. The plunger guides 884 guide the plungers 350 as they are moved relative to the retainer 864.

As noted above, non-limiting and exemplary embodiments of the wire manager 900 are shown in FIGS. 43-47. However, the present disclosure contemplates other wire manager embodiments where the wire manager urges a wire or wire strands to concentrate toward a center or middle of a clamp brace and/or a center or middle of the clamp member. In the exemplary wire manager embodiments shown, the wire manager 900 may be integral or monolithically formed into the clamp brace 132, 332, 532 or the clamp member 146, 346, 546, or the wire manager 900 may be secured to the clamp brace 132, 332, 532 or the clamp member 146, 346, 546. Each wire manager 900 may be used with the wire terminals 130, 330, 530 described herein.

Figure 43:
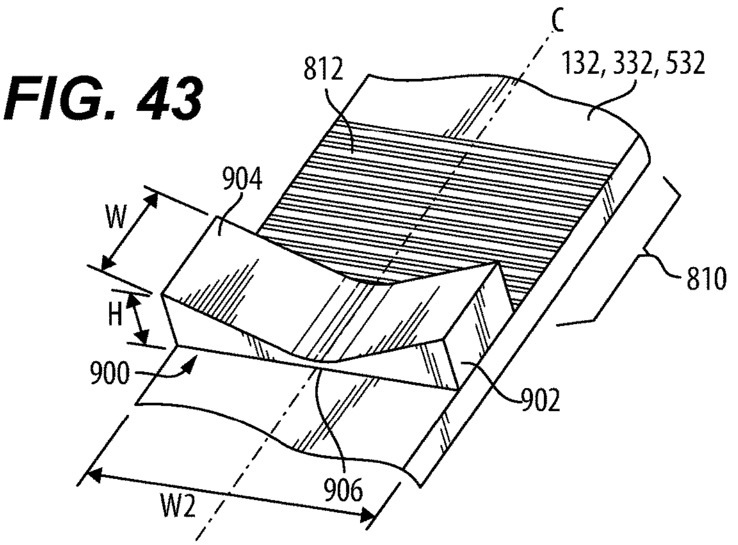
FIG. 43 is a perspective view of an exemplary embodiment of a wire manager of the clamp brace, and illustrating a portion of a surface of the clamp brace with a textured surface in the form of striations.

In the exemplary embodiment shown in FIG. 43, the wire manager 900 is a V-shape like structure formed with a pair of wedges 802 and 804 joined by a rounded valley 806. The wedges 802 and 804 may be symmetrically shaped wedges or asymmetrically shaped wedges. In the embodiment shown, the wedges 802 and 804 are symmetrically shaped wedges having a height "H" and a width "W." Preferably, the height "H" is in the range of, for example, about 0.05" and about 0.15", and the width "W" is in the range of, for example, about 0.1" and about 0.2". The wire manager 900 may extend along an entire width "W2" of the of the clamp brace 132, 332, 532, or the wire manager 900 may extend along a portion of the width "W2" of the of the clamp brace 132, 332, 532. In the embodiment shown, the wire manager 900 extends along the entire width "W2" of the of the clamp brace 132, 332, 532, with the rounded valley 806 positioned at or in close proximity to a center line "C" of the clamp brace 132, 332, 532. The wire manager 900 is also positioned on the clamp brace 132, 332, 532, so that the wire manager 900 does not interfere with the clamp member 146, 346, 546 contacting the exposed conductor of the wire, e.g., the strands of the stranded wire 710. For example, the wire manager 900 may be positioned so that the wire manager 900 is in close proximity to a contact line "C2," seen in FIG. 8A, were a distal end 146*a*, 346*a*, 546*a* of the clamp member 146, 346, 546 would contact the clamp brace 132, 332, 532 when the clamp brace is in the closed position and no wire is inserted into the elongated opening 144, 344, 544 of the wire terminal 130, 330, 530. In addition, a contact area 811 of the clamp brace 132, 332, 532 may include a textured surface 813 that is provided to grip the exposed wire strands or wire, e.g., the exposed wire strands of stranded wire 710, to improve the wire retention force applied to the exposed wire strands by the clamp member 146, 346, 546. The contact area 811 is at least a portion of the clamp brace 132, 332, 532 where the clamp member 146, 346, 546 would contact the clamp brace 132, 332, 532 when the clamp brace is in the closed position and no wire is inserted into the elongated opening 144, 344, 544 of the wire terminal 130, 330, 530. In the embodiment of FIG. 43, the textured surface 813 is striations.

Figure 44:
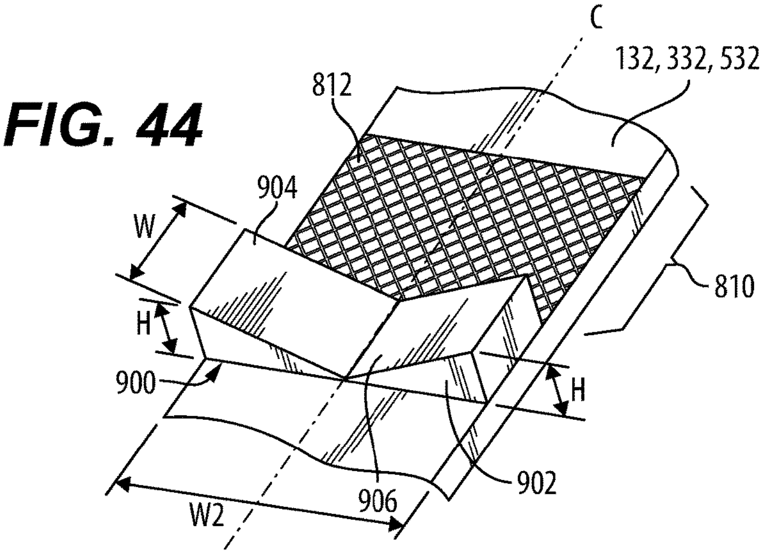
FIG. 44 is a perspective view of another exemplary embodiment of a wire manager secured to the clamp brace, and illustrating a portion of a surface of the clamp brace with a textured surface in the form of knurling.

In the exemplary embodiment shown in FIG. 44, the wire manager 900 is also a V-shape like structure formed with a pair of wedges 802 and 804. However, in the embodiment of FIG. 44, the wedges 802 and 804 are joined at their narrow end forming a sharp valley 806, as shown. The wedges 802 and 804 may be symmetrically shaped wedges or asymmetrically shaped wedges. In the embodiment shown, the wedges 802 and 804 are symmetrically shaped wedges having a height "H" and a width "W." As a non-limiting example, the height "H" may be in the range of, for example, about 0.05" and about 0.15", and the width "W" may be in the range of, for example, about 0.1" and about 0.2". The wire manager 900 may extend along an entire width "W2" of the of the clamp brace 132, 332, 532, or the wire manager 900 may extend along a portion of the width "W2" of the of the clamp brace 132, 332, 532. In the embodiment shown, the wire manager 900 extends along the entire width "W2" of the of the clamp brace 132, 332, 532, with the sharp valley 806 positioned at or in close proximity to the center line "C" of the clamp brace 132, 332, 532. The wire manager 900 is also positioned on the clamp brace 132, 332, 532, so that the wire manager 900 does not interfere with the clamp member 146, 346, 546 contacting the exposed conductor of the wire, e.g., the strands of the wire 710. For example, the wire manager 900 may be positioned so that the wire manager 900 is in close proximity to the contact line "C2," shown in FIG. 8A, were the distal end 146*a*, 346*a*, 546*a* of the clamp member 146, 346, 546 would contact the clamp brace 132, 332, 532 when the clamp brace is in the closed position and no wire is inserted into the elongated opening 144, 344, 544 of the wire terminal 130, 330, 530. In addition, a contact area 811 of the clamp brace 132, 332, 532 may include the textured surface 813 that is provided to grip the exposed wire strands or wire, e.g., the exposed wire strands of stranded wire 710, to improve the wire retention force applied to the exposed wire strands by the clamp member 146, 346, 546. The contact area 811 is at least a portion of the clamp brace 132, 332, 532 where the clamp member 146, 346, 546 would contact the clamp brace 132, 332, 532 when the clamp brace is in the closed position and no wire is inserted into the elongated opening 144, 344, 544 of the wire terminal 130, 330, 530. In the embodiment of FIG. 44, the textured surface 813 is knurling.

Figure 45:
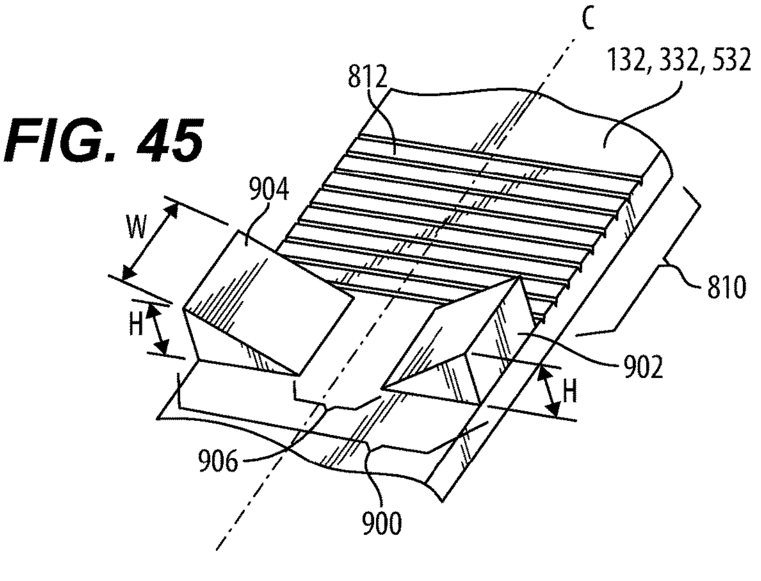
FIG. 45 is a perspective view of another exemplary embodiment of a wire manager secured to the clamp brace, and illustrating a portion of a surface of the clamp brace with a textured surface in the form of shallow grooves.

In the exemplary embodiment shown in FIG. 45, the wire manager 900 is also a V-shape like structure formed with a pair of wedges 802 and 804. However, in the embodiment of FIG. 45, the wedges 802 and 804 are spaced apart so that a portion of the clamp brace 132, 332, 532 forms the valley 806, as shown. The wedges 802 and 804 may be symmetrically shaped wedges or asymmetrically shaped wedges. In the embodiment shown, the wedges 802 and 804 are symmetrically shaped wedges having a height "H" and a width "W." As a non-limiting example, the height "H" may be in the range of, for example, about 0.05" and about 0.15", and the width "W" may be in the range of, for example, about 0.1" and about 0.2". The wire manager 900 may extend along an entire width "W2" of the of the clamp brace 132, 332, 532, or the wire manager 900 may extend along a portion of the width "W2" of the of the clamp brace 132, 332, 532. In the embodiment shown, the wire manager 900 extends along a portion of the width "W2" of the of the clamp brace 132, 332, 532, with the portion of the clamp brace forming the valley 806. Preferably, the valley 806 is positioned at or in close proximity to a center or middle of the clamp brace 132, 332, 532. The wire manager 900 is also positioned on the clamp brace 132, 332, 532 so that the wire manager 900 does not interfere with the clamp member 146, 346, 546 contacting the exposed conductor of the wire, e.g., the strands of the wire 710. For example, the wire manager 900 may be positioned so that the wire manager 900 is in close proximity to the contact line "C2," shown in FIG. 8A, where the distal end 146*a*, 346*a*, 546*a* of the clamp member 146, 346, 546 would contact the clamp brace 132, 332, 532 when the clamp brace is in the closed position and no wire is inserted into the elongated opening 144, 344, 544 of the wire terminal 130, 330, 530. In addition, a contact area 811 of the clamp brace 132, 332, 532 may include the textured surface 813 that is provided to grip the exposed wire strands or wire, e.g., the exposed wire strands of stranded wire 710, to improve the wire retention force applied to the exposed wire strands by the clamp member 146, 346, 546. The contact area 811 is at least a portion of the clamp brace 132, 332, 532 where the clamp member 146, 346, 546 would contact the clamp brace 132, 332, 532 when the clamp brace is in the closed position and no wire is inserted into the elongated opening 144, 344, 544 of the wire terminal 130, 330, 530. In the embodiment of FIG. 45, the textured surface 813 is narrow grooves.

Figure 46:
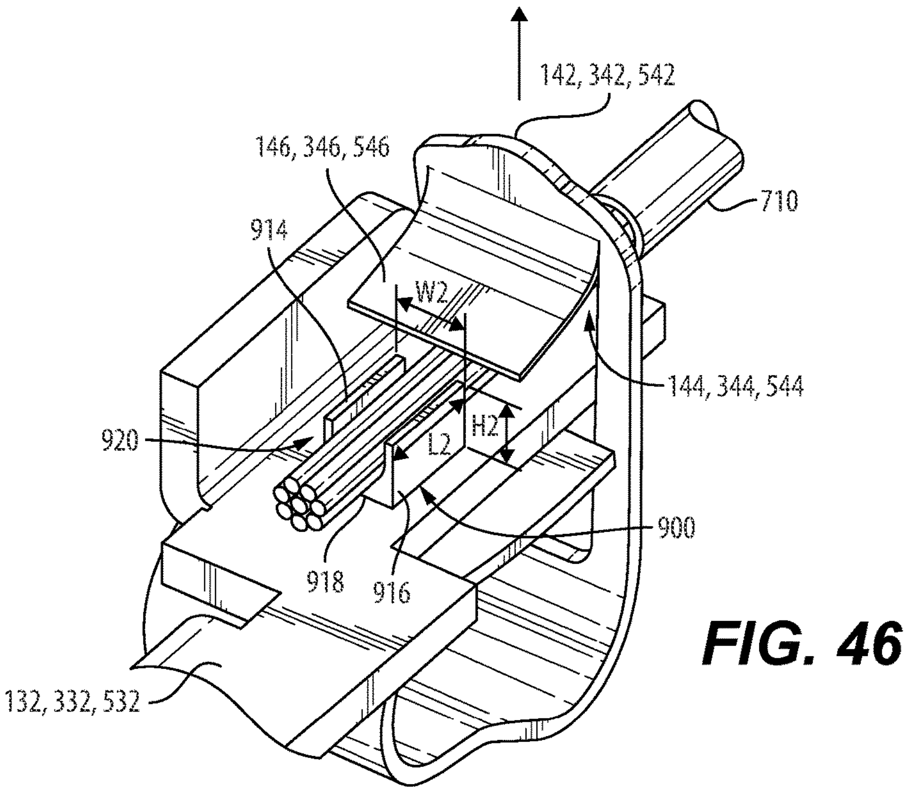
FIG. 46 is a perspective view of another exemplary embodiment of a wire manager according to the present disclosure, illustrating the wire manager associated with a clamp brace of a wire terminal.

In the exemplary embodiment shown in FIG. 46, the wire manager 900 is a U-shape like structure formed with a pair of side walls 814 and 816, and a bottom wall 818 joined to the side walls 814 and 816 and forming a wire receiving opening or channel 820. In the embodiment shown, the side walls 814 and 816 and bottom wall have a height "H2," a width "W2," and a length "L." As a non-limiting example, the height "H2" may be in the range of, for example, about 0.05" and about 0.15", the width "W2" may be in the range of, for example, about 0.1" and about 0.2", and the length "L" may be in the range of about 0.1" and about 0.3". The wire manager 900 is positioned on the clamp brace 132, 332, 532 so that the wire receiving opening 820 extends in a direction that is substantially parallel to a longitudinal axis of the clamp brace 132, 332, 532, as shown. The wire manager 900 is also positioned on the clamp brace 132, 332, 532, so that the wire manager 900 does not interfere with the clamp member 146, 346, 546 contacting the exposed conductor of the wire, e.g., the strands of the wire 710. For example, the wire manager 900 may be positioned so that the wire manager 900 is in close proximity to the contact line "C2," shown in FIG. 8A, where a distal end 146*a*, 346*a*, 546*a* of the clamp member 146, 346, 546 would contact the clamp brace 132, 332, 532 when the clamp brace is in the closed position and no wire is inserted into the elongated opening 144, 344, 544 of the wire terminal 130, 330, 530. In addition, the contact area 811 of the clamp brace 132, 332, 532 may include the textured surface 813 that is provided to grip the exposed wire strands or wire, e.g., the exposed wire strands of stranded wire 710, to improve the wire retention force applied to the exposed wire strands by the clamp member 146, 346, 546. In this embodiment, the contact area is at least a portion of the clamp brace 132, 332, 532 where the exposed conductors of, for example, the stranded wire 710, would contact the clamp brace 132, 332, 532 when the clamp brace is in the closed position. As described above, the textured surface may be, for example, striations, knurling and/or small grooves on the surface of the clamp brace 132, 332, 532.

Figure 47:
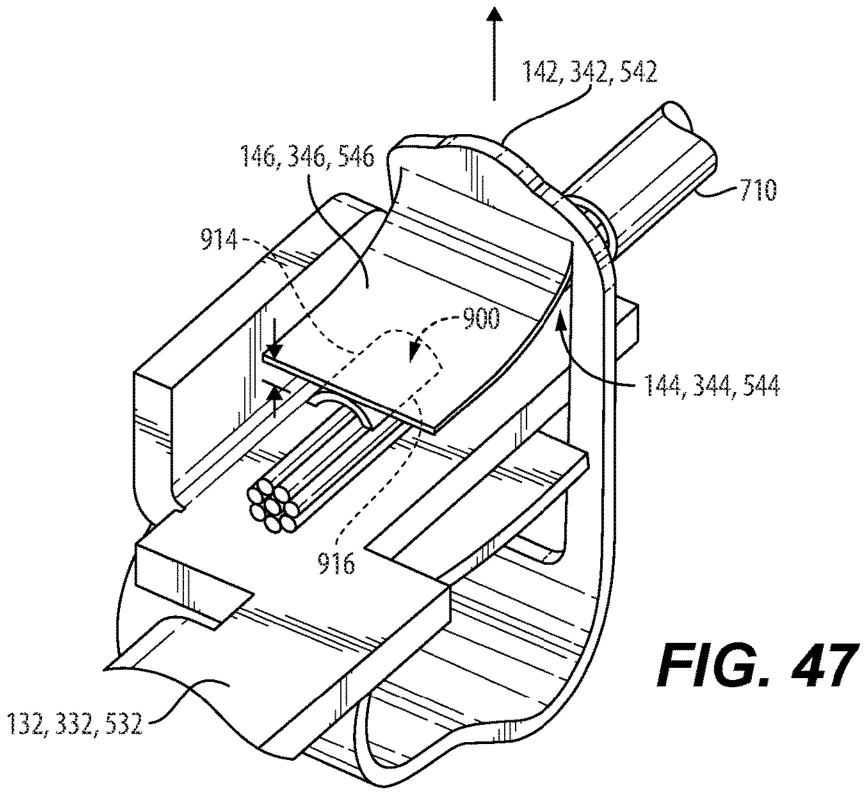
FIG. 47 is a perspective view of another exemplary embodiment of a wire manager according to the present disclosure, illustrating the wire manager associated with a clamp member of a clamp spring of a wire terminal.

In the exemplary embodiment shown in FIG. 47, the wire manager 900 is an arcuate shape or C-shaped like structure having a wire receiving opening 820. In the embodiment shown, the sides 814 and 816 and bottom have a height "H3," a width "W3," and a length "L2." As a non-limiting example, the height "H3" may be in the range of, for example, about 0.05" and about 0.15", the width "W3" may be in the range of, for example, about 0.1" and about 0.2", and the length "L2" may be in the range of, for example about 0.1" and about 0.3". In this exemplary embodiment, the wire manager 900 is positioned on the clamp member 146, 346, 546 of the clamp spring 136, 336, 536, so that the wire receiving opening 820 extends in a direction that is substantially parallel to a longitudinal axis of the clamp member 146, 346, 546, as shown. It is noted that the wedges 802 and 804, and the U-shaped wire managers 900 described above, and any other suitable wire managers may be substituted for the arcuate shape or C-shaped like structure on the clamp member 146, 346, 546. In addition, the contact area 811 of the clamp brace 132, 332, 532 may include the textured surface 813 that is provided to grip the exposed wire strands or wire, e.g., the exposed wire strands of stranded wire 710, to improve the wire retention force applied to the exposed conductors of the wire, e.g., stranded wire 710 or wire 700, by the clamp member 146, 346, 546. In this embodiment, the contact area is at least a portion of the clamp brace 132, 332, 532 where the exposed conductors of, for example the stranded wire 710, would contact the clamp brace 132, 332, 532 when the clamp brace is in the closed position. As described above, the textured surface may be, for example, striations, knurling and/or small grooves on the surface of the clamp brace 132, 332, 532.

While exemplary embodiments have been chosen to illustrate the invention, it will be understood by those skilled in the art that various changes, modifications, additions, and substitutions are possible, without departing from the scope and spirit of the invention.

What is claimed is:

1. An electrical wiring device comprising:

a housing having a plurality of wire receiving apertures and a plurality of plunger openings; and a plurality of contact assemblies positioned within the housing so that each of the plurality of contact assemblies is accessible from one of the plurality of wire receiving apertures and one of the plurality of plunger openings;

wherein each of the plurality of the contact assemblies includes:

a wire terminal including a clamp brace secured to a clamp spring and a wire manager, the clamp spring being movable relative to the clamp brace between a closed position where a wire can be clamped between the clamp spring and the clamp brace and an open position where a wire can be inserted through one of the plurality of wire receiving apertures and between the clamp spring and the clamp brace, the wire manager being positioned on the clamp brace or the clamp spring and configured to urge the wire between the clamp spring and the clamp brace toward a center of the clamp brace or the clamp spring such that the wire is concentrated in the center of the clamp brace or the clamp spring as the wire is clamped; and a plunger positioned within the housing and extending at least partially through one of the plurality of plunger openings, the plunger being interactive with the clamp spring such that movement of the plunger in a first direction causes the plunger to apply a mechanical load to the clamp spring to cause the clamp spring to move from the closed position to the open position and movement of the plunger in a second direction that is opposite the first direction removes the mechanical load from the clamp spring so that to the clamp spring moves from the open position to the closed position.

2. The electrical wiring device according to claim 1, wherein the wire manager comprises a first wedge joined to a second wedge such that a rounded valley or a sharp valley is formed between the first wedge and the second wedge.

3. The electrical wiring device according to claim 1, wherein the wire manager comprises a first wedge, a second wedge and a valley between the first wedge and the second wedge, the valley being a portion of the clamp brace.

4. The electrical wiring device receptacle according to claim 1, wherein the wire manager comprises a first wall, a second wall and a bottom wall joined between the first wall and the second wall so that an opening is formed between the first wall and the second wall, the bottom wall being integrally formed into or attached to the clamp brace.

5. The electrical wiring device according to claim 1, wherein the wire terminal includes a clamp member configured to contact the wire positioned between the clamp spring and the clamp brace to clamp the wire between the clamp spring and the clamp brace, and wherein the wire manager extends from the clamp member.

6. The electrical wiring device according to claim 1, wherein the plunger is made of a non-conductive material.

7. The electrical wiring device according to claim 1, wherein the movement of the plunger in the second direction is opposite the movement of the plunger in the first direction.

8. The electrical wiring device according to claim 1, wherein the movement of the plunger in the first direction and the second direction is parallel to the clamp brace.

9. A screwless contact assembly for use in electrical wiring devices, the screwless contact assembly comprising:

a wire terminal including a clamp brace secured to a clamp spring and a wire manager, the clamp spring being movable relative to the clamp brace between a closed position where a wire can be clamped between the clamp spring and the clamp brace and an open position where a wire can be inserted between the clamp spring and the clamp brace, the wire manager being positioned on the clamp brace or the clamp spring and configured to urge the wire between the clamp spring and the clamp brace toward a center of the clamp brace or the clamp spring such that the wire is concentrated in the center of the clamp brace or the clamp spring as the wire is clamped; and a plunger that is interactive with the clamp spring such that movement of the plunger in a first direction causes the plunger to apply a mechanical load to the clamp spring to cause the clamp spring to move from the closed position to the open position and movement of the plunger in a second direction that is opposite the first direction removes the mechanical load from the clamp spring so that to the clamp spring moves from the open position to the closed position.

10. The screwless contact assembly according to claim 9, wherein the wire manager comprises a first wedge joined to a second wedge such that a rounded valley or a sharp valley is formed between the first wedge and the second wedge.

11. The screwless contact assembly according to claim 9, wherein the wire manager comprises a first wedge, a second wedge and a valley between the first wedge and the second wedge, the valley being a portion of the clamp brace.

12. The screwless contact assembly according to claim 9, wherein the wire manager comprises a first wall, a second wall and a bottom wall joined between the first wall and the second wall so that an opening is formed between the first wall and the second wall, the bottom wall being integrally formed into or attached to the clamp brace.

13. The screwless contact assembly according to claim 9, wherein the wire terminal includes a clamp member configured to contact the wire positioned between the clamp spring and the clamp brace to clamp the wire between the clamp spring and the clamp brace, and wherein the wire manager extends from the clamp member.

14. An electrical wiring device comprising:

a housing having at least one cavity, at least one wire receiving aperture and at least one plunger opening; and at least one contact assembly positioned in the at least one cavity of the housing such that the at least one contact assembly is accessible from the at least one wire receiving aperture and the at least one plunger opening;

wherein the at least one contact assembly includes:

a wire terminal including a clamp brace secured to a clamp spring and a wire manager, the clamp spring being movable relative to the clamp brace between a closed position where a wire can be clamped between the clamp spring and the clamp brace and an open position where the wire can be inserted through the at least one wire receiving aperture in the housing and between the clamp spring and the clamp brace, the wire manager being positioned on the clamp brace or the clamp spring and configured to urge the wire between the clamp spring and the clamp brace toward a center of the clamp brace or the clamp spring such that the wire is concentrated in the center of the clamp brace or the clamp spring as the wire is clamped; and a plunger positioned within the at least one cavity and extending at least partially through the at least one plunger opening in the housing, the plunger being interactive with the clamp spring such that movement of the plunger in a first direction causes the plunger to apply a mechanical load to the clamp spring to cause the clamp spring to move from the closed position to the open position and movement of the plunger in a second direction that is opposite the first direction removes the mechanical load from the clamp spring so that to the clamp spring moves from the open position to the closed position.

15. The electrical wiring device according to claim 14, wherein the wire manager comprises a first wedge joined to a second wedge such that a rounded valley or a sharp valley is formed between the first wedge and the second wedge.

16. The electrical wiring device according to claim 14, wherein the wire manager comprises a first wedge, a second wedge and a valley between the first wedge and the second wedge, the valley being a portion of the clamp brace.

17. The electrical wiring device according to claim 14, wherein the wire manager comprises a first wall, a second wall and a bottom wall joined between the first wall and the second wall so that an opening is formed between the first wall and the second wall, the bottom wall being integrally formed into or attached to the clamp brace.

18. The electrical wiring device according to claim 14, wherein the wire terminal includes a clamp member configured to contact the wire positioned between the clamp spring and the clamp brace to clamp the wire between the clamp spring and the clamp brace, and wherein the wire manager extends from the clamp member.

19. The electrical wiring device according to claim 14, wherein the plunger is made of a non-conductive material.

20. The electrical wiring device according to claim 14, wherein the movement of the plunger in the first direction and the second direction is parallel to the clamp brace.

* * * * *